US011539973B2

(12) United States Patent
Jung et al.

(10) Patent No.: US 11,539,973 B2
(45) Date of Patent: Dec. 27, 2022

(54) METHOD AND DEVICE FOR PROCESSING VIDEO SIGNAL USING MULTIPLE TRANSFORM KERNELS

(71) Applicant: HUMAX CO., LTD., Yongin-si (KR)

(72) Inventors: Jaehong Jung, Seoul (KR); Juhyung Son, Uiwang-Si (KR); Dongcheol Kim, Suwon-Si (KR); Geonjung Ko, Seoul (KR); Jinsam Kwak, Anyang-Si (KR)

(73) Assignee: HUMAX CO., LTD., Yongin-si (KR)

( * ) Notice: Subject to any disclaimer, the term of this patent is extended or adjusted under 35 U.S.C. 154(b) by 0 days.

(21) Appl. No.: 17/317,629

(22) Filed: May 11, 2021

(65) Prior Publication Data

US 2021/0266581 A1 Aug. 26, 2021

Related U.S. Application Data

(63) Continuation of application No. PCT/KR2020/000638, filed on Jan. 13, 2020.

(30) Foreign Application Priority Data

Jan. 12, 2019 (KR) ........................ 10-2019-0004278
Jan. 18, 2019 (KR) ........................ 10-2019-0007044
(Continued)

(51) Int. Cl.
*H04N 19/119* (2014.01)
*H04N 19/46* (2014.01)
(Continued)

(52) U.S. Cl.
CPC ........... *H04N 19/46* (2014.11); *H04N 19/119* (2014.11); *H04N 19/159* (2014.11); *H04N 19/176* (2014.11); *H04N 19/60* (2014.11)

(58) Field of Classification Search
CPC .... H04N 19/46; H04N 19/119; H04N 19/159; H04N 19/60; H04N 19/176
See application file for complete search history.

(56) References Cited

U.S. PATENT DOCUMENTS

2015/0264353 A1* 9/2015 Yie ...................... H04N 19/182
375/240.03

FOREIGN PATENT DOCUMENTS

KR 10-2015-0087207 * 7/2015
KR 10-2015-0087207 A 7/2015
(Continued)

OTHER PUBLICATIONS

English Translation of the Written Opinion of the International Search Authority for International application No. PCT/KR2020/000638 dated May 13, 2020.
Examination report under sections 12 & 13 of the Patents Act, 1970 and the Patents Rules, 2003 from Intellectual Property India for Application No. 20212702390 dated Nov. 3, 2022.
(Continued)

*Primary Examiner* — Dave Czekaj
*Assistant Examiner* — Berteau Joisil

(57) ABSTRACT

A method for processing a video signal comprises the steps of: obtaining, from the video signal, an intra sub-partitions (ISP) mode flag indicating whether the ISP mode is applied to a current block; when the ISP mode is applied to the current block, obtaining, from the video signal, an ISP partitioning flag indicating a partitioning direction of the current block; partitioning the current block into a plurality of transform blocks on the basis of the partitioning direction; generating residual blocks of the transform blocks by performing an inverse transformation on each of the transform blocks; and restoring the current block on the basis of the residual blocks.

15 Claims, 20 Drawing Sheets

(30) Foreign Application Priority Data

Mar. 12, 2019 (KR) ........................ 10-2019-0027876
Mar. 29, 2019 (KR) ........................ 10-2019-0036421

(51) Int. Cl.
*H04N 19/159* (2014.01)
*H04N 19/176* (2014.01)
*H04N 19/60* (2014.01)

(56) References Cited

FOREIGN PATENT DOCUMENTS

| | | | | | |
|---|---|---|---|---|---|
| KR | 10-2017-0132036 | | * | 12/2017 | |
| KR | 10-2017-0132036 | A | | 12/2017 | |
| KR | 10-2018-0040126 | | * | 4/2018 | |
| KR | 10-2018-0040126 | A | | 4/2018 | |
| WO | 2016006894 | A1 | | 1/2016 | |
| WO | 2018038554 | A1 | | 3/2018 | |
| WO | 2018-092868 | A1 | | 5/2018 | |
| WO | WO-2018092868 | A1 | * | 5/2018 | ........... H04N 19/119 |
| WO | WO-2018166429 | A1 | * | 9/2018 | ........... H04N 19/119 |
| WO | 2020143811 | A1 | | 7/2020 | |

OTHER PUBLICATIONS

"CE3: Intra Sub-Partitions Coding Mode (Tests 1.1.1 and 1.1.2)" Document: JVET-M0102-v2 Joint Video Experts Team (JVET) of ITU-T SG 16 WP 3 and ISO/IEC JTC 1/SC 29/WG 11 13th Meeting: Marrakech, MACN, Jan. 9-18, 2019.
AdditionalTestCE3-1.1.2Vertical4xNVsAnchor.xlsm Reference:anchor Tested:test2Vertical4xn Note: BD-rate is computed using piece-wise cubic interpolation.
TestCE3-1.1.1vsAnchor Reference:VTM-3.0 Tested:CE3-Test 1.1.1 Note: BD-rate is computed using piece-wise cubic interpolation.
TestCE3-1.1.2VsAnchor Reference:VTM-3.0 Tested:Test CE3-1. 1.2 Note: BD-rate is computed using piece-wise cubic interpolation.
International Search Report of International application No. PCT /KR2020/000638, dated May 13, 2020.
Written Opinion of International application No. PCT /KR2020/000638, dated May 13, 2020.
Request for the Submission of an Opinion for KR Application No. 10-2021-7012558 from KIPO. dated Sep. 23, 2022.
S. De-Luxan-Hernández et al., CE3 Intra Sub-Partitions Coding Mode Tests 1.1.1 and 1.1.2), JVET of ITU-T and ISOIEC, JVET-M0102-ISP-DraftText_r1.docx in JVET-M0102-V7 (Jan. 17, 2019).

* cited by examiner

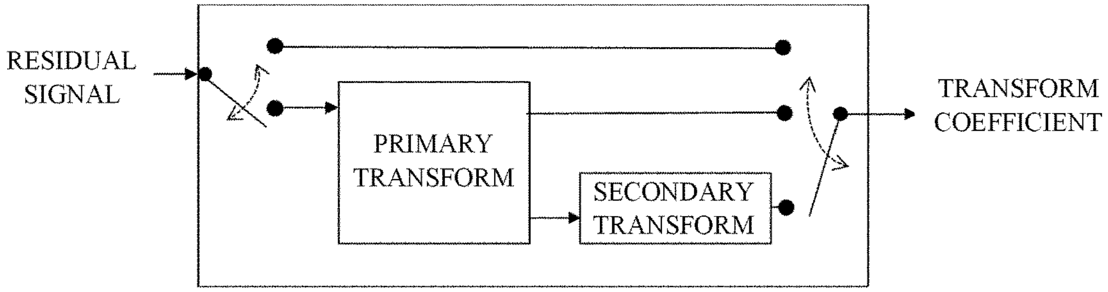

*FIG. 8*

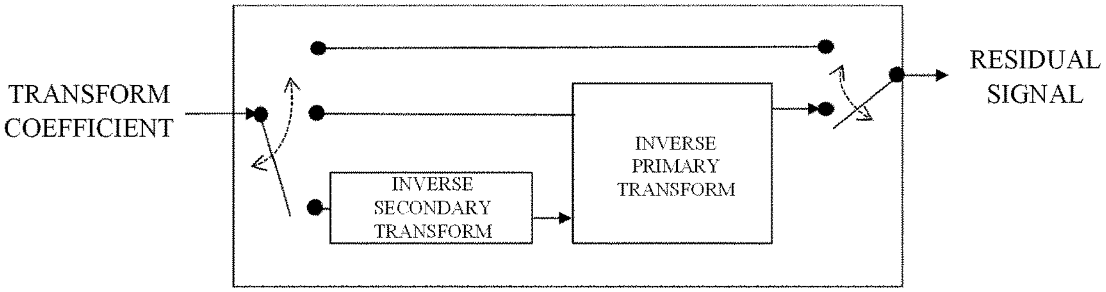

*FIG. 9*

| Transform Type | Basis function $T_i(j)$, $i, j=0, 1, \ldots, N-1$ |
|---|---|
| DCT-II | $T_i(j) = \omega_0 \cdot \sqrt{\frac{2}{N}} \cdot \cos\left(\frac{\pi \cdot i \cdot (2j+1)}{2N}\right)$ where $\omega_0 = \begin{cases} \sqrt{\frac{2}{N}} & i = 0 \\ 1 & i \neq 0 \end{cases}$ |
| DCT-V | $T_i(j) = \omega_0 \cdot \omega_1 \cdot \sqrt{\frac{2}{2N-1}} \cdot \cos\left(\frac{2\pi \cdot i \cdot j}{2N-1}\right)$, where $\omega_0 = \begin{cases} \sqrt{\frac{2}{N}} & i = 0 \\ 1 & i \neq 0 \end{cases}, \omega_1 = \begin{cases} \sqrt{\frac{2}{N}} & j = 0 \\ 1 & j \neq 0 \end{cases}$ |
| DCT-VIII | $T_i(j) = \sqrt{\frac{4}{2N+1}} \cdot \cos\left(\frac{\pi \cdot (2i+1) \cdot (2j+1)}{4N+2}\right)$ |
| DST-I | $T_i(j) = \sqrt{\frac{2}{N+1}} \cdot \sin\left(\frac{\pi \cdot (i+1) \cdot (j+1)}{N+1}\right)$ |
| DST-VII | $T_i(j) = \sqrt{\frac{4}{2N+1}} \cdot \sin\left(\frac{\pi \cdot (2i+1) \cdot (j+1)}{2N+1}\right)$ |

| Transform Type | Basis function $T_i(j)$, $i, j$=0, 1,..., $N$−1 |
|---|---|
| DCT-IV | $T_i(j) = \sqrt{\frac{2}{N}} \cdot \cos\left(\frac{\pi \cdot (2i+1) \cdot (2j+1)}{4N}\right)$ |
| DST-IV | $T_i(j) = \sqrt{\frac{2}{N}} \cdot \sin\left(\frac{\pi \cdot (2i+1) \cdot (2j+1)}{4N}\right)$ |

(b)

(a)

| Intra Mode | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| V | 2 | 1 | 0 | 1 | 0 | 1 | 0 | 1 | 0 | 1 | 0 | 1 | 0 | 1 | 0 | 0 | 0 | 0 |
| H | 2 | 1 | 0 | 1 | 0 | 1 | 0 | 1 | 0 | 1 | 0 | 1 | 0 | 1 | 2 | 2 | 2 | 2 |
| Intra Mode | 18 | 19 | 20 | 21 | 22 | 23 | 24 | 25 | 26 | 27 | 28 | 29 | 30 | 31 | 32 | 33 | 34 | |
| V | 0 | 0 | 0 | 0 | 0 | 1 | 0 | 1 | 0 | 1 | 0 | 1 | 0 | 1 | 0 | 1 | 0 | |
| H | 2 | 2 | 2 | 2 | 2 | 1 | 0 | 1 | 0 | 1 | 0 | 1 | 0 | 1 | 0 | 1 | 0 | |
| Intra Mode | 35 | 36 | 37 | 38 | 39 | 40 | 41 | 42 | 43 | 44 | 45 | 46 | 47 | 48 | 49 | 50 | 51 | 52 |
| V | 1 | 0 | 1 | 0 | 1 | 0 | 1 | 0 | 1 | 0 | 1 | 2 | 2 | 2 | 2 | 2 | 2 | 2 |
| H | 1 | 0 | 1 | 0 | 1 | 0 | 1 | 0 | 1 | 0 | 1 | 0 | 0 | 0 | 0 | 0 | 0 | 0 |
| Intra Mode | 53 | 54 | 55 | 56 | 57 | 58 | 59 | 60 | 61 | 62 | 63 | 64 | 65 | 66 | | | | |
| V | 2 | 2 | 1 | 0 | 1 | 0 | 1 | 0 | 1 | 0 | 1 | 0 | 1 | 0 | | | | |
| H | 0 | 0 | 1 | 0 | 1 | 0 | 1 | 0 | 1 | 0 | 1 | 0 | 1 | 0 | | | | |

(b)

| Transform Set | Transform Candidates |
|---|---|
| 0 | DST-VII, DCT-VIII |
| 1 | DST-VII, DST-I |
| 2 | DST-VII, DCT-V |

(c)

| Transform Set | Transform Candidates |
|---|---|
| 0 | DCT-VIII, DST-VII |

| tu_mts_idx[ x0 ][ y0 ] | 0 | 1 | 2 | 3 | 4 |
|---|---|---|---|---|---|
| trTypeHor | 0 | 1 | 2 | 1 | 2 |
| trTypeVer | 0 | 1 | 1 | 2 | 2 |

(b)

| Index | Transform Kernel |
|---|---|
| 0 | DCT-II |
| 1 | DST-VII |
| 2 | DCT-VIII |

| Step | transform_unit( x0, y0, tbWidth, tbHeight, treeType ) { | Descriptor |
|---|---|---|
| S1501 | if( treeType = = SINGLE_TREE \|\| treeType = = DUAL_TREE_LUMA ) | |
| S1501 | **tu_cbf_luma**[ x0 ][ y0 ] | ae(v) |
| S1501 | if( treeType = = SINGLE_TREE \|\| treeType = = DUAL_TREE_CHROMA ) { | |
| S1501 | **tu_cbf_cb**[ x0 ][ y0 ] | ae(v) |
| S1501 | **tu_cbf_cr**[ x0 ][ y0 ] | ae(v) |
| S1501 | } | |
| S1502 | if( ( ( ( CuPredMode[ x0 ][ y0 ] = = MODE_INTRA ) && sps_mts_intra_enabled_flag ) \|\| ( ( CuPredMode[ x0 ][ y0 ] = = MODE_INTER ) && sps_mts_inter_enabled_flag ) ) && tu_cbf_luma[ x0 ][ y0 ] && treeType ! = DUAL_TREE_CHROMA && ( tbWidth <= 32 ) && ( tbHeight <= 32 ) ) | |
| S1502 | **cu_mts_flag**[ x0 ][ y0 ] | ae(v) |
| S1503 | if( tu_cbf_luma[ x0 ][ y0 ] ) | |
| S1503 | residual_coding( x0, y0, log2( tbWidth ), log2( tbHeight ), 0 ) | |
| S1504 | if( tu_cbf_cb[ x0 ][ y0 ] ) | |
| S1504 | residual_coding( x0, y0, log2( tbWidth / 2 ), log2( tbHeight / 2 ), 1 ) | |
| S1505 | if( tu_cbf_cr[ x0 ][ y0 ] ) | |
| S1505 | residual_coding( x0, y0, log2( tbWidth / 2 ), log2( tbHeight / 2 ), 2 ) | |
| | } | |

(b)

| Step | residual_coding( x0, y0, log2TbWidth, log2TbHeight, cIdx ) { | Descriptor |
|---|---|---|
| S1506 | if( transform_skip_enabled_flag && ( cIdx ! = 0 \|\| cu_mts_flag[ x0 ][ y0 ] = = 0 ) && ( log2TbWidth <= 2 ) && ( log2TbHeight <= 2 ) ) | |
| S1506 | **transform_skip_flag**[ x0 ][ y0 ][ cIdx ] | ae(v) |
| | ⋮ (Residual Coding Syntax) | |
| S1507 | if( cu_mts_flag[ x0 ][ y0 ] && ( cIdx = = 0 ) && !transform_skip_flag[ x0 ][ y0 ][ cIdx ] && ( ( CuPredMode[ x0 ][ y0 ] = = MODE_INTRA && numSigCoeff > 2 ) \|\| ( CuPredMode[ x0 ][ y0 ] = = MODE_INTER ) ) ) | |
| S1507 | **mts_idx**[ x0 ][ y0 ] | ae(v) |
| | } | |

*FIG. 15*

| cu_mts_flag | mts_idx | Intra | | Inter | |
|---|---|---|---|---|---|
| | | Horizontal | Vertical | Horizontal | Vertical |
| 0 | -1 | DST7 if width < height, else DCT2 | DST7 if height < width, else DCT2 | DCT2 | |
| 1 | 0 | DST7 | DST7 | DST7 | DST7 |
| | 1 | DCT8 | DST7 | DCT8 | DST7 |
| | 2 | DST7 | DCT8 | DST7 | DCT8 |
| | 3 | DCT8 | DCT8 | DCT8 | DCT8 |

*FIG. 16*

| mts_idx[ xTbY ][ yTbY ][ cIdx ] | Binarization | trTypeHor | trTypeVer |
|---|---|---|---|
| −1 | - | 0 | 0 |
| 0 | 00 | 1 | 1 |
| 1 | 01 | 2 | 1 |
| 2 | 10 | 1 | 2 |
| 3 | 11 | 2 | 2 |

| transform_unit( x0, y0, tbWidth, tbHeight, treeType ) { | **Descriptor** |
|---|---|
| if( treeType = = SINGLE_TREE \|\| treeType = = DUAL_TREE_LUMA ) | |
| **tu_cbf_luma**[ x0 ][ y0 ] | ae(v) |
| if( treeType = = SINGLE_TREE \|\| treeType = = DUAL_TREE_CHROMA ) { | |
| **tu_cbf_cb**[ x0 ][ y0 ] | ae(v) |
| **tu_cbf_cr**[ x0 ][ y0 ] | ae(v) |
| } | |
| ⋮ | |
| S1801: if( MaxMtsIdx > 0 && tu_cbf_luma[ x0 ][ y0 ] && treeType ! = DUAL_TREE_CHROMA && ( tbWidth <= 32 ) && ( tbHeight <= 32 ) ) | |
| **tu_mts_idx**[ x0 ][ y0 ] | ae(v) |
| if( tu_cbf_luma[ x0 ][ y0 ] ) | |
| residual_coding( x0, y0, log2( tbWidth ), log2( tbHeight ), 0 ) | |
| if( tu_cbf_cb[ x0 ][ y0 ] ) | |
| residual_coding( x0, y0, log2( tbWidth / 2 ), log2( tbHeight / 2 ), 1 ) | |
| if( tu_cbf_cr[ x0 ][ y0 ] ) | |
| residual_coding( x0, y0, log2( tbWidth / 2 ), log2( tbHeight / 2 ), 2 ) | |
| } | |

(b)

| residual_coding( x0, y0, log2TbWidth, log2TbHeight, cIdx ) { | **Descriptor** |
|---|---|
| ⋮ (Residual Coding Syntax) | |
| } | |

*FIG. 18*

(a) Specification of MaxMtsIdx.

| MaxMtsIdx | CuPredMode[ x0 ][ y0 ] = = MODE_INTER && sps_mts_inter_enabled_flag | CuPredMode[ x0 ][ y0 ] = = MODE_INTRA && sps_mts_intra_enabled_flag | transform_skip_enabled_flag && ( log2TbWidth <= MaxTsSize && log2TbHeight <= MaxTsSize ) |
|---|---|---|---|
| 0 | 0 | 0 | 0 |
| 1 | 0 | 0 | 1 |
| 4 | 0 | 1 | 0 |
| 4 | 1 | 0 | 0 |
| 5 | 0 | 1 | 1 |
| 5 | 1 | 0 | 1 |

(b) Specification of TrHorType and TrVerType depending on tu_mts_idx[ x0 ][ y0 ]

| tu_mts_idx[ x0 ][ y0 ] | | | TrHorType | TrVerType | IsTrafoSkip |
|---|---|---|---|---|---|
| MaxMtsIdx = = 1 | MaxMtsIdx = = 4 | MaxMtsIdx = = 5 | | | |
| 0 (0) | - | 0 (0) | −1 | −1 | 1 |
| 1 (1) | 0 (0) | 1 (10) | 0 | 0 | 0 |
| - | 1 (10) | 2 (110) | 1 | 1 | 0 |
| - | 2 (110) | 3 (1110) | 2 | 1 | 0 |
| - | 3 (1110) | 4 (11110) | 1 | 2 | 0 |
| - | 4 (1111) | 5 (11111) | 2 | 2 | 0 |

*FIG. 19*

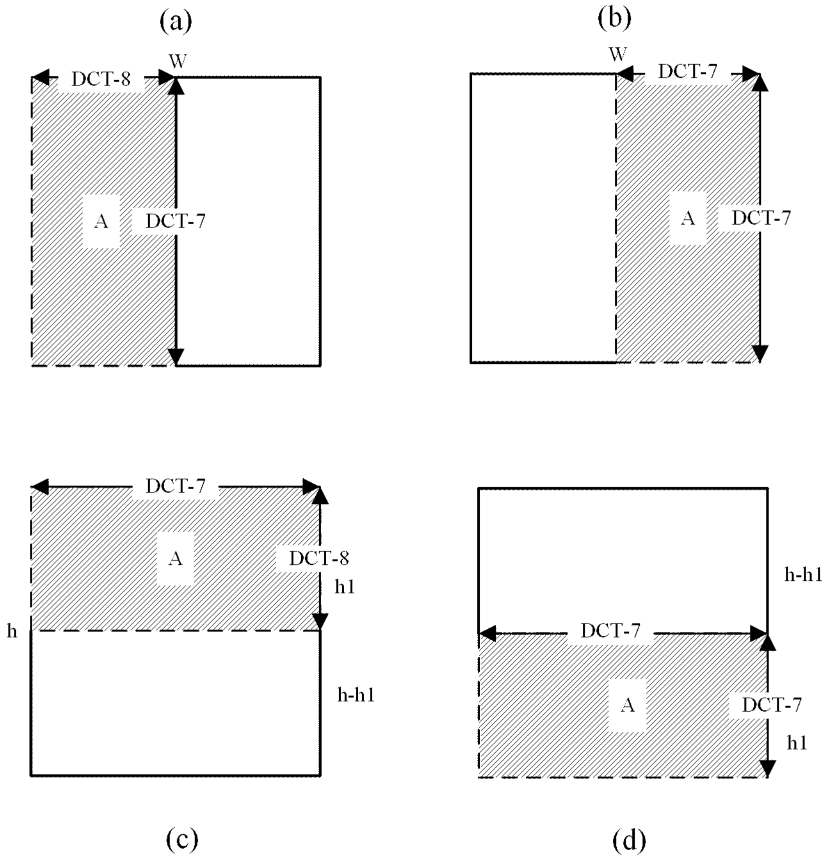

*FIG. 20*

Specification of trTypeHor and trTypeVer depending on predModeIntra

| predModeIntra | trTypeHor | trTypeVer |
|---|---|---|
| INTRA_PLANAR,<br>INTRA_ANGULAR31,<br>INTRA_ANGULAR32,<br>INTRA_ANGULAR34,<br>INTRA_ANGULAR36,<br>INTRA_ANGULAR37 | 1 | 1 |
| INTRA_DC<br>INTRA_ANGULAR33,<br>INTRA_ANGULAR35 | 0 | 0 |
| INTRA_ANGULAR2,<br>INTRA_ANGULAR4,…,INTRA_ANGULAR28,<br>INTRA_ANGULAR30,<br>INTRA_ANGULAR39,<br>INTRA_ANGULAR41,…,INTRA_ANGULAR63,<br>INTRA_ANGULAR65 | 1 | 0 |
| INTRA_ANGULAR3,<br>INTRA_ANGULAR5,…, INTRA_ANGULAR27,<br>INTRA_ANGULAR29,<br>INTRA_ANGULAR38,<br>INTRA_ANGULAR40,…,INTRA_ANGULAR64,<br>INTRA_ANGULAR66 | 0 | 1 |

*FIG. 22*

```
transform_unit( x0, y0, tbWidth, tbHeight, treeType, subTuIndex ) {                                Descriptor
  if( treeType = = SINGLE_TREE || treeType = = DUAL_TREE_LUMA ) {
    if( ( IntraSubPartitionsSplitType = = ISP_NO_SPLIT && !( cu_sbt_flag &&
          ( ( subTuIndex = = 0 && cu_sbt_pos_flag ) ||
            ( subTuIndex = = 1 && !cu_sbt_pos_flag ) ) ) ) ||                             S2301
       ( IntraSubPartitionsSplitType != ISP_NO_SPLIT &&
       ( subTuIndex < NumIntraSubPartitions − 1 || !InferTuCbfLuma ) ) )
      tu_cbf_luma[ x0 ][ y0 ]                                                                     ae(v)
    ...
  }
  if( ( treeType = = SINGLE_TREE || treeType = = DUAL_TREE_CHROMA ) {
    if( ( IntraSubPartitionsSplitType = = ISP_NO_SPLIT && !( cu_sbt_flag &&
          ( ( subTuIndex = = 0 && cu_sbt_pos_flag ) ||
            ( subTuIndex = = 1 && !cu_sbt_pos_flag ) ) ) ) ||
       ( IntraSubPartitionsSplitType != ISP_NO_SPLIT &&
         ( subTuIndex = = NumIntraSubPartitions − 1 ) ) ) {                                S2302
      tu_cbf_cb[ x0 ][ y0 ]                                                                       ae(v)
      tu_cbf_cr[ x0 ][ y0 ]                                                                       ae(v)
    }
  }
  ...
  if( tu_cbf_luma[ x0 ][ y0 ] )
    residual_coding( x0, y0, Log2( tbWidth ), Log2( tbHeight ), 0 )
  if( tu_cbf_cb[ x0 ][ y0 ] )
    residual_coding( xC, yC, Log2( wC ), Log2( hC ), 1 )
  if( tu_cbf_cr[ x0 ][ y0 ] )
    residual_coding( xC, yC, Log2( wC ), Log2( hC ), 2 )
}
```

*FIG. 23*

| transform_unit( x0, y0, tbWidth, tbHeight, treeType, subTuIndex ) { | **Descriptor** |
|---|---|
| if( treeType = = SINGLE_TREE \|\| treeType = = DUAL_TREE_LUMA ) { | |
| if( ( IntraSubPartitionsSplitType = = ISP_NO_SPLIT && !cu_sbt_) \|\| ( IntraSubPartitionsSplitType != ISP_NO_SPLIT && ( subTuIndex < NumIntraSubPartitions − 1 \|\| !InferTuCbfLuma ) ) ) | |
| **tu_cbf_luma**[ x0 ][ y0 ] | ae(v) |
| ... | |
| } | |
| if( ( treeType = = SINGLE_TREE \|\| treeType = = DUAL_TREE_CHROMA ) { | |
| if( ( IntraSubPartitionsSplitType = = ISP_NO_SPLIT && !( cu_sbt_flag && ( ( subTuIndex = = 0 && cu_sbt_pos_flag ) \|\| ( subTuIndex = = 1 && !cu_sbt_pos_flag ) ) ) ) \|\| ( IntraSubPartitionsSplitType != ISP_NO_SPLIT && ( subTuIndex = = NumIntraSubPartitions − 1 ) ) ) { | |
| **tu_cbf_cb**[ x0 ][ y0 ] | ae(v) |
| **tu_cbf_cr**[ x0 ][ y0 ] | ae(v) |
| } | |
| } | |
| ... | |
| if( tu_cbf_luma[ x0 ][ y0 ] ) | |
| residual_coding( x0, y0, Log2( tbWidth ), Log2( tbHeight ), 0 ) | |
| if( tu_cbf_cb[ x0 ][ y0 ] ) | |
| residual_coding( xC, yC, Log2( wC ), Log2( hC ), 1 ) | |
| if( tu_cbf_cr[ x0 ][ y0 ] ) | |
| residual_coding( xC, yC, Log2( wC ), Log2( hC ), 2 ) | |
| } | |

S2401 (brace spanning the luma tu_cbf rows)

S2402 (brace spanning the chroma tu_cbf rows through "if( tu_cbf_luma[ x0 ][ y0 ] )")

*FIG. 24*

| | coding_unit( x0, y0, cbWidth, cbHeight, treeType ) { | **Descriptor** |
|---|---|---|
| | ... | |
| | if( CuPredMode[ x0 ][ y0 ] = = MODE_INTRA ) { | |
| S2501 | if( sps_pcm_enabled_flag && cbWidth >= MinIpcmCbSizeY && cbWidth <= MaxIpcmCbSizeY && cbHeight >= MinIpcmCbSizeY && cbHeight <= MaxIpcmCbSizeY ) | |
| | **pcm_flag**[ x0 ][ y0 ] | ae(v) |
| | ... | |
| | } else { | |
| | if( treeType = = SINGLE_TREE \|\| treeType = = DUAL_TREE_LUMA ) { | |
| | if( ( y0 % CtbSizeY ) > 0 ) | |
| | **intra_luma_ref_idx**[ x0 ][ y0 ] | ae(v) |
| S2502 | if (intra_luma_ref_idx[ x0 ][ y0 ] = = 0 && ( cbWidth <= MaxTbSizeY && cbHeight <= MaxTbSizeY ) && ( cbWidth * cbHeight > MinTbSizeY * MinTbSizeY )) | |
| | **intra_subpartitions_mode_flag**[ x0 ][ y0 ] | ae(v) |
| | if( intra_subpartitions_mode_flag[ x0 ][ y0 ] = = 1 && cbWidth <= MaxTbSizeY && cbHeight <= MaxTbSizeY ) | |
| | **intra_subpartitions_split_flag**[ x0 ][ y0 ] | ae(v) |
| | ... | |
| | } | |
| | } else if( treeType != DUAL_TREE_CHROMA ) { /* MODE_INTER or MODE_IBC */ | |
| S2503 | ... | |
| | } | |
| | if( !pcm_flag[ x0 ][ y0 ] ) { | |
| | if( CuPredMode[ x0 ][ y0 ] != MODE_INTRA && merge_flag[ x0 ][ y0 ] = = 0 ) | |
| | **cu_cbf** | ae(v) |
| | if( cu_cbf ) { | |
| | if( CuPredMode[ x0 ][ y0 ] = = MODE_INTER && sps_sbt_enabled_flag && !ciip_flag[ x0 ][ y0 ] ) { | |
| | if( cbWidth <= MaxSbtSize && cbHeight <= MaxSbtSize ) { | |
| | allowSbtVerH = cbWidth >= 8 | |
| | allowSbtVerQ = cbWidth >= 16 | |
| | allowSbtHorH = cbHeight >= 8 | |
| | allowSbtHorQ = cbHeight >= 16 | |
| | if( allowSbtVerH \|\| allowSbtHorH \|\| allowSbtVerQ \|\| allowSbtHorQ ) | |
| S2504 | **cu_sbt_flag** | ae(v) |
| | } | |
| | if( cu_sbt_flag ) { | |
| | if( ( allowSbtVerH \|\| allowSbtHorH ) && ( allowSbtVerQ \|\| allowSbtHorQ) ) | |
| | **cu_sbt_quad_flag** | ae(v) |
| | if( ( cu_sbt_quad_flag && allowSbtVerQ && allowSbtHorQ ) \|\| ( !cu_sbt_quad_flag && allowSbtVerH && allowSbtHorH ) ) | |
| | **cu_sbt_horizontal_flag** | ae(v) |
| | **cu_sbt_pos_flag** | ae(v) |
| | } | |
| | } | |
| | transform_tree( x0, y0, cbWidth, cbHeight, treeType ) | |
| | } | |
| | } | |
| | } | |

*FIG. 25*

| | transform_tree( x0, y0, tbWidth, tbHeight , treeType) { | **Descriptor** |
|---|---|---|
| | InferTuCbfLuma = 1 | |
| | if( IntraSubPartitionsSplitType == ISP_NO_SPLIT ) { | |
| | if( tbWidth > MaxTbSizeY \|\| tbHeight > MaxTbSizeY ) { | |
| | trafoWidth = ( tbWidth > MaxTbSizeY ) ? (tbWidth / 2) : tbWidth | |
| | trafoHeight = ( tbHeight > MaxTbSizeY ) ? (tbHeight / 2) : tbHeight | |
| | transform_tree( x0, y0, trafoWidth, trafoHeight ) | |
| | if( tbWidth > MaxTbSizeY ) | |
| S2601 | transform_tree( x0 + trafoWidth, y0, trafoWidth, trafoHeight, treeType ) | |
| | if( tbHeight > MaxTbSizeY ) | |
| | transform_tree( x0, y0 + trafoHeight, trafoWidth, trafoHeight, treeType ) | |
| | if( tbWidth > MaxTbSizeY && tbHeight > MaxTbSizeY ) | |
| | transform_tree( x0 + trafoWidth, y0 + trafoHeight, trafoWidth, trafoHeight, treeType ) | |
| | } else { | |
| | transform_unit( x0, y0, tbWidth, tbHeight, treeType, 0 ) | |
| | } | |
| | } else if( cu_sbt_flag ) { | |
| | if( !cu_sbt_horizontal_flag ) { | |
| S2602 | trafoWidth = tbWidth * SbtNumFourthsTb0 / 4 | |
| | transform_unit( x0, y0, trafoWidth, tbHeight, treeType , 0 ) | |
| | transform_unit( x0 + trafoWidth, y0, tbWidth − trafoWidth , tbHeight, treeType , 1 ) | |
| | } else { | |
| | trafoHeight = tbHeight * SbtNumFourthsTb0 / 4 | |
| S2603 | transform_unit( x0, y0, tbWidth, trafoHeight, treeType , 0 ) | |
| | transform_unit( x0, y0 + trafoHeight, tbWidth, tbHeight − trafoHeight, treeType , 1 ) | |
| | } | |
| | } else if( IntraSubPartitionsSplitType == ISP_HOR_SPLIT ) { | |
| | trafoHeight = tbHeight / NumIntraSubPartitions | |
| | for( partIdx = 0; partIdx < NumIntraSubPartitions; partIdx++ ) | |
| | transform_unit( x0, y0 + trafoHeight * partIdx, tbWidth, trafoHeight, treeType, partIdx ) | |
| S2604 | } else if( IntraSubPartitionsSplitType == ISP_VER_SPLIT ) { | |
| | trafoWidth = tbWidth / NumIntraSubPartitions | |
| | for( partIdx = 0; partIdx < NumIntraSubPartitions; partIdx++ ) | |
| | transform_unit( x0 + trafoWidth * partIdx, y0, trafoWidth, tbHeight, treeType, partIdx ) | |
| | } | |
| | } | |

*FIG. 26*

| | transform_tree( x0, y0, tbWidth, tbHeight , treeType) { | Descriptor |
|---|---|---|
| | InferTuCbfLuma = 1 | |
| | if( IntraSubPartitionsSplitType = = ISP_NO_SPLIT && !cu_sbt_flag ) { | |
| | if( tbWidth > MaxTbSizeY \|\| tbHeight > MaxTbSizeY ) { | |
| | trafoWidth = ( tbWidth > MaxTbSizeY ) ? (tbWidth / 2) : tbWidth | |
| | trafoHeight = ( tbHeight > MaxTbSizeY ) ? (tbHeight / 2) : tbHeight | |
| | transform_tree( x0, y0, trafoWidth, trafoHeight ) | |
| | if( tbWidth > MaxTbSizeY ) | |
| S2701 | transform_tree( x0 + trafoWidth, y0, trafoWidth, trafoHeight, treeType ) | |
| | if( tbHeight > MaxTbSizeY ) | |
| | transform_tree( x0, y0 + trafoHeight, trafoWidth, trafoHeight, treeType ) | |
| | if( tbWidth > MaxTbSizeY && tbHeight > MaxTbSizeY ) | |
| | transform_tree( x0 + trafoWidth, y0 + trafoHeight, trafoWidth, trafoHeight, treeType ) | |
| | } else { | |
| | transform_unit( x0, y0, tbWidth, tbHeight, treeType, 0 ) | |
| | } | |
| | } else if( cu_sbt_flag ) { | |
| | if( !cu_sbt_horizontal_flag ) { | |
| S2702 | trafoWidth = tbWidth * SbtNumFourthsTb0 / 4 | |
| | transform_unit( x0, y0, trafoWidth, tbHeight, treeType , 0 ) | |
| | transform_unit( x0 + trafoWidth, y0, tbWidth − trafoWidth , tbHeight, treeType , 1 ) | |
| | } else { | |
| | trafoHeight = tbHeight * SbtNumFourthsTb0 / 4 | |
| S2703 | transform_unit( x0, y0, tbWidth, trafoHeight, treeType , 0 ) | |
| | transform_unit( x0, y0 + trafoHeight, tbWidth, tbHeight − trafoHeight, treeType , 1 ) | |
| | } | |
| | } else if( IntraSubPartitionsSplitType = = ISP_HOR_SPLIT ) { | |
| | trafoHeight = tbHeight / NumIntraSubPartitions | |
| | for( partIdx = 0; partIdx < NumIntraSubPartitions; partIdx++ ) | |
| | transform_unit( x0, y0 + trafoHeight * partIdx, tbWidth, trafoHeight, treeType, partIdx ) | |
| S2704 | } else if( IntraSubPartitionsSplitType = = ISP_VER_SPLIT ) { | |
| | trafoWidth = tbWidth / NumIntraSubPartitions | |
| | for( partIdx = 0; partIdx < NumIntraSubPartitions; partIdx++ ) | |
| | transform_unit( x0 + trafoWidth * partIdx, y0, trafoWidth, tbHeight, treeType, partIdx ) | |
| | } | |
| | } | |

*FIG. 27*

| transform_tree( x0, y0, tbWidth, tbHeight , treeType) { | Descriptor |
|---|---|
| InferTuCbfLuma = 1 | |
| if( cu_sbt_flag ) { | |
| if( !cu_sbt_horizontal_flag ) { | |
| trafoWidth = tbWidth * SbtNumFourthsTb0 / 4 | |
| transform_unit( x0, y0, trafoWidth, tbHeight, treeType , 0 ) | |
| transform_unit( x0 + trafoWidth, y0, tbWidth − trafoWidth , tbHeight, treeType , 1 ) | |
| } else { | |
| trafoHeight = tbHeight * SbtNumFourthsTb0 / 4 | |
| transform_unit( x0, y0, tbWidth, trafoHeight, treeType , 0 ) | |
| transform_unit( x0, y0 + trafoHeight, tbWidth, tbHeight − trafoHeight, treeType , 1 ) | |
| } | |
| } else if( IntraSubPartitionsSplitType = = ISP_NO_SPLIT ) { | |
| if( tbWidth > MaxTbSizeY \|\| tbHeight > MaxTbSizeY ) { | |
| trafoWidth = ( tbWidth > MaxTbSizeY ) ? (tbWidth / 2) : tbWidth | |
| trafoHeight = ( tbHeight > MaxTbSizeY ) ? (tbHeight / 2) : tbHeight | |
| transform_tree( x0, y0, trafoWidth, trafoHeight ) | |
| if( tbWidth > MaxTbSizeY ) | |
| transform_tree( x0 + trafoWidth, y0, trafoWidth, trafoHeight, treeType ) | |
| if( tbHeight > MaxTbSizeY ) | |
| transform_tree( x0, y0 + trafoHeight, trafoWidth, trafoHeight, treeType ) | |
| if( tbWidth > MaxTbSizeY && tbHeight > MaxTbSizeY ) | |
| transform_tree( x0 + trafoWidth, y0 + trafoHeight, trafoWidth, trafoHeight, treeType ) | |
| } else { | |
| transform_unit( x0, y0, tbWidth, tbHeight, treeType, 0 ) | |
| } | |
| } else if( IntraSubPartitionsSplitType = = ISP_HOR_SPLIT ) { | |
| trafoHeight = tbHeight / NumIntraSubPartitions | |
| for( partIdx = 0; partIdx < NumIntraSubPartitions; partIdx++ ) | |
| transform_unit( x0, y0 + trafoHeight * partIdx, tbWidth, trafoHeight, treeType, partIdx ) | |
| } else if( IntraSubPartitionsSplitType = = ISP_VER_SPLIT ) { | |
| trafoWidth = tbWidth / NumIntraSubPartitions | |
| for( partIdx = 0; partIdx < NumIntraSubPartitions; partIdx++ ) | |
| transform_unit( x0 + trafoWidth * partIdx, y0, trafoWidth, tbHeight, treeType, partIdx ) | |
| } | |
| } | |

METHOD AND DEVICE FOR PROCESSING VIDEO SIGNAL USING MULTIPLE TRANSFORM KERNELS

CROSS-REFERENCE TO RELATED APPLICATIONS

This application is a continuation of pending PCT International Application No. PCT/KR2020/000638, which was filed on Jan. 13, 2020, and which claims priority under 35 U.S.C 119(a) to Korean Patent Application No. 10-2019-0004278 filed with the Korean Intellectual Property Office on Jan. 12, 2019, Korean Patent Application No. 10-2019-0007044 filed with the Korean Intellectual Property Office on Jan. 18, 2019, Korean Patent Application No. 10-2019-0027876 filed with the Korean Intellectual Property Office on Mar. 12, 2019, and Korean Patent Application No. 10-2019-0036421 filed with the Korean Intellectual Property Office on Mar. 29, 2019. The disclosures of the above patent applications are incorporated herein by reference in their entirety.

TECHNICAL FIELD

The present disclosure relates to a method and an apparatus for processing a video signal and, more particularly, to a video signal processing method and apparatus for encoding and decoding a video signal.

BACKGROUND ART

Compression coding refers to a series of signal processing techniques for transmitting digitized information through a communication line or storing information in a form suitable for a storage medium. An object of compression encoding includes objects such as voice, video, and text, and in particular, a technique for performing compression encoding on an image is referred to as video compression. Compression coding for a video signal is performed by removing excess information in consideration of spatial correlation, temporal correlation, and stochastic correlation. However, with the recent development of various media and data transmission media, a more efficient video signal processing method and apparatus are required.

DETAILED DESCRIPTION OF THE INVENTION

Technical Problem

An objective of the present disclosure is to improve coding efficiency of a video signal. Specifically, the present disclosure has an objective to improve coding efficiency using a transform kernel suitable for a transform block.

Technical Solution

In order to solve the above problems, the present disclosure provides a video signal processing device and a video signal processing method as follows.

According to an embodiment of the present disclosure, there is provided a method for processing a video signal, which includes the steps of: obtaining an intra sub-partitions (ISP) mode flag indicating whether or not an ISP mode is applied to a current block from the video signal; if the ISP mode is applied to the current block, obtaining an ISP partitioning flag indicating a partitioning direction of the current block from the video signal; partitioning the current block into a plurality of transform blocks on the basis of the partitioning direction; generating residual blocks of the transform blocks by performing inverse transformation on each of the transform blocks; and restoring the current block on the basis of the residual blocks, wherein the step of generating the residual block may include the steps of: determining a horizontal transform type applied in the horizontal direction of the current transform block from among a plurality of predefined transform types on the basis of the width of the current transform block regardless of an intra prediction mode of the current block; determining a vertical transform type applied in the vertical direction of the current transform block from among the plurality of predefined transform types on the basis of the height of the current transform block regardless of the intra prediction mode of the current block; and performing inverse transformation on the current transform block using the horizontal transform type and the vertical transform type.

As an embodiment, the step of determining the horizontal transform type may include the steps of: if the width of the current transform block is less than a first threshold or greater than a second threshold, determining the horizontal transform type to be a first transform type; and if the width of the current transform block is greater than or equal to the first threshold and less than or equal to the second threshold, determining the horizontal transform type to be a second transform type.

As an embodiment, the step of determining the vertical transform type may include the steps of: if the height of the current transform block is less than a first threshold or greater than a second threshold, determining the vertical transform type to be a first transform type; and if the height of the current transform block is greater than or equal to the first threshold and less than or equal to the second threshold, determining the vertical transform type to be a second transform type.

As an embodiment, the first transform type may be defined as a transform kernel based on a discrete cosine transform type-2 (DCT-2), and the second transform type may be defined as a transform kernel based on a discrete sine transform type-7 (DST-7).

As an embodiment, the first threshold may be defined on the basis of a minimum transform block size of a luma component.

As an embodiment, the second threshold may be defined on the basis of a maximum size of the second transform type used in the ISP mode.

As an embodiment, the first threshold may be defined as 4, and the second threshold may be defined as 16.

As an embodiment, the horizontal transform type may be determined on the basis of the width of the current transform block regardless of the height of the current transform block, and the vertical transform type may be determined on the basis of the height of the current transform block regardless of the width of the current transform block.

According to an embodiment of the present disclosure, there is provided a device for processing a video signal, which includes a processor, wherein the processor is configured to: obtain an intra sub-partitions (ISP) mode flag indicating whether or not an ISP mode is applied to a current block from the video signal; if the ISP mode is applied to the current block, obtain an ISP partitioning flag indicating a partitioning direction of the current block from the video signal; partition the current block into a plurality of transform blocks on the basis of the partitioning direction; generate residual blocks of the transform blocks by performing inverse transformation on each of the transform blocks; and reconstruct the current block on the basis of the residual blocks, and wherein the processor is configured to: determine a horizontal transform type applied in the horizontal direction of the current transform block from among a plurality of predefined transform types on the basis of the width of the current transform block regardless of an intra prediction mode of the current block; determine a vertical transform type applied in the vertical direction of the current transform block from among the plurality of predefined transform types on the basis of the height of the current transform block regardless of the intra prediction mode of the current block; and perform inverse transformation on the current transform block using the horizontal transform type and the vertical transform type, thereby generating the residual block.

As an embodiment, the processor may be configured to: if the width of the current transform block is less than a first threshold or greater than a second threshold, determine the horizontal transform type to be a first transform type; and if the width of the current transform block is greater than or equal to the first threshold and less than or equal to the second threshold, determine the horizontal transform type to be a second transform type.

As an embodiment, the processor may be configured to: if the height of the current transform block is less than a first threshold or greater than a second threshold, determine the vertical transform type to be a first transform type; and if the height of the current transform block is greater than or equal to the first threshold and less than or equal to the second threshold, determine the vertical transform type to be a second transform type.

As an embodiment, the first transform type may be defined as a transform kernel based on a discrete cosine transform type-2 (DCT-2), and the second transform type may be defined as a transform kernel based on a discrete sine transform type-7 (DST-7).

As an embodiment, the first threshold may be defined on the basis of a minimum transform block size of a luma component.

As an embodiment, the second threshold may be defined on the basis of a maximum size of the second transform type used in the ISP mode.

As an embodiment, the first threshold may be defined as 4, and the second threshold may be defined as 16.

As an embodiment, the horizontal transform type may be determined on the basis of the width of the current transform block regardless of the height of the current transform block, and the vertical transform type may be determined on the basis of the height of the current transform block regardless of the width of the current transform block.

According to an embodiment of the present disclosure, there is provided a method for processing a video signal, which includes the steps of: encoding an intra sub-partitions (ISP) mode flag indicating whether or not an ISP mode is applied to a current block; if the ISP mode is applied to the current block, encoding an ISP partitioning flag indicating a partitioning direction of the current block; partitioning the current block into a plurality of blocks on the basis of the partitioning direction; generating a transform block of the partitioned blocks by performing transformation of a residual signal of the partitioned blocks; and generating a bitstream by encoding the transform block, wherein the step of generating the transform block may include the steps of: determining a horizontal transform type applied in the horizontal direction of the current transform block from among a plurality of predefined transform types on the basis of the width of the current transform block regardless of an intra prediction mode of the current block; determining a vertical transform type applied in the vertical direction of the current transform block from among the plurality of predefined transform types on the basis of the height of the current transform block regardless of the intra prediction mode of the current block; and performing transformation on the current transform block using the horizontal transform type and the vertical transform type.

According to an embodiment of the present disclosure, there is provided a non-transitory computer-executable medium storing computer-executable components configured to be executed by one or more processors of a computing device, wherein the computer-executable components may be configured to: obtain an intra sub-partitions (ISP) mode flag indicating whether or not an ISP mode is applied to a current block; if the ISP mode is applied to the current block, obtain an ISP partitioning flag indicating a partitioning direction of the current block; partition the current block into a plurality of transform blocks on the basis of the partitioning direction; generate residual blocks of the transform blocks by performing inverse transformation on each of the transform blocks; and reconstruct the current block on the basis of the residual blocks, and wherein computer-executable components may be configured to: determine a horizontal transform type applied in the horizontal direction of the current transform block from among a plurality of predefined transform types on the basis of the width of the current transform block regardless of an intra prediction mode of the current block; determine a vertical transform type applied in the vertical direction of the current transform block from among the plurality of predefined transform types on the basis of the height of the current transform block regardless of the intra prediction mode of the current block; and perform inverse transformation on the current transform block using the horizontal transform type and the vertical transform type, thereby generating the residual block.

According to an embodiment of the present disclosure, there is provided a method for processing a video signal, which includes the steps of: obtaining a first syntax element indicating whether or not only a predefined first transform kernel is able to be used in a current sequence; if it is not the case where only the first transform kernel is able to be used in the current sequence, obtaining a second syntax element indicating whether or not a multiple transform selection (MTS) mode is able to be used in the current sequence, the MTS mode indicating a mode for performing transformation using a specific transform kernel among a plurality of transform kernels; determining a transform kernel applied in horizontal and vertical directions of a current block from among the plurality of transform kernels on the basis of the first syntax element and the second syntax element; and obtaining a residual signal of the current block by performing inverse transformation on the current block using the determined transform kernel.

As an embodiment, in the step of determining the transform kernel, if the first syntax element indicates that only the first transform kernel is able to be used in the current sequence, the first transform kernel may be determined to be the transform kernel applied in the horizontal and vertical directions.

As an embodiment, in the step of determining the transform kernel, if the second syntax element indicates that the MTS mode is able to be used in the current sequence, an MTS index indicating a combination of the transform kernels applied in the horizontal and vertical directions of the current block, among the plurality of transform kernels, may be obtained.

As an embodiment, the step of determining the transform kernel may include a step of, if the second syntax element indicates that the MTS mode is able to be used in the current sequence, inferring a variable indicating whether or not an implicit MTS mode is able to be used in the current block as 0, wherein the implicit MTS mode may represent a mode for determining a combination of transform kernels applied in the horizontal and vertical directions of the current block, among the plurality of transform kernels, on the basis of the width and the height of the transform block.

As an embodiment, the step of determining the transform kernel may include a step of, if the second syntax element indicates that the MTS mode is not able to be used in the current sequence, determining whether or not the implicit MTS mode is able to be used in the current block, wherein the implicit MTS mode may represent a mode for determining a combination of transform kernels applied in the horizontal and vertical directions of the current block, among the plurality of transform kernels, on the basis of the width and the height of the transform block.

As an embodiment, the first transform kernel may be defined as a DCT-2-based transform kernel.

According to an embodiment of the present disclosure, there is provided a device for processing a video signal, which includes a processor, wherein the processor may be configured to: obtain a first syntax element indicating whether or not only a predefined first transform kernel is able to be used in a current sequence; if it is not the case where only the first transform kernel is able to be used in the current sequence, obtain a second syntax element indicating whether or not a multiple transform selections (MTS) mode is able to be used in the current sequence, the MTS mode indicating a mode for performing transformation using a specific transform kernel among a plurality of transform kernels; determine a transform kernel applied in horizontal and vertical directions of a current block from among the plurality of transform kernels on the basis of the first syntax element and the second syntax element; and obtain a residual signal of the current block by performing inverse transformation on the current block using the determined transform kernel.

As an embodiment, if the first syntax element indicates that only the first transform kernel is able to be used in the current sequence, the processor may determine the first transform kernel to be the transform kernel applied in the horizontal and vertical directions.

As an embodiment, if the second syntax element indicates that the MTS mode is able to be used in the current sequence, the processor may obtain an MTS index indicating a combination of the transform kernels applied in the horizontal and vertical directions of the current block, among the plurality of transform kernels.

As an embodiment, if the second syntax element indicates that the MTS mode is able to be used in the current sequence, the processor may infer a variable indicating whether or not an implicit MTS mode is able to be used in the current block as 0, wherein the implicit MTS mode may represent a mode for determining a combination of transform kernels applied in the horizontal and vertical directions of the current block, among the plurality of transform kernels, on the basis of the width and the height of the transform block.

As an embodiment, if the second syntax element indicates that the MTS mode is not able to be used in the current sequence, the processor may determine whether or not the implicit MTS mode is able to be used in the current block, wherein the implicit MTS mode may represent a mode for determining a combination of transform kernels applied in the horizontal and vertical directions of the current block, among the plurality of transform kernels, on the basis of the width and the height of the transform block.

As an embodiment, the first transform kernel may be defined as a DCT-2-based transform kernel.

According to an embodiment of the present disclosure, there is provided a method for processing a video signal, which includes the steps of: encoding a first syntax element indicating whether or not only a predefined first transform kernel is able to be used in a current sequence; if it is not the case where only the first transform kernel is able to be used in the current sequence, encoding a second syntax element indicating whether or not a multiple transform selections (MTS) mode is able to be used in the current sequence, the MTS mode indicating a mode for performing transformation using a specific transform kernel among a plurality of transform kernels; determining a transform kernel applied in horizontal and vertical directions of a current block from among the plurality of transform kernels on the basis of the first syntax element and the second syntax element; and obtaining a transform block of the current block by performing transformation on a residual signal of the current block using the determined transform kernel.

According to an embodiment of the present disclosure, there is provided a method for processing a video signal, which includes the steps of: if a current block is in an intra prediction mode, identifying whether or not an intra sub-partitions (ISP) mode is applied to the current block, the ISP mode indicating a mode for partitioning the current block into a plurality of rectangular transform blocks; if the current block is in an inter prediction mode, identifying whether or not a sub-block transform (SBT) mode is applied to the current block, the SBT indicating a mode in which transformation is performed only on some sub-blocks among a plurality of sub-blocks partitioned from the current block; if the ISP mode is not applied to the current block, and if the SBT mode is not applied to the current block, performing transform tree partitioning on the current block on the basis of size information and a maximum transform size of the current block; and generating a residual signal of a transform unit by performing transformation on the transform unit determined on the basis of the transform tree partitioning.

As an embodiment, the transform tree partitioning may be made by recursively performing at least one of horizontal partitioning and vertical partitioning on the current block until the width and the height of the current block are less than or equal to the maximum transform size.

As an embodiment, the step of performing the transform tree partitioning may further include a step of, if the SBT mode is applied to the current block, performing the transform tree partitioning for the current block on the basis of sub-block partition information of the current block.

As an embodiment, the step of performing the transform tree partitioning may further include a step of, if the ISP mode is applied to the current block, performing the transform tree partitioning for the current block on the basis of an ISP partitioning type of the current block.

According to an embodiment of the present disclosure, there is provided a device for processing a video signal, which includes a processor, wherein the processor may be configured to: if a current block is in an intra prediction mode, identify whether or not an intra sub-partitions (ISP) mode is applied to the current block, the ISP mode indicating a mode for partitioning the current block into a plurality of rectangular transform blocks; if the current block is in an inter prediction mode, identify whether or not a sub-block transform (SBT) mode is applied to the current block, the SBT indicating a mode in which transformation is performed only on some sub-blocks among a plurality of sub-blocks partitioned from the current block; if the ISP mode is not applied to the current block, and if the SBT mode is not applied to the current block, perform transform tree partitioning on the current block on the basis of size information and a maximum transform size of the current block; and generate a residual signal of a transform unit by performing transformation on the transform unit determined on the basis of the transform tree partitioning.

As an embodiment, the transform tree partitioning may be made by recursively performing at least one of horizontal partition and vertical partition on the current block until the width and the height of the current block are less than or equal to the maximum transform size.

As an embodiment, if the SBT mode is applied to the current block, the processor may perform the transform tree partitioning for the current block on the basis of sub-block partition information of the current block.

As an embodiment, if the ISP mode is applied to the current block, the processor may perform the transform tree partitioning for the current block on the basis of an ISP partitioning type of the current block.

According to an embodiment of the present disclosure, there is provided a method for processing a video signal, which includes the steps of: if a current block is in an intra prediction mode, determining whether or not an intra sub-partitions (ISP) mode is applied to the current block, the ISP mode indicating a mode for partitioning the current block into a plurality of rectangular transform blocks; if the current block is in an inter prediction mode, determining whether or not a sub-block transform (SBT) mode is applied to the current block, the SBT indicating a mode in which transformation is performed only on some sub-blocks among a plurality of sub-blocks partitioned from the current block; if the ISP mode is not applied to the current block, and if the SBT mode is not applied to the current block, performing transform tree partitioning on the current block on the basis of size information and a maximum transform size of the current block; and generating a residual signal of a transform unit by performing transformation on the transform unit determined on the basis of the transform tree partitioning.

Advantageous Effects

According to an embodiment of the present disclosure, it is possible to improve coding efficiency of a video signal. In addition, according to an embodiment of the present disclosure, it is possible to select a transform kernel suitable for a current transform block.

BRIEF DESCRIPTION OF THE DRAWINGS

FIG. 8 is a diagram specifically illustrating a method for transforming a residual signal by an encoder.

FIG. 9 is a diagram specifically illustrating a method for obtaining a residual signal by inverse transforming a transform coefficient by an encoder and a decoder.

FIG. 10 is a diagram showing basis functions corresponding to respective transform types.

FIG. 13 is a diagram illustrating a method of configuring a candidate transform set according to a prediction mode of a current block.

FIG. 14 shows a horizontal transform kernel and a vertical transform kernel determined according to a set index.

FIG. 15 is a diagram illustrating a method of obtaining transform-related information according to an embodiment of the present disclosure.

FIG. 16 is a diagram illustrating a method of selecting a transform kernel on the basis of the shape of a block according to an embodiment of the present disclosure.

FIG. 17 is a diagram illustrating a method of signaling and determining a transform kernel according to an embodiment of the present disclosure.

FIG. 18 shows a syntax structure for obtaining information related to multiple transform selections and transform skip according to an embodiment of the present disclosure, and FIG. 19 is a diagram illustrating information related to multiple transform selections and transform skip according to an embodiment of the present disclosure.

FIG. 20 is a diagram illustrating a sub-block transform (SBT) method according to an embodiment of the present disclosure.

FIG. 22 is a diagram illustrating a method of selecting a transform kernel applied to a partitioned transform unit in the case where an intra sub-partitions mode is applied according to an embodiment of the present disclosure.

FIGS. 23 and 24 are diagrams illustrating a process of obtaining information on whether or not a non-zero transform coefficient exists in a transform unit syntax structure in the case where SBT is applied according to an embodiment of the present disclosure.

FIG. 25 is a diagram illustrating a coding unit syntax structure for processing syntax elements related to a coding unit according to an embodiment of the present disclosure.

FIG. 26 is a diagram illustrating a transform tree syntax structure according to an embodiment of the present disclosure.

FIG. 27 is a diagram illustrating a transform tree syntax structure according to another embodiment of the present disclosure.

FIG. 28 is a diagram illustrating a transform tree syntax structure according to another embodiment of the present disclosure.

MODE FOR CARRYING OUT THE INVENTION

Terms used in this specification may be currently widely used general terms in consideration of functions in the present invention but may vary according to the intents of those skilled in the art, customs, or the advent of new technology. Additionally, in certain cases, there may be terms the applicant selects arbitrarily and, in this case, their meanings are described in a corresponding description part of the present invention. Accordingly, terms used in this specification should be interpreted based on the substantial meanings of the terms and contents over the whole specification.

In this specification, some terms may be interpreted as follows. Coding may be interpreted as encoding or decoding in some cases. In the present specification, an apparatus for generating a video signal bitstream by performing encoding (coding) of a video signal is referred to as an encoding apparatus or an encoder, and an apparatus that performs decoding (decoding) of a video signal bitstream to reconstruct a video signal is referred to as a decoding apparatus or decoder. In addition, in this specification, the video signal processing apparatus is used as a term of a concept including both an encoder and a decoder. Information is a term including all values, parameters, coefficients, elements, etc. In some cases, the meaning is interpreted differently, so the present invention is not limited thereto. 'Unit' is used as a meaning to refer to a basic unit of image processing or a specific position of a picture, and refers to an image region including both a luma component and a chroma component. In addition, 'block' refers to an image region including a specific component among luma components and chroma components (i.e., Cb and Cr). However, depending on the embodiment, terms such as 'unit', 'block', 'partition' and 'region' may be used interchangeably. In addition, in this specification, a unit may be used as a concept including all of a coding unit, a prediction unit, and a transform unit. The picture indicates a field or frame, and according to an embodiment, the terms may be used interchangeably.

Figure 1:
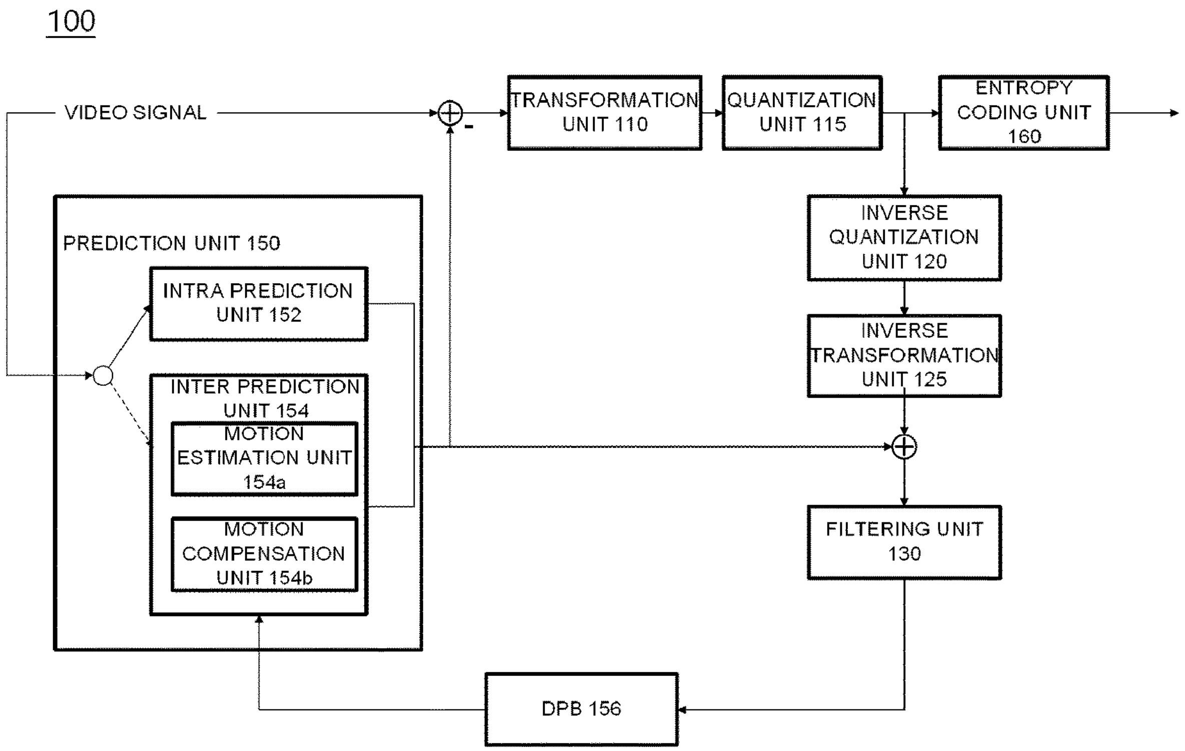
FIG. 1 is a schematic block diagram of a video signal encoding apparatus according to an embodiment of the present invention.

FIG. 1 is a schematic block diagram of a video signal encoding apparatus according to an embodiment of the present invention. Referring to FIG. 1, the encoding apparatus 100 of the present invention includes a transformation unit 110, a quantization unit 115, an inverse quantization unit 120, an inverse transformation unit 125, a filtering unit 130, a prediction unit 150, and an entropy coding unit 160.

The transformation unit 110 obtains a value of a transform coefficient by transforming a residual signal, which is a difference between the inputted video signal and the predicted signal generated by the prediction unit 150. For example, a Discrete Cosine Transform (DCT), a Discrete Sine Transform (DST), or a Wavelet Transform can be used. The DCT and DST perform transformation by splitting the input picture signal into blocks. In the transformation, coding efficiency may vary according to the distribution and characteristics of values in the transformation region. The quantization unit 115 quantizes the value of the transform coefficient value outputted from the transformation unit 110.

In order to improve coding efficiency, instead of coding the picture signal as it is, a method of predicting a picture using a region already coded through the prediction unit 150 and obtaining a reconstructed picture by adding a residual value between the original picture and the predicted picture to the predicted picture is used. In order to prevent mismatches in the encoder and decoder, information that can be used in the decoder should be used when performing prediction in the encoder. For this, the encoder performs a process of reconstructing the encoded current block again. The inverse quantization unit 120 inverse-quantizes the value of the transform coefficient, and the inverse transformation unit 125 reconstructs the residual value using the inverse quantized transform coefficient value. Meanwhile, the filtering unit 130 performs filtering operations to improve the quality of the reconstructed picture and to improve the coding efficiency. For example, a deblocking filter, a sample adaptive offset (SAO), and an adaptive loop filter may be included. The filtered picture is outputted or stored in a decoded picture buffer (DPB) 156 for use as a reference picture.

In order to improve coding efficiency, a picture signal is not coded as it is, but a method of predicting a picture via the prediction unit 150 by using a region that has been already coded, and adding, to the predicted picture, a residual value between an original picture and the predicted picture, thereby obtaining a reconstructed picture. The intra prediction unit 152 performs intra prediction within a current picture, and the inter prediction unit 154 predicts the current picture by using a reference picture stored in the decoding picture buffer 156. The intra prediction unit 152 performs intra prediction from reconstructed regions in the current picture, and transfers intra coding information to the entropy coding unit 160. The inter prediction unit 154 may include a motion estimation unit **154*a* and a motion compensation unit 154*b*. The motion estimation unit 154*a* obtains a motion vector value of the current region by referring to a specific reconstructed region. The motion estimation unit 154*a* transfers location information (reference frame, motion vector, etc.) of the reference region to the entropy coding unit 160 so as to enable the location information to be included in a bitstream. The motion compensation unit 154*b* performs inter motion compensation by using the motion vector value transferred from the motion estimation unit 154*a***.

The prediction unit 150 includes an intra prediction unit 152 and an inter prediction unit 154. The intra prediction unit 152 performs intra prediction in the current picture, and the inter prediction unit 154 performs inter prediction to predict the current picture by using the reference picture stored in the DBP 156. The intra prediction unit 152 performs intra prediction from reconstructed samples in the current picture, and transfers intra encoding information to the entropy coding unit 160. The intra encoding information may include at least one of an intra prediction mode, a most probable mode (MPM) flag, and an MPM index. The intra encoding information may include information on a reference sample. The inter prediction unit 154 may include the motion estimation unit **154*a* and the motion compensation unit 154*b*. The motion estimation unit 154*a* obtains a motion vector value of the current region by referring to a specific region of the reconstructed reference picture. The motion estimation unit 154*a* transfers a motion information set (reference picture index, motion vector information, etc.) for the reference region to the entropy coding unit 160. The motion compensation unit 154*b* performs motion compensation by using the motion vector value transferred from the motion estimation unit 154*a*. The inter prediction unit 154 transfers inter encoding information including motion information on the reference region to the entropy coding unit 160**.

According to an additional embodiment, the prediction unit 150 may include an intra-block copy (BC) prediction unit (not shown). The intra-BC prediction unit performs intra-BC prediction based on reconstructed samples in the current picture, and transmits intra-BC encoding information to the entropy coding unit 160. The intra-BC prediction unit obtains a block vector value indicating a reference area used for predicting a current area with reference to a specific area in the current picture. The intra-BC prediction unit may perform intra-BC prediction using the obtained block vector value. The intra-BC prediction unit transmits intra-BC encoding information to the entropy coding unit 160. The intra-BC encoding information may include block vector information.

When the picture prediction described above is performed, the transformation unit 110 transforms a residual value between the original picture and the predicted picture to obtain a transform coefficient value. In this case, the transformation may be performed in a specific block unit within a picture, and the size of a specific block may be varied within a preset range. The quantization unit 115 quantizes the transform coefficient value generated in the transformation unit 110 and transmits it to the entropy coding unit 160.

The entropy coding unit 160 entropy-codes information indicating a quantized transform coefficient, intra-encoding information, inter-encoding information, and the like to generate a video signal bitstream. In the entropy coding unit 160, a variable length coding (VLC) scheme, an arithmetic coding scheme, etc. may be used. The variable length coding (VLC) scheme includes transforming input symbols into consecutive codewords, and a length of a codeword may be variable. For example, frequently occurring symbols are represented by a short codeword, and infrequently occurring symbols are represented by a long codeword. A context-based adaptive variable length coding (CAVLC) scheme may be used as a variable length coding scheme. Arithmetic coding may transform continuous data symbols into a single prime number, wherein arithmetic coding may obtain an optimal bit required for representing each symbol. A context-based adaptive binary arithmetic code (CABAC) may be used as arithmetic coding. For example, the entropy coding unit 160 may binarize information indicating a quantized transform coefficient. The entropy coding unit 160 may generate a bitstream by arithmetic-coding the binary information.

The generated bitstream is encapsulated using a network abstraction layer (NAL) unit as a basic unit. The NAL unit includes an integer number of coded coding tree units. In order to decode a bitstream in a video decoder, first, the bitstream must be separated in NAL units, and then each separated NAL unit must be decoded. Meanwhile, information necessary for decoding a video signal bitstream may be transmitted through an upper level set of Raw Byte Sequence Payload (RBSP) such as Picture Parameter Set (PPS), Sequence Parameter Set (SPS), Video Parameter Set (VPS), and the like.

Meanwhile, the block diagram of FIG. 1 shows an encoding apparatus 100 according to an embodiment of the present invention, and separately displayed blocks logically distinguish and show the elements of the encoding apparatus 100. Accordingly, the elements of the above-described encoding apparatus 100 may be mounted as one chip or as a plurality of chips depending on the design of the device. According to an embodiment, the operation of each element of the above-described encoding apparatus 100 may be performed by a processor (not shown).

Figure 2:
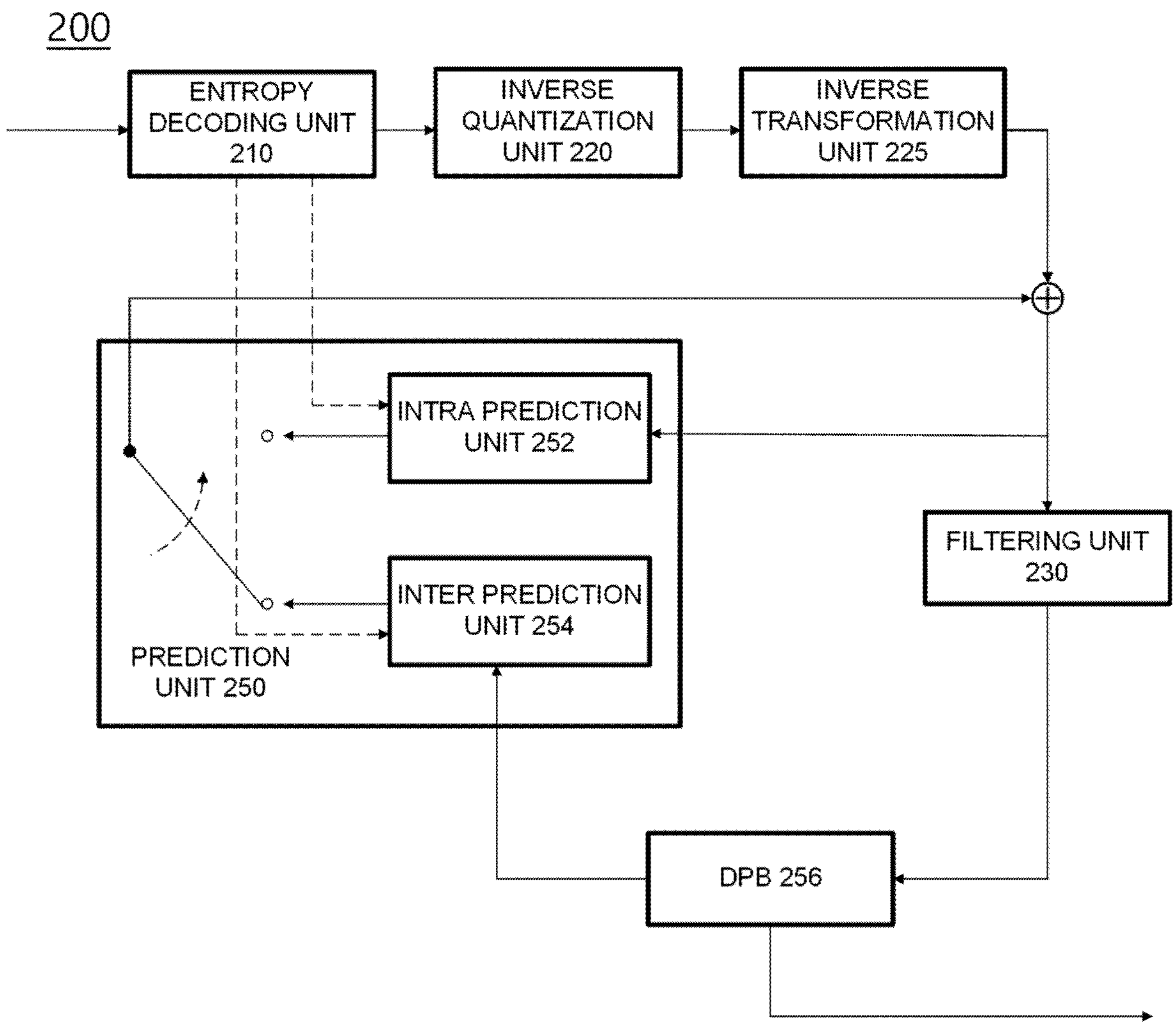
FIG. 2 is a schematic block diagram of a video signal decoding apparatus according to an embodiment of the present invention.

FIG. 2 is a schematic block diagram of a video signal decoding apparatus 200 according to an embodiment of the present invention. Referring to FIG. 2, the decoding apparatus 200 of the present invention includes an entropy decoding unit 210, an inverse quantization unit 220, an inverse transformation unit 225, a filtering unit 230, and a prediction unit 250.

The entropy decoding unit 210 entropy-decodes a video signal bitstream to extract transform coefficient information, intra encoding information, inter encoding information, and the like for each region. For example, the entropy decoding unit 210 may obtain a binarization code for transform coefficient information of a specific region from the video signal bitstream. The entropy decoding unit 210 obtains a quantized transform coefficient by inverse-binarizing a binary code. The inverse quantization unit 220 inverse-quantizes the quantized transform coefficient, and the inverse transformation unit 225 reconstructs a residual value by using the inverse-quantized transform coefficient. The video signal processing device 200 reconstructs an original pixel value by summing the residual value obtained by the inverse transformation unit 225 with a prediction value obtained by the prediction unit 250.

Meanwhile, the filtering unit 230 performs filtering on a picture to improve image quality. This may include a deblocking filter for reducing block distortion and/or an adaptive loop filter for removing distortion of the entire picture. The filtered picture is outputted or stored in the DPB 256 for use as a reference picture for the next picture.

The prediction unit 250 includes an intra prediction unit 252 and an inter prediction unit 254. The prediction unit 250 generates a prediction picture by using the encoding type decoded through the entropy decoding unit 210 described above, transform coefficients for each region, and intra/inter encoding information. In order to reconstruct a current block in which decoding is performed, a decoded region of the current picture or other pictures including the current block may be used. In a reconstruction, only a current picture, that is, a picture (or, tile/slice) that performs intra prediction or intra BC prediction, is called an intra picture or an I picture (or, tile/slice), and a picture (or, tile/slice) that can perform all of intra prediction, inter prediction, and intra BC prediction is called an inter picture (or, tile/slice). In order to predict sample values of each block among inter pictures (or, tiles/slices), a picture (or, tile/slice) using up to one motion vector and a reference picture index is called a predictive picture or P picture (or, tile/slice), and a picture (or tile/slice) using up to two motion vectors and a reference picture index is called a bi-predictive picture or a B picture (or tile/slice). In other words, the P picture (or, tile/slice) uses up to one motion information set to predict each block, and the B picture (or, tile/slice) uses up to two motion information sets to predict each block. Here, the motion information set includes one or more motion vectors and one reference picture index.

The intra prediction unit 252 generates a prediction block using the intra encoding information and reconstructed samples in the current picture. As described above, the intra encoding information may include at least one of an intra prediction mode, a Most Probable Mode (MPM) flag, and an MPM index. The intra prediction unit 252 predicts the sample values of the current block by using the reconstructed samples located on the left and/or upper side of the current block as reference samples. In this disclosure, reconstructed samples, reference samples, and samples of the current block may represent pixels. Also, sample values may represent pixel values.

According to an embodiment, the reference samples may be samples included in a neighboring block of the current block. For example, the reference samples may be samples adjacent to a left boundary of the current block and/or samples may be samples adjacent to an upper boundary. Also, the reference samples may be samples located on a line within a predetermined distance from the left boundary of the current block and/or samples located on a line within a predetermined distance from the upper boundary of the current block among the samples of neighboring blocks of the current block. In this case, the neighboring block of the current block may include the left (L) block, the upper (A) block, the below left (BL) block, the above right (AR) block, or the above left (AL) block.

The inter prediction unit 254 generates a prediction block using reference pictures and inter encoding information stored in the DPB 256. The inter coding information may include motion information set (reference picture index, motion vector information, etc.) of the current block for the reference block. Inter prediction may include L0 prediction, L1 prediction, and bi-prediction. L0 prediction means prediction using one reference picture included in the L0 picture list, and L1 prediction means prediction using one reference picture included in the L1 picture list. For this, one set of motion information (e.g., motion vector and reference picture index) may be required. In the bi-prediction method, up to two reference regions may be used, and the two reference regions may exist in the same reference picture or may exist in different pictures. That is, in the bi-prediction method, up to two sets of motion information (e.g., a motion vector and a reference picture index) may be used and two motion vectors may correspond to the same reference picture index or different reference picture indexes. In this case, the reference pictures may be displayed (or outputted) both before and after the current picture in time aspect. According to an embodiment, two reference regions used in the bi-prediction scheme may be regions selected from picture list L0 and picture list L1, respectively.

The inter prediction unit 254 may obtain a reference block of the current block using a motion vector and a reference picture index. The reference block is in a reference picture corresponding to a reference picture index. Also, a sample value of a block specified by a motion vector or an interpolated value thereof can be used as a predictor of the current block. For motion prediction with sub-pel unit pixel accuracy, for example, an 8-tap interpolation filter for a luma signal and a 4-tap interpolation filter for a chroma signal can be used. However, the interpolation filter for motion prediction in sub-pel units is not limited thereto. In this way, the inter prediction unit 254 performs motion compensation to predict the texture of the current unit from motion pictures reconstructed previously. In this case, the inter prediction unit may use a motion information set.

According to an additional embodiment, the prediction unit 250 may include an intra BC prediction unit (not shown). The intra BC prediction unit may reconstruct the current region by referring to a specific region including reconstructed samples in the current picture. The intra BC prediction unit obtains intra BC encoding information for the current region from the entropy decoding unit 210. The intra BC prediction unit obtains a block vector value of the current region indicating the specific region in the current picture. The intra BC prediction unit may perform intra BC prediction by using the obtained block vector value. The intra BC encoding information may include block vector information.

The reconstructed video picture is generated by adding the predict value outputted from the intra prediction unit 252 or the inter prediction unit 254 and the residual value outputted from the inverse transformation unit 225. That is, the video signal decoding apparatus 200 reconstructs the current block using the prediction block generated by the prediction unit 250 and the residual obtained from the inverse transformation unit 225.

Meanwhile, the block diagram of FIG. 2 shows a decoding apparatus 200 according to an embodiment of the present invention, and separately displayed blocks logically distinguish and show the elements of the decoding apparatus 200. Accordingly, the elements of the above-described decoding apparatus 200 may be mounted as one chip or as a plurality of chips depending on the design of the device. According to an embodiment, the operation of each element of the above-described decoding apparatus 200 may be performed by a processor (not shown).

Figure 3:
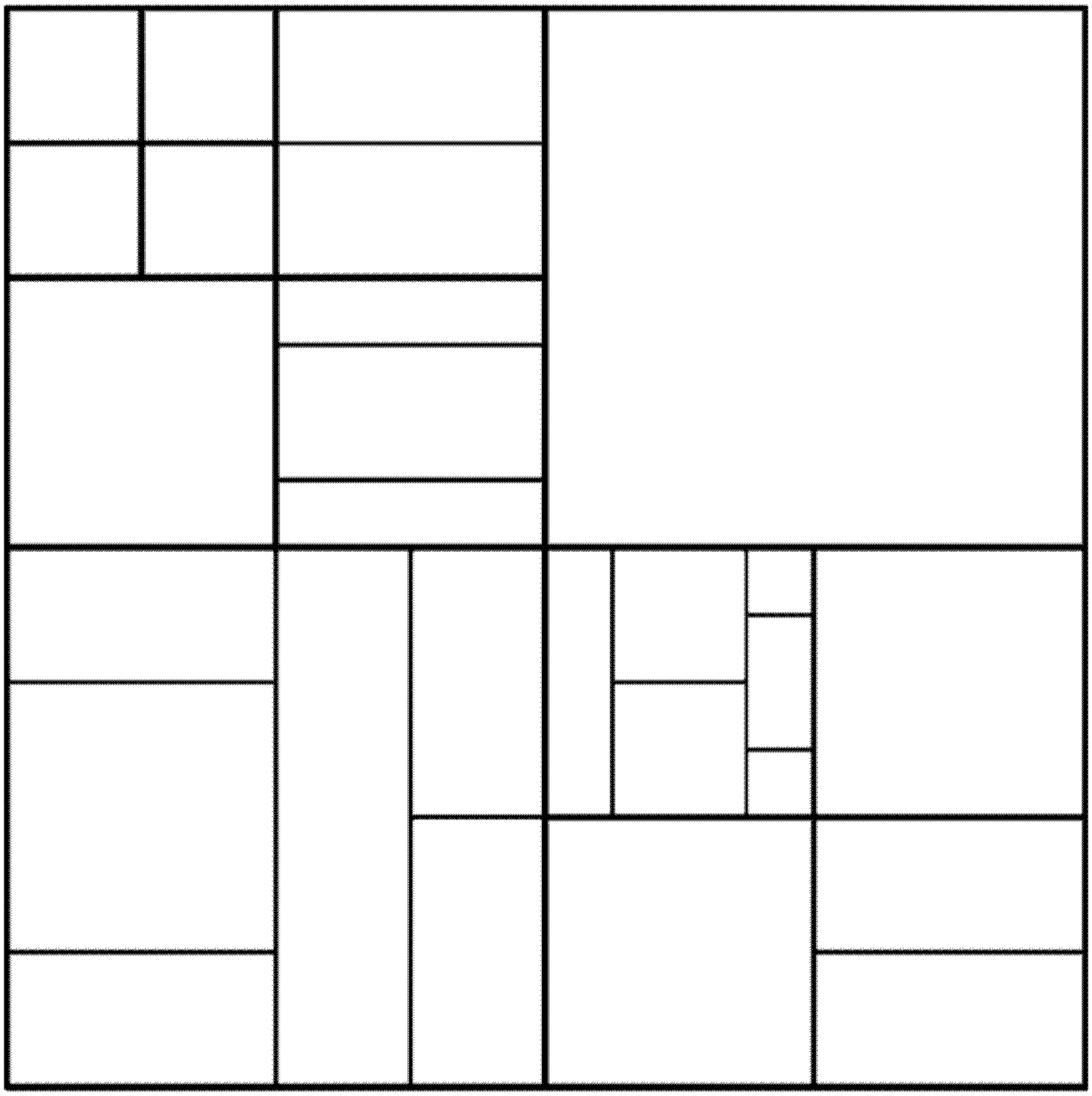
FIG. 3 shows an embodiment in which a coding tree unit is divided into coding units in a picture.

FIG. 3 illustrates an embodiment in which a coding tree unit (CTU) is split into coding units (CUs) in a picture. In the coding process of a video signal, a picture may be split into a sequence of coding tree units (CTUs). The coding tree unit is composed of an N×N block of luma samples and two blocks of chroma samples corresponding thereto. The coding tree unit can be split into a plurality of coding units. The coding tree unit is not split and may be a leaf node. In this case, the coding tree unit itself may be a coding unit. The coding unit refers to a basic unit for processing a picture in the process of processing the video signal described above, that is, intra/inter prediction, transformation, quantization, and/or entropy coding. The size and shape of the coding unit in one picture may not be constant. The coding unit may have a square or rectangular shape. The rectangular coding unit (or rectangular block) includes a vertical coding unit (or vertical block) and a horizontal coding unit (or horizontal block). In the present specification, the vertical block is a block whose height is greater than the width, and the horizontal block is a block whose width is greater than the height. Further, in this specification, a non-square block may refer to a rectangular block, but the present invention is not limited thereto.

Referring to FIG. 3, the coding tree unit is first split into a quad tree (QT) structure. That is, one node having a 2N×2N size in a quad tree structure may be split into four nodes having an N×N size. In the present specification, the quad tree may also be referred to as a quaternary tree. Quad tree split can be performed recursively, and not all nodes need to be split with the same depth.

Meanwhile, the leaf node of the above-described quad tree may be further split into a multi-type tree (MTT) structure. According to an embodiment of the present invention, in a multi-type tree structure, one node may be split into a binary or ternary tree structure of horizontal or vertical division. That is, in the multi-type tree structure, there are four split structures such as vertical binary split, horizontal binary split, vertical ternary split, and horizontal ternary split. According to an embodiment of the present invention, in each of the tree structures, the width and height of the nodes may all have powers of 2. For example, in a binary tree (BT) structure, a node of a 2N×2N size may be split into two N×2N nodes by vertical binary split, and split into two 2N×N nodes by horizontal binary split. In addition, in a ternary tree (TT) structure, a node of a 2N×2N size is split into (N/2)×2N, N×2N, and (N/2)×2N nodes by vertical ternary split, and split into 2N×(N/2), 2N×N, and 2N×(N/2) nodes by horizontal ternary split. This multi-type tree split can be performed recursively.

The leaf node of the multi-type tree can be a coding unit. If splitting for the coding unit is not indicated or the coding unit is not large for the maximum transform length, the coding unit is used as a unit of prediction and transform without further division. On the other hand, at least one of the following parameters in the above-described quad tree and multi-type tree may be predefined or transmitted through a higher level set of RBSPs such as PPS, SPS, VPS, and the like. 1) CTU size: root node size of quad tree, 2) minimum QT size MinQtSize: minimum allowed QT leaf node size, 3) maximum BT size MaxBtSize: maximum allowed BT root node size, 4) Maximum TT size MaxTtSize: maximum allowed TT root node size, 5) Maximum MTT depth MaxMttDepth: maximum allowed depth of MTT split from QT's leaf node, 6) Minimum BT size MinBtSize: minimum allowed BT leaf node size, 7) Minimum TT size MinTtSize: minimum allowed TT leaf node size.

Figure 4:
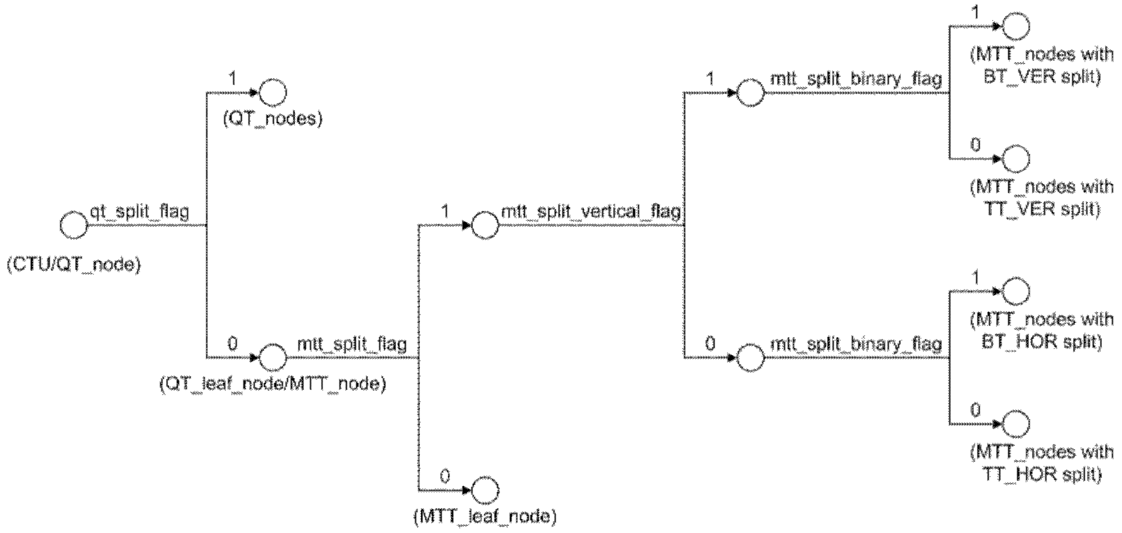
FIG. 4 shows an embodiment of a method for signaling a division of a quad tree and a multi-type tree.

FIG. 4 shows an embodiment of a method for signaling the split of a quad tree and a multi-type tree. Preset flags may be used to signal the split of the above-described quad tree and multi-type tree. Referring to FIG. 4, at least one of a flag 'qt_split_flag' indicating whether to split the quad tree node, a flag 'mtt_split_flag' indicating whether to split the multi-type tree node, a flag 'mtt_split_vertical_flag' indicating a split direction of a multi-type tree node, or a flag 'mtt_split_binary_flag' indicating a split shape of a multi-type tree node may be used.

According to an embodiment of the present invention, the coding tree unit is a root node of a quad tree, and can be first split into a quad tree structure. In the quad tree structure, 'qt_split_flag' is signaled for each node 'QT_node'. If the value of 'qt_split_flag' is 1, the node is split into 4 square nodes, and if the value of 'qt_split_flag' is 0, the corresponding node becomes the leaf node 'QT_leaf_node' of the quad tree.

Each quad tree leaf node 'QT_leaf_node' may be further split into a multi-type tree structure. In the multi-type tree structure, 'mtt_split_flag' is signaled for each node 'MTT_node'. When the value of 'mtt_split_flag' is 1, the corresponding node is split into a plurality of rectangular nodes, and when the value of 'mtt_split_flag' is 0, the corresponding node is a leaf node 'MTT_leaf_node' of the multi-type tree. When the multi-type tree node 'MTT_node' is split into a plurality of rectangular nodes (i.e., when the value of 'mtt_split_flag' is 1), 'mtt_split_vertical_flag' and 'mtt_split_binary_flag' for the node 'MTT_node' may be additionally signaled. When the value of 'mtt_split_vertical_flag' is 1, vertical split of node 'MTT_node' is indicated, and when the value of 'mtt_split_vertical_flag' is 0, horizontal split of node 'MTT_node' is indicated. In addition, when the value of 'mtt_split_binary_flag' is 1, the node 'MTT_node' is split into 2 rectangular nodes, and when the value of 'mtt_split_binary_flag' is 0, the node 'MTT_node' is split into 3 rectangular nodes.

Picture prediction (motion compensation) for coding is performed on a coding unit that is no longer divided (i.e., a leaf node of a coding unit tree). Hereinafter, the basic unit for performing the prediction will be referred to as a "prediction unit" or a "prediction block".

Hereinafter, the term "unit" used herein may replace the prediction unit, which is a basic unit for performing prediction. However, the present disclosure is not limited thereto, and "unit" may be understood as a concept broadly encompassing the coding unit.

Figure 5:
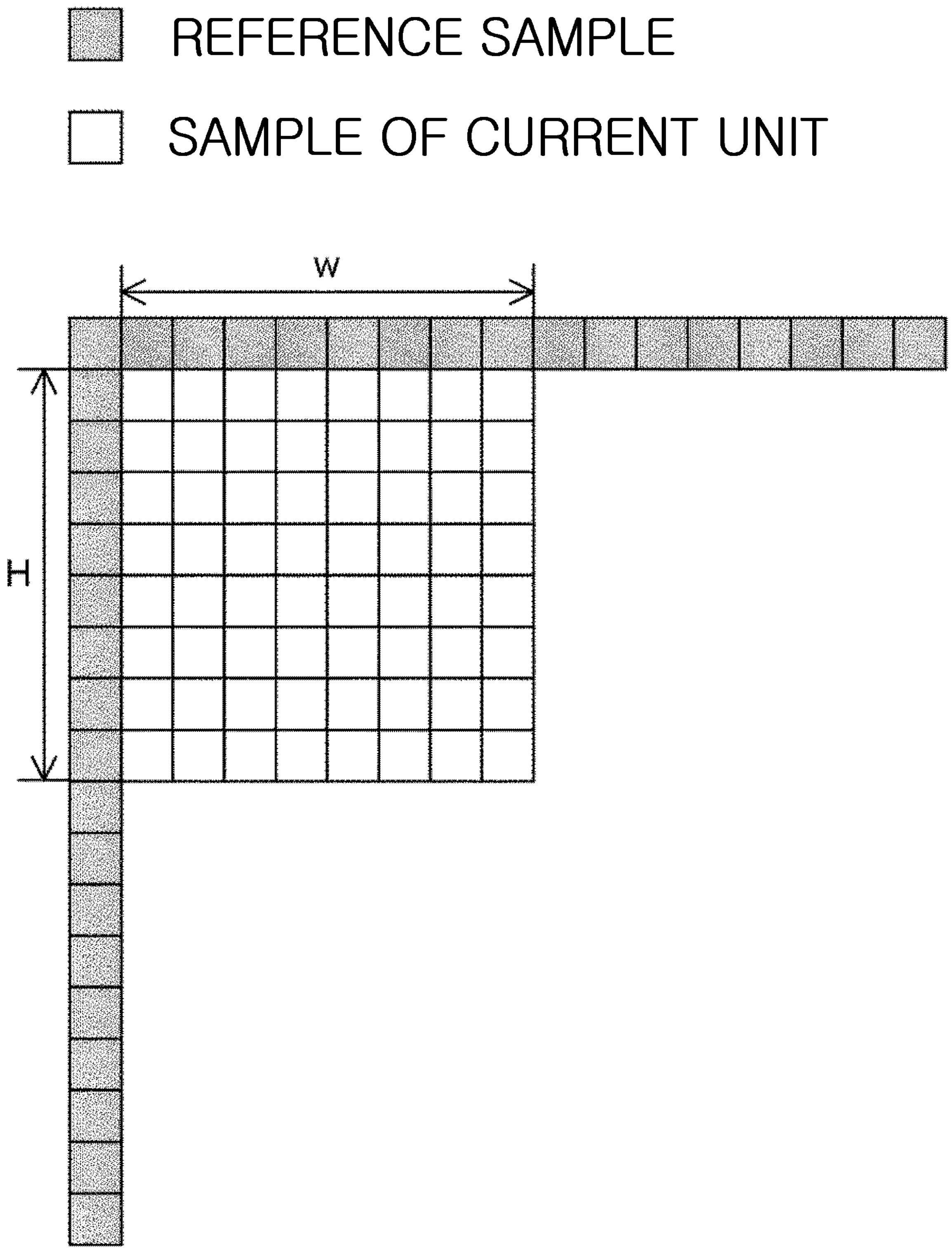
FIGS. 5 and 6 illustrate an intra-prediction method in more detail according to an embodiment of the present disclosure.
Figure 6:
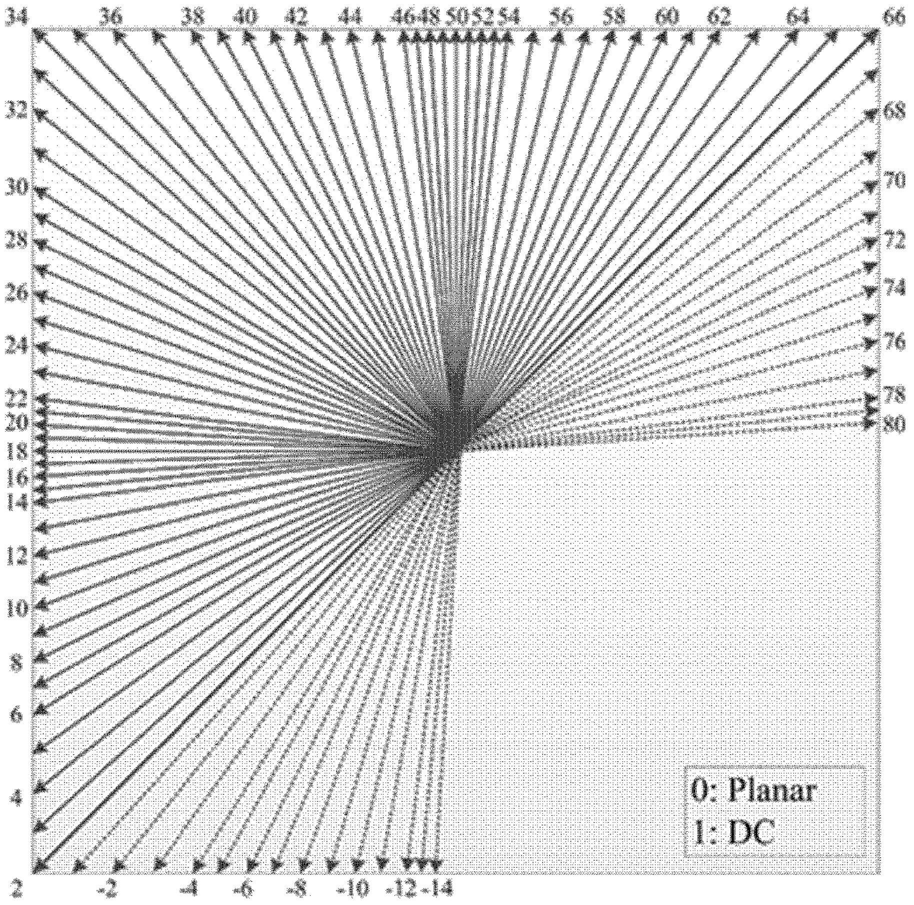

FIGS. 5 and 6 more specifically illustrate an intra prediction method according to an embodiment of the present invention. As described above, the intra prediction unit predicts the sample values of the current block by using the reconstructed samples located on the left and/or upper side of the current block as reference samples.

First, FIG. 5 shows an embodiment of reference samples used for prediction of a current block in an intra prediction mode. According to an embodiment, the reference samples may be samples adjacent to the left boundary of the current block and/or samples adjacent to the upper boundary. As shown in FIG. 5, when the size of the current block is W×H and samples of a single reference line adjacent to the current block are used for intra prediction, reference samples may be configured using a maximum of 2W+2H+1 neighboring samples located on the left and/or upper side of the current block.

When at least some samples to be used as reference samples have not yet been reconstructed, the intra prediction unit may obtain reference samples by performing a reference sample padding procedure. The intra prediction unit may perform a reference sample filtering procedure to reduce an error in intra prediction. That is, filtering may be performed on neighboring samples and/or reference samples obtained by the reference sample padding procedure, so as to obtain the filtered reference samples. The intra prediction unit predicts samples of the current block by using the reference samples obtained as in the above. The intra prediction unit predicts samples of the current block by using unfiltered reference samples or filtered reference samples. In the present disclosure, neighboring samples may include samples on at least one reference line. For example, the neighboring samples may include adjacent samples on a line adjacent to the boundary of the current block.

Next, FIG. 6 shows an embodiment of prediction modes used for intra prediction. For intra prediction, intra prediction mode information indicating an intra prediction direction may be signaled. The intra prediction mode information indicates one of a plurality of intra prediction modes included in the intra prediction mode set. When the current block is an intra prediction block, the decoder receives intra prediction mode information of the current block from the bitstream. The intra prediction unit of the decoder performs intra prediction on the current block based on the extracted intra prediction mode information.

According to an embodiment of the present invention, the intra prediction mode set may include all intra prediction modes used in intra prediction (e.g., a total of 67 intra prediction modes). More specifically, the intra prediction mode set may include a planar mode, a DC mode, and a plurality (e.g., 65) of angle modes (i.e., directional modes). Each intra prediction mode may be indicated through a preset index (i.e., intra prediction mode index). For example, as shown in FIG. 6, the intra prediction mode index 0 indicates a planar mode, and the intra prediction mode index 1 indicates a DC mode. Also, the intra prediction mode indexes 2 to 66 may indicate different angle modes, respectively. The angle modes respectively indicate angles which are different from each other within a preset angle range. For example, the angle mode may indicate an angle within an angle range (i.e., a first angular range) between 45 degrees and −135 degrees clockwise. The angle mode may be defined based on the 12 o'clock direction. In this case, the intra prediction mode index 2 indicates a horizontal diagonal (HDIA) mode, the intra prediction mode index 18 indicates a horizontal (Horizontal, HOR) mode, the intra prediction mode index 34 indicates a diagonal (DIA) mode, the intra prediction mode index 50 indicates a vertical (VER) mode, and the intra prediction mode index 66 indicates a vertical diagonal (VDIA) mode.

Meanwhile, the preset angle range may be set differently according to the shape of the current block. For example, when the current block is a rectangular block, a wide angle mode indicating an angle greater than 45 degrees or less than −135 degrees in the clockwise direction may be additionally used. When the current block is a horizontal block, the angle mode may indicate an angle within an angle range (i.e., a second angle range) between (45+offset1) degrees and (−135+offset1) degrees clockwise. In this case, angle modes 67 to 76 outside the first angle range may be additionally used. Also, when the current block is a vertical block, the angle mode may indicate an angle within an angle range (i.e., a third angle range) between (45−offset2) degrees and (−135−offset2) degrees clockwise. In this case, angle modes −10 to −1 outside the first angle range may be additionally used. According to an embodiment of the present invention, the values of offset1 and offset2 may be determined differently according to the ratio between the width and height of the rectangular block. Also, offset1 and offset2 may be positive numbers.

According to a further embodiment of the present invention, the plurality of angle modes included in the intra prediction mode set may include a basic angle mode and an extended angle mode. In this case, the extended angle mode may be determined based on the basic angle mode.

According to an embodiment, the basic angle mode is a mode corresponding to an angle used in intra prediction of an existing High Efficiency Video Coding (HEVC) standard, and the extended angle mode may be a mode corresponding to a newly added angle in intra prediction of the next generation video codec standard. More specifically, the basic angle mode is an angle mode corresponding to any one of intra prediction modes {2, 4, 6, . . . , 66} and the extended angle mode is an angle mode corresponding to any one of intra prediction modes {3, 5, 7, . . . , 65}. That is, the extended angle mode may be an angle mode between basic angle modes within the first angle range. Accordingly, the angle indicated by the extended angle mode may be determined based on the angle indicated by the basic angle mode.

According to another embodiment, the basic angle mode may be a mode corresponding to an angle within a preset first angle range, and the extended angle mode may be a wide angle mode outside the first angle range. That is, the basic angle mode is an angle mode corresponding to any one of intra prediction modes {2, 3, 4, . . . , 66} and the extended angle mode is an angle mode corresponding to any one of intra prediction modes among {−10, −9, . . . , −1} and {67, 68, . . . , 76}. The angle indicated by the extended angle mode may be determined as an angle opposite to the angle indicated by the corresponding basic angle mode. Accordingly, the angle indicated by the extended angle mode may be determined based on the angle indicated by the basic angle mode. Meanwhile, the number of extended angle modes is not limited to this, and additional extension angles may be defined according to the size and/or shape of the current block. For example, the extended angle mode may be defined as an angle mode corresponding to any one of intra prediction modes {−14, −13, . . . , −1} and {67, 68, . . . , 80}. Meanwhile, the total number of intra prediction modes included in the intra prediction mode set may vary depending on the configuration of the basic angle mode and extended angle mode described above.

In the above embodiments, the interval between the extended angle modes can be set based on the interval between the corresponding basic angle modes. For example, the interval between extended angle modes {3, 5, 7, . . . , 65} may be determined based on the interval between corresponding basic angle modes {2, 4, 6, . . . , 66}. For example, the interval between extended angle modes {−10, −9, . . . , −1} may be determined based on the interval between corresponding opposite-side basic angle modes {56, 57, . . . , 65}, and the interval between extended angle modes {67, 68, . . . , 76} may be determined based on the interval between corresponding opposite-side basic angle modes {3, 4, . . . , 12}. The angle interval between the extended angle modes can be configured to be the same as the angle interval between the corresponding basic angle modes. Also, the number of extended angle modes in the intra prediction mode set may be configured to be less than or equal to the number of basic angle modes.

According to an embodiment of the present invention, the extended angle mode may be signaled based on the basic angle mode. For example, the wide angle mode (i.e., extended angle mode) may replace at least one angle mode (i.e., basic angle mode) within the first angle range. The basic angle mode to be replaced may be an angle mode corresponding to the opposite side of the wide angle mode. That is, the basic angle mode to be replaced is an angle mode corresponding to an angle in the opposite direction of the angle indicated by the wide angle mode or an angle different from the angle in the opposite direction by a preset offset index. According to an embodiment of the present invention, the preset offset index is 1. The intra prediction mode index corresponding to the replaced basic angle mode may be mapped back to the wide angle mode to signal the wide angle mode. For example, the wide angle mode {−10, −9, . . . , −1} may be signaled by an intra prediction mode index {57, 58, . . . , 66}, and the wide angle mode {67, 68, . . . , 76} may be signaled by an intra prediction mode index {2, 3, . . . , 11}. In this way, as the intra prediction mode index for the basic angle mode signals the extended angle mode, even if the configuration of angle modes used for intra prediction of each block is different, the same set of intra prediction mode indexes can be used for signaling of the intra prediction mode. Accordingly, signaling overhead due to changes in intra prediction mode configuration can be minimized.

Meanwhile, whether to use the extended angle mode may be determined based on at least one of the shape and size of the current block. According to an embodiment, when the size of the current block is larger than a preset size, the extended angle mode may be used for intra prediction of the current block, and otherwise, only the basic angle mode may be used for intra prediction of the current block. According to another embodiment, when the current block is a block other than a square, the extended angle mode can be used for intra prediction of the current block, and when the current block is a square block, only the basic angle mode can be used for intra prediction of the current block.

Hereinafter, an inter prediction method according to an embodiment of the present disclosure is described with reference to FIG. 7. In the present disclosure, the inter prediction method may include a general inter prediction method optimized for translation motion and an inter prediction method based on an affine model. Further, the motion vector may include at least one of a general motion vector for motion compensation according to the general inter prediction method and a control point motion vector for affine compensation.

Figure 7:
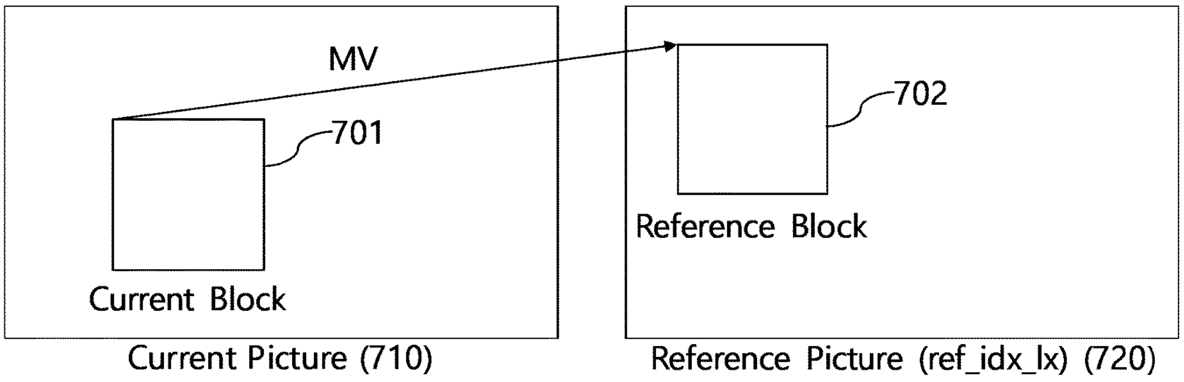
FIG. 7 illustrates an inter prediction method according to an embodiment of the present disclosure.

FIG. 7 illustrates an inter prediction method according to an embodiment of the present disclosure. As described above, the decoder may predict the current block with reference to reconstructed samples of another decoded picture. Referring to FIG. 7, the decoder acquires a reference block 702 within a reference picture 720 on the basis of a motion information set of a current block 701. In this case, the motion information set may include a reference picture index and a motion vector. The reference picture index indicates a reference picture 720 including a reference block for inter prediction of the current block in a reference picture list. According to an embodiment, the reference picture list may include at least one of the L0 picture list or the L1 picture list. The motion vector indicates an offset between a coordinate value of the current block 701 within the current picture 710 and a coordinate value of the reference block 702 within the reference picture 720. The decoder acquires a predictor of the current block 701 on the basis of sample values of the reference block 702 and reconstructs the current block 701 using the predictor.

Specifically, the encoder may acquire the reference block by searching for blocks similar to the current block in pictures having a higher restoration sequence. For example, the encoder may search for a reference block having a minimum sum of differences in sample values from the current block within a preset search area. In this case, in order to measure similarity between the current block and samples of the reference block, at least one of Sum of Absolute Difference (SAD) and Sum of Hadamard Transformed Difference (SATD) may be used. Here, the SAD may be a value obtained by adding all of absolute values of differences in sample values included in two blocks. Further, the SATD may be a value obtained by adding all of absolute values of Hadamard transform coefficients acquired through Hadamard transform of differences in sample values included in two blocks.

Meanwhile, the current block may be predicted using one or more reference areas. As described above, the current block may be inter-predicted through a pair prediction method using two or more reference areas. According to an embodiment, the decoder may acquire two reference blocks on the basis of two motion information sets of the current block. Further, the decoder may acquire a first predictor and a second predictor of the current block on the basis of sample values of the two acquired reference blocks. In addition, the decoder may reconstruct the current block using the first predictor and the second predictor. For example, the decoder may reconstruct the current block on the basis of an average for each of the samples of the first predictor and the second predictor.

As described above, for motion compensation of the current block, one or more motion information sets may be signaled. In this case, similarity between motion information sets for motion compensation of each of a plurality of blocks may be used. For example, the motion information set used for predicting the current block may be induced from motion information sets used for predicting one of other reconstructed samples. To this end, the encoder and the decoder may reduce signaling overhead.

For example, there may be a plurality of candidate blocks that are likely to have been predicted on the basis of a motion information set which is the same as or similar to the motion information set of the current block. The decoder may generate a merge candidate list on the basis of the plurality of candidate blocks. Here, the merge candidate list may include candidates corresponding to samples that are likely to have been predicted on the basis of a motion information set related to the motion information set of the current block, among samples reconstructed earlier than the current block. The encoder and the decoder may configure the merge candidate list of the current block according to a predefined rule. Here, the merge candidate lists respectively configured by the encoder and the decoder may be the same. For example, the encoder and the decoder may configure the merge candidate list of the current block on the basis of a location of the current block in a current picture. A method in which the encoder and the decoder configure a merge candidate list of the current block will be described later with reference to FIG. 9. In the present disclosure, the position of a specific block indicates a relative position of a top-left sample of a specific block in the picture including the specific block.

Meanwhile, in order to improve coding efficiency, a method of quantizing a transform coefficient value obtained by transforming a residual signal and the quantized transform coefficient may be used instead of coding the above-described residual as it is. As described above, the transform unit may obtain a transform coefficient value by transforming a residual signal. In this case, the residual signal of a specific block may be distributed over an entire area of the current block. Accordingly, it is possible to improve coding efficiency by concentrating energy in the low frequency region through frequency domain conversion of a residual signal. Hereinafter, a method of transforming or inversely transforming a residual signal will be described in detail.

FIG. 8 is a diagram specifically illustrating a method for transforming a residual signal by an encoder. As described above, a residual signal in a spatial domain may be transformed to a frequency domain. An encoder may obtain a transform coefficient by transforming the obtained residual signal. First, the encoder may obtain at least one residual block including a residual signal for a current block. The residual block may be either the current block or one of blocks divided from the current block. In the present disclosure, the residual block may be referred to as a residual array or a residual matrix which include residual samples of the current block. In the present disclosure, the residual block may represent a transform unit or a block having the same size as that of the transform block.

Next, the encoder may transform the residual block by using a transform kernel. The transform kernel used for transformation of the residual block may be a transform kernel having separable characteristics of vertical transform and horizontal transform. In this case, the transform for the residual block may be performed separately into vertical transform and horizontal transform. For example, the encoder may perform vertical transformation by applying a transform kernel in the vertical direction of the residual block. The encoder may perform horizontal transform by applying the transform kernel in the horizontal direction of the residual block. In the present disclosure, the transform kernel may be used as a term to refer to a parameter set used for transform of the residual signal, such as transform matrix, transform array, transform function, and transform. According to an embodiment, the transform kernel may be any one of a plurality of available kernels. A transform kernel based on different transform types may be used for each of the vertical transform and the horizontal transform.

The encoder may transfer the transform block transformed from the residual block to a quantization unit and quantize the transform block. The transform block may include a plurality of transform coefficients. Specifically, the transform block may include the plurality of transform coefficients arranged in two dimensions. As in the case of the residual block, the size of the transform block may be the same as the size of either the current block or the block divided from the current block. The transform coefficients transferred to the quantization unit may be expressed as quantized values.

The encoder may perform additional transform before the transform coefficients are quantized. As illustrated in FIG. 8, the above-described transform method may be referred to as a primary transform, and an additional transform may be referred to as a secondary transform. The secondary transform may be selective for each residual block. According to an embodiment, the encoder may improve coding efficiency by performing secondary transform for a region where it is difficult to concentrate energy in a low-frequency region only by primary transform. For example, secondary transform may be added to a block in which residual values appear larger in a direction other than the horizontal or vertical direction of the residual block. The residual values of an intra-predicted block may have a higher probability of transformation in a direction other than the horizontal or vertical direction compared to the residual values of an inter-predicted block. Accordingly, the encoder may additionally perform secondary transform on the residual signal of the intra-predicted block. The encoder may omit secondary transform for the residual signal of the inter-predicted block.

As another example, whether or not to perform the second transform may be determined depending on the size of the current block or residual block. In addition, transform kernels having different sizes may be used depending on the size of the current block or residual block. For example, an 8×8 second transform may be applied to a block in which the shorter one of the width and the height thereof is greater than or equal to a predetermined first length. In addition, a 4×4 second transform may be applied to a block in which the shorter one of the width and the height is greater than or equal to the predetermined first length and less than a predetermined second length. In this case, the predetermined first length may be greater than the predetermined second length, but the present disclosure is not limited thereto. In addition, unlike the first transform, the second transform may be performed without being separated into vertical transform and horizontal transform. The second transform may be referred to as a "low-frequency non-separable transform (LFNST)".

In the case of a video signal in a specific region, energy in a high frequency band may not be reduced even if frequency transformation is performed due to a sudden change in brightness. Accordingly, compression performance due to quantization may be deteriorated. When transform is performed on a region in which a residual value rarely exists, an encoding time and a decoding time may be unnecessarily increased. Accordingly, transform on the residual signal of the specific region may be omitted. Whether to perform transform on the residual signal of the specific region may be determined by a syntax element related to transform of the specific region. For example, the syntax element may include transform skip information. The transform skip information may be a transform skip flag. If the transform skip information on the residual block indicates a transform skip, transform on the residual block is not performed. In this case, the encoder may immediately quantize the residual signal on which transform of a corresponding region has not been performed. The operations of the encoder described with reference to FIG. 8 may be performed via the transform unit of FIG. 1.

The above-described transform-related syntax elements may be information parsed from a video signal bitstream. The decoder may entropy-decode the video signal bitstream so as to obtain transform-related syntax elements. The encoder may entropy-code the transform-related syntax elements so as to generate a video signal bitstream.

FIG. 9 is a diagram specifically illustrating a method for obtaining a residual signal by inverse transforming a transformation coefficient by an encoder and a decoder. For the convenience of description, it will be described that an inverse transform operation is performed via an inverse transform unit of each of an encoder and a decoder. The inverse transform unit may obtain a residual signal by inverse transforming an inverse quantized transform coefficient. First, the inverse transform unit may detect whether inverse transform for a specific region is performed, from a transform-related syntax element of the region. According to an embodiment, when a transform-related syntax element for a specific transform block indicates a transform skip, transform on the transform block may be omitted. In this case, both the primary inverse transform and the secondary inverse transform described above regarding the transform block may be omitted. The inverse quantized transform coefficient may be used as a residual signal. For example, the decoder may reconstruct a current block by using the inverse quantized transform coefficient as a residual signal.

According to another embodiment, the transform-related syntax element for the specific transform block may not indicate a transform skip. In this case, the inverse transform unit may determine whether to perform secondary inverse transform for secondary transform. For example, when the transform block is a transform block of an intra-predicted block, secondary inverse transform may be performed on the transform block. A secondary transform kernel used for the transform block may be determined based on an intra prediction mode corresponding to the transform block. As another example, whether to perform secondary inverse transform may be determined based on the size of the transform block. Secondary inverse transform may be performed after inverse quantization and before primary inverse transform.

The inverse transform unit may perform primary inverse transform on the inverse quantized transform coefficient or a secondary inverse transformed transform coefficient. In the case of primary inverse transform, vertical transform and horizontal transform may be performed separately as in the case of primary transform. For example, the inverse transform unit may obtain a residual block by performing vertical inverse transform and horizontal inverse transform on the transform block. The inverse transform unit may inverse transform the transform block on the basis of the transform kernel used for transforming the transform block. For example, the encoder may explicitly or implicitly signal information indicating the transform kernel applied to the current transform block from among a plurality of available transform kernels. The decoder may select a transform kernel to be used for inverse transform of the transform block from among the plurality of available transform kernels by using information indicating the signaled transform kernel. The inverse transform unit may reconstruct the current block by using the residual signal obtained via inverse transform on the transform coefficient.

Meanwhile, distribution of residual signals of a picture may vary depending on areas. For example, the distribution of values of the residual signal in a specific area may differ depending on a prediction method. In the case of performing transformation using the same transform kernel on a plurality of different transform areas, the coding efficiency may differ in the respective transform areas depending on the distribution and characteristics of the values in the transform areas. Accordingly, if a transform kernel used in transformation of a specific transform block is adaptively selected from among a plurality of available transform kernels, the coding efficiency may be further improved. That is, the encoder and the decoder may be configured to further use the transform kernels in addition to the basic transform kernel in transformation of a video signal. A method of adaptively selecting the transform kernel may be referred to as an "adaptive multiple core transform (AMT)" or a "multiple transform selection (MTS)". The method of adaptively selecting the transform kernel will be described later with reference to the related drawings. In the present disclosure, for the convenience of description, transformation and inverse transformation will be collectively referred to as "transformation". In addition, a transform kernel and an inverse transform kernel will be collectively referred to as a "transform kernel".

Hereinafter, a plurality of transform kernels that are able to be used in transformation of a video signal will be described with reference to FIG. 10. According to an embodiment of the present disclosure, the transform kernel may be a kernel derived on the basis of a specific basis function. A plurality of different transform kernels may be obtained on the basis of different basis functions from each other. The plurality of transform kernels may be obtained based on the basis functions corresponding to different transform types, respectively.

FIG. 10 is a diagram showing basis functions corresponding to respective transform types. According to an embodiment, the transform kernels available for transformation of a video residual signal may include at least one of a transform kernel based on discrete cosine transform type-II (DCT-II), a transform kernel based on discrete cosine transform type-V (DCT-V), a transform kernel based on discrete cosine transform type-VIII (DCT-VIII), a transform kernel based on discrete sine transform type-I (DST-I), and a transform kernel based on discrete sine transform type-VII (DST-VII).

Referring to FIG. 10, basis functions corresponding to transform types DCT-II, DCT-V, DCT-VIII, DST-I, and DST-VII described above may be expressed as cosine or sine functions. For example, the basis function corresponding to each of DCT-II, DCT-V, and DCT-VIII may be a cosine function, and the basis function corresponding to each of DST-I and DST-VII may be a sine function. In addition, the basis function corresponding to a specific transform type may be expressed in the form of a basis function for each frequency bin. For example, basis function Ti(j) may be a basis function corresponding to an $i^{th}$ frequency bin. That is, the smaller the value "i", the basis function corresponds to the lower frequency. In addition, the larger the value "i", the basis function corresponds to the higher frequency. In FIG. 10, "j" may denote an integer between 0 and N−1.

Basis function Ti(j) may be expressed as a two-dimensional matrix indicating the $j^{th}$ element in the $i^{th}$ row. In this case, transformation using the transform kernels on the basis of the transform types in FIG. 9 may have separable characteristics in performing the transformation. That is, the transformation of a residual signal may be performed separately in the horizontal direction and the vertical direction. For example, transformation of residual block X using transform matrix T may be expressed as matrix calculation TXT'. Here, T' denotes the transpose matrix of transform matrix T.

Values of a transform matrix calculated by the basis function shown in FIG. 10 may be decimals, instead of integers. It may be difficult to implement decimal values in hardware in the video encoding device and decoding device. Accordingly, a transform kernel approximated to integers from the original transform kernel including decimal values may be used for encoding and decoding the video signal. The approximated transform kernel including integer values may be generated through scaling and rounding the original transform kernel. The integer value included in the approximated transform kernel may be within the range in which the value is able to be expressed by a predetermined number of bits. The predetermined number of bits may be 8 bits or 10 bits. According to the approximation, the orthonormal property of DCT and DST may not be maintained.

However, since the coding efficiency loss according thereto is not high, it may be advantageous in terms of hardware implementation to perform approximation of the transform kernel to integers.

Figure 11:
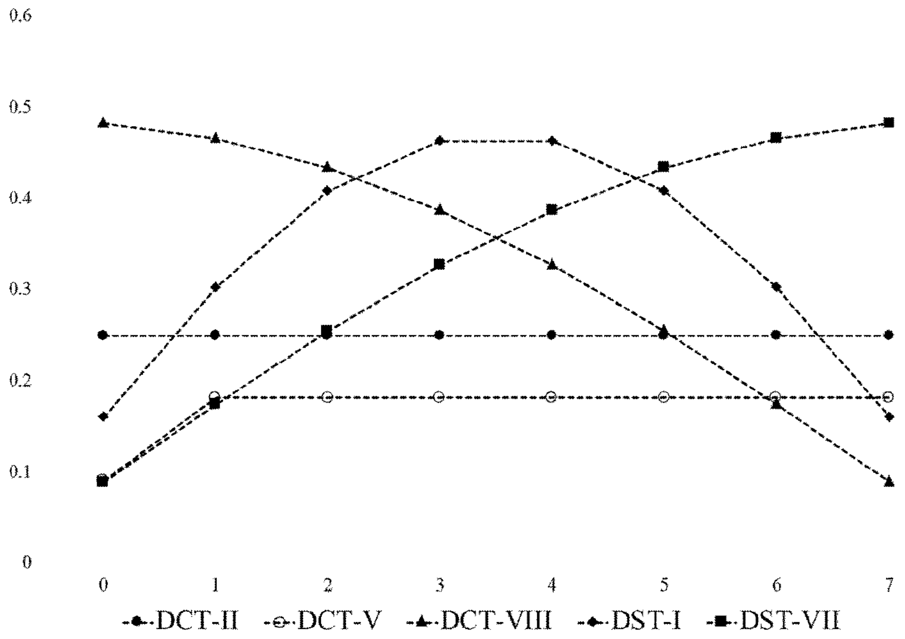
FIG. 11 is a diagram showing the magnitude of a signal for each index of transform types DCT-II, DCT-V, DCT-VIII, DST-I, and DST-VII.

FIG. 11 is a diagram showing the magnitude of a signal for each index of transform types DCT-II, DCT-V, DCT-VIII, DST-I, and DST-VII. FIG. 11 shows the form of a basis function corresponding to the lowest frequency bin, among the basis functions for each frequency bin. FIG. 11 shows the basis function corresponding to the $0^{th}$ frequency bin, among the basis functions for each frequency bin. In FIG. 11, the horizontal axis indicates index j (j=0, 1, . . . , N−1) in the basis function, and the vertical axis indicates the magnitude value of a signal. N indicates the number of samples in a specific area to be transformed.

As shown in FIG. 11, as index j increases, the magnitude of a signal tends to increase in DST-VII. Accordingly, like the residual block of the intra-predicted block, DST-VII may be efficient for transformation of a residual block in which the magnitude of a residual signal increases as the distance from a top-left corner of the residual block increases in the horizontal and vertical directions.

On the other hand, as index j increases, the magnitude of a signal tends to decrease in DCT-VIII. That is, DCT-VIII satisfies duality characteristics with DST-VII. Accordingly, DCT-VIII may be efficient for transformation of a residual block in which the magnitude of a residual signal decreases as the distance from a top-left corner of the residual block increases in the horizontal and vertical directions.

In DST-I, the magnitude of a signal tends to increase as index j of the basis function increases, and then starts to decrease at a specific index. Accordingly, it may be efficient for transformation of a residual block that has a large magnitude of a residual signal at the center thereof.

The $0^{th}$ basis function of DCT-II indicates DC. Accordingly, it may be efficient for transformation of a residual block that has a uniform distribution of signal magnitudes therein.

DCT-V is similar to DCT-II, but the magnitude of a signal when index j is 0 is smaller than the magnitude of a signal when index j is not 0 in DCT-V. That is, if index j is 1, the signal has a form in which the straight line is bent.

Meanwhile, in the case of using the transform kernel having the separable characteristics as described above, transformation of the residual block may be performed in the horizontal and vertical directions thereof. Specifically, the transformation of the residual block may be performed through two 2-dimensional matrix product calculations. The matrix product calculation may involve a predetermined amount of calculation or more. Accordingly, in the case of transforming the residual block using the transform kernel based on DCT-II, it is possible to reduce the amount of calculation using a structure of a combination of a butterfly structure or a half butterfly structure and a half matrix multiplier. However, it may be difficult to implement DST- VII and DCT-VIII in terms of the amount of calculation because the implementation complexity thereof is relatively high. In addition, since the elements of the transform kernel (the matrix elements of the transform kernel) are required to be stored in memory for calculation, the memory capacity for storing the kernel matrix must also be considered in the implementation. Accordingly, the transform type having the characteristics similar to those of DST-VII and DCT-VIII and relatively low complexity of implementation may be used.

According to an embodiment, discrete sine transform type-IV (DST-IV) and discrete cosine transform type-IV (DCT-IV) may replace DST-VII and DCT-VIII, respectively.

Figure 12:
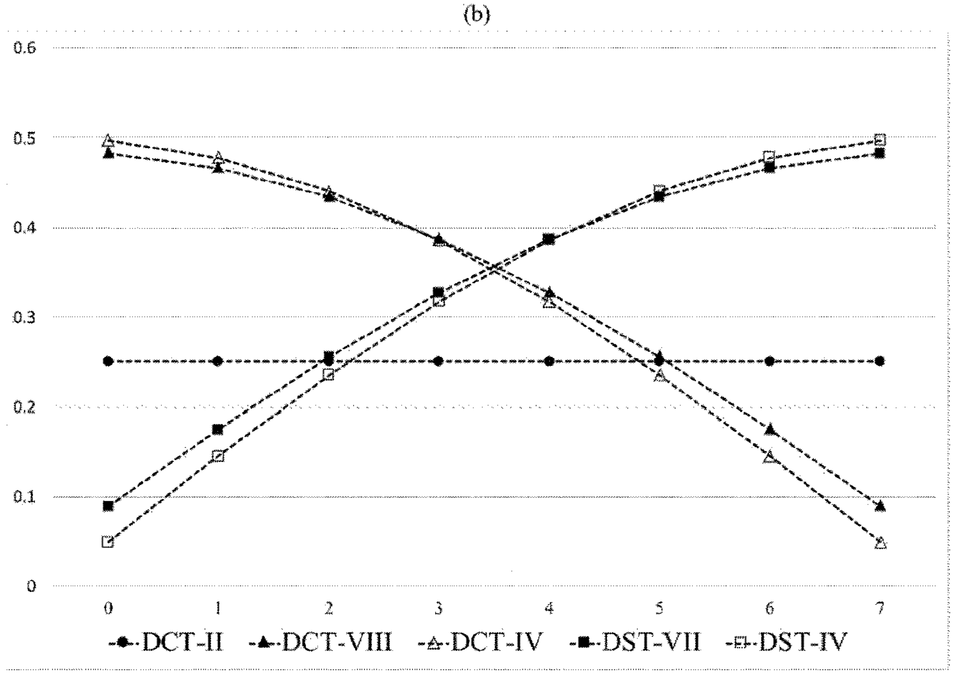
FIG. 12 is a diagram showing the magnitude of a signal for each index of transform types DST-IV, DCT-IV, DST-VII and DCT-VIII.

FIG. 12 is a diagram showing the magnitude of a signal for each index of transform types DST-IV, DCT-IV, DST-VII and DCT-VIII. FIG. 12(*a*) shows the basis function corresponding to DST-IV and the basis function corresponding to DCT-IV. DST-IV and DCT-IV for the number of samples N may be derived from DCT-II for the number of samples 2N. That is, a partial butterfly structure of DCT-II for the number of samples 2N includes DCT-IV for the number of samples N. In addition, DST-IV for the number of samples N may be implemented by coding-inversion calculation from DCT-IV for the number of samples N and by arranging corresponding basis functions in reverse order.

As shown in FIG. 12(*b*), DST-IV has a signal form similar to DST-VII. Accordingly, like the residual block of the intra-predicted block, DST-IV may be efficient for transformation of a residual block in which the magnitude of a residual signal increases as the distance from a top-left corner of the residual block increases in the horizontal and vertical directions. In addition, DCT-IV has a signal form similar to DCT-VIII. Accordingly, the DCT-IV may be efficient for transformation of a residual block in which the magnitude of a residual signal is large in a specific boundary and in which the magnitude of the residual signal decreases as moving from the corresponding boundary to another boundary.

In the case where only a transform kernel based on any one of the transform types described above is used for transformation of a video signal, it is difficult to perform adaptive transformation according to the pattern of the residual signal, which differs depending on the characteristics of the original signal and a prediction mode. Accordingly, the encoder and the decoder according to an embodiment of the present disclosure may improve coding efficiency using the transform kernel selected for each area from among a plurality of available transform kernels in transformation of the residual signal.

In the existing high-efficiency video coding (HEVC) standard, the residual signal is transformed using a transform kernel based on DCT-II among the transform types described above, and is transformed by limitedly using a transform kernel based on DST-VII only for intra-predicted 4×4-sized blocks. As described above, DCT-II may be suitable for transformation of a residual signal of an inter-predicted block, but may not be suitable for transformation of a residual signal of an intra-predicted block. That is, the pattern of the residual signal in the residual block may vary depending on the method of predicting the current block.

Accordingly, at least one selected from among a plurality of available transform kernels may be used for transformation of a specific transform block. According to an embodiment, the encoder and the decoder may select a transform kernel for at least one transform area of the current block on the basis of the method of predicting the current block. This method may be referred to as the "adaptive multiple core transform (AMT)" described above. If the transform kernel determined according to a prediction method for a specific area is used for transformation of the corresponding area, the coding efficiency may be improved compared to the case in which transformation is performed using the transform kernel based on DCT-II for all areas.

FIG. 13 is a diagram illustrating a method of configuring a candidate transform set depending on a prediction mode of a current block. According to an embodiment of the present disclosure, the encoder and the decoder may select a transform kernel used for at least one transform area of the current block on the basis of a candidate transform set corresponding to the current block. The candidate transform set may include a plurality of candidate transform kernels. In addition, the candidate transform set may include candidate transform kernels, which are different from each other, depending on a prediction mode of the current block.

According to an embodiment, the current block may be a block predicted on the basis of any one of a plurality of intra prediction modes. In this case, the pattern of a residual signal of the current block may differ depending on the intra prediction mode used for prediction of the current block. As described above, intra prediction mode information may indicate the intra prediction direction. Accordingly, the pattern of a residual signal of the current block may differ depending on the prediction direction indicated by the intra prediction mode information of the current block. The encoder and the decoder may improve coding efficiency using a plurality of candidate transform sets, which are different from each other, depending on the prediction direction.

Accordingly, the encoder and the decoder may determine a transform kernel to be used in the transform area of the current block from the candidate transform set corresponding to the intra prediction mode of the current block. For example, the transform kernel to be used in the transform area may be signaled through a candidate index indicating any one among a plurality of candidate transform kernels included in the candidate transform set. In the case where the candidate transform set corresponding to the intra prediction mode of the current block includes two candidate transform kernels, the candidate index indicating the transform kernel used in the transform area may be expressed as 1 bit.

In addition, the candidate transform sets, which are different from each other, may be used in the vertical direction and the horizontal direction of the transform area, respectively. Due to the characteristics of the intra prediction method in which prediction is performed on the basis of directivity, a vertical direction pattern of a residual signal in the predicted area may be different from a horizontal direction pattern thereof. Accordingly, a vertical transform kernel and a horizontal transform kernel for the block predicted using a specific intra prediction mode may be obtained from the individual candidate transform sets. In the present disclosure, the transform kernel used for vertical transformation in a specific transform area may be referred to as a "vertical transform kernel". In addition, the transform kernel used for the horizontal transformation in a specific transform area may be referred to as a "horizontal transform kernel". FIG. 13(*a*) shows a candidate transform set corresponding to 67 intra prediction mode indexes. In FIG. 13(*a*), "V" (vertical) indicates a candidate transform set for vertical transform kernels. In addition, "H" (horizontal) indicates a candidate transform set for horizontal transform kernels.

FIG. 13(*b*) shows candidate transform kernels defined according to candidate transform sets. According to an embodiment, a first candidate transform set {e.g., transform set 0 in FIG. 13(*b*)} may include a candidate transform kernel based on DST-VII and a candidate transform kernel based on DCT-VIII. In addition, a second candidate transform set {e.g., transform set 1 in FIG. 13(*b*)} may include a candidate transform kernel based on DST-VII and a candidate transform kernel based on DST-I. A third candidate transform set {e.g., transform set 2 in FIG. 13(*b*)} may include a candidate transform kernel based on DST-VII and a candidate transform kernel based on DCT-V. Although FIG. 13 shows that the candidate transform set includes two candidate transform kernels, the present disclosure is not limited thereto.

According to another embodiment, the current block may be an inter-predicted block. In this case, the transform kernel used in the transform area of the current block may be obtained from the predetermined candidate transform set. For example, the predetermined candidate transform set may be any one among a plurality of candidate transform sets described above. FIG. 13(*c*) shows a candidate transform set corresponding to the current block in the case where the current block is an inter prediction block. For example, a predetermined candidate transform set corresponding to the inter prediction block may include a candidate transform kernel based on DCT-VIII and a candidate transform kernel based on DST-VII. That is, the transform kernel used in the transform area of the inter prediction block may be one of the candidate transform kernel based on DCT-VIII and the candidate transform kernel based on DST-VII.

According to an additional embodiment, the embodiments described above may be limitedly applied only to the transform block of a luma component. In this case, a predetermined basic transform kernel may be used for the transform block of a chroma component. For example, the basic transform kernel may be a transform kernel based on DCT-II.

According to an additional embodiment, the encoder may not signal the candidate index depending on the number of non-zero transform coefficients in the transform area. In this case, the decoder may determine the transform kernel by comparing the number of non-zero transform coefficients in the transform area with a predetermined number. For example, if the number of non-zero transform coefficients is one or two, the candidate index may not be signaled. In this case, the inverse-transformation unit may perform transformation using a predetermined transform kernel for the corresponding area. The predetermined transform kernel may be a transform kernel based on DST-VII.

According to an additional embodiment, MTS may be applied only to the luma component, and DCT-II transformation, such as HEVC, may be used for the chroma component. As an embodiment, on/off may be indicated by a 1-bit flag so as to control MTS in the coding unit, and if the flag indicates off, DCT-II, which is a basic kernel, may be used for the chroma component. On the other hand, if the flag indicates on, the transform candidate index, used in the predetermined transform set according to the prediction mode, may be signaled, and the decoder may perform inverse transformation by applying the transform kernel corresponding to the index. Since different transformations are able to be applied in the horizontal direction and the vertical direction, the transform index using a total of 2 bits having 1 bit for each direction may be indicated. Alternatively, the transform index may be indicated using a truncated unary binarization method. For example, in the case where two kernels of DST-VII and DCT-VIII are available, four transform kernel combinations applicable to the current block may be defined, and may be signaled as follows.

{horizontal: DST-VII, vertical: DST-VII}, 0
{horizontal: DCT-VIII, vertical: DST-VII}, 10
{horizontal: DST-VII, vertical: DCT-VIII}, 110
{horizontal: DCT-VIII, vertical: DCT-VIII}, 111

According to an embodiment of the present disclosure, since there is a high statistical probability of selecting the combination {horizontal: DST-VII, vertical: DST-VII} in MTS, encoding efficiency is expected to be improved in the case where the transform kernel is signaled by the truncated unary binarization method described above, compared to the case where the transform kernel is signaled using the fixed length of 2 bits.

FIG. 14 shows horizontal transform kernels and vertical transform kernels determined depending on set indexes. According to an embodiment of the present disclosure, information indicating the transform kernel for a residual signal in a specific area, among a plurality of available transform kernels, may be signaled. In this case, information indicating any one among a plurality of available transform kernels may be signaled regardless of the prediction mode corresponding to the corresponding area. For example, the encoder may signal transform kernel information indicating the transform kernel for the residual signal in the specific area. The decoder may obtain the transform kernel for the corresponding area using the signaled transform kernel information. In this case, the transform kernel information may include at least one piece of information indicating a horizontal transform kernel in the corresponding area or information indicating a vertical transform kernel in the corresponding area. This method may be referred to as the "multiple transform selection (MTS)" described above.

The transform kernel may be indicated by any one of kernel indexes indicating a plurality of available transform kernels. According to an embodiment, the transform kernel corresponding to kernel index '0' may be a transform kernel based on DCT-II, the transform kernel corresponding to kernel index '1' may be a transform kernel based on DST-VII, and the transform kernel corresponding to kernel index '2' may be a transform kernel based on DCT-VIII.

According to an embodiment, the transform kernel information may be a set index indicating a transform kernel set. The transform kernel set may indicate a combination of a transform kernel to be used as a vertical transform kernel and a transform kernel to be used as a horizontal transform kernel. In addition, the set index may indicate a combination of a kernel index indicating the horizontal transform kernel and a kernel index indicating the vertical transform kernel. Referring to FIG. 14(*a*), if transform kernel information on a specific area indicates a set index indicating a first transform kernel set {e.g., if tu_mts_idx[x0][y0] is 0 in FIG. 14(*a*)}, the vertical transform kernel in the corresponding area may be a transform kernel corresponding to kernel index '0'. In addition, the horizontal transform kernel in the corresponding area may be a transform kernel corresponding to kernel index '0'.

In addition, FIG. 14(*b*) shows transform kernels corresponding to the kernel indexes. Referring to FIG. 14(*b*), the transform kernel corresponding to the first kernel index '0' may indicate a transform kernel based on DCT-II. In addition, the transform kernel corresponding to the second kernel index '1' may indicate a transform kernel based on DST-VII. In addition, the transform kernel corresponding to the third kernel index '2' may indicate a transform kernel based on DCT-VIII.

According to an additional embodiment, the embodiments described above may be limitedly applied only to the luma blocks. In this case, a predetermined basic transform kernel may be used for the chroma component. For example, the basic transform kernel may be a transform kernel based on DCT-II. In addition, the set index described above may be signaled in units of a transform block.

In addition, information indicating whether or not to signal the set index may be signaled through a header of a high level including the current block. Here, the high level may indicate a slice/tile, a picture, or a sequence including the current block. In addition, the information indicating whether or not to signal the set index may be signaled through an individual flag for each prediction method. For example, in determining the transform kernel of the block, the flag indicating whether or not the set index is used may be independently configured for the intra-predicted block and the inter-predicted block, respectively.

According to an embodiment, if the information, indicating whether or not to signal the set index of a high level including the transform block, explicitly indicates that the set index is not to be signaled, the transform kernel for the corresponding transform block may be determined in a different method. For example, the transform kernel to be applied to inverse transformation of the current transform block may be determined on the basis of information derived from the information other than the set index. Specifically, the decoder may derive information indicating the transform kernel for the current transform block from the information signaled in relation to the current transform block. That is, information indicating a vertical transform kernel and information indicating a horizontal transform kernel, which are to be used for the transform block, may be implicitly signaled. According to another embodiment, if the information, indicating whether or not to signal the set index of a high level including the transform block, explicitly indicates that the set index is to be signaled, the decoder may obtain the transform kernel for the transform block on the basis of the signaled set index.

According to an additional embodiment, the encoder may determine whether or not to signal the set index depending on the number of non-zero transform coefficients in the transform area. In this case, the decoder may determine the transform kernel by comparing the number of non-zero transform coefficients in the transform area with a predetermined number. For example, if the number of non-zero transform coefficients is two or less, the set index may not be signaled. In this case, the inverse-transformation unit may perform transformation using a predetermined transform kernel for the corresponding area. The predetermined transform kernel may be a transform kernel based on DST-VII.

FIG. 15 is a diagram illustrating a method of obtaining transform-related information according to an embodiment of the present disclosure. The transformation of a residual signal of the current block and the inverse transformation of a transform coefficient may be performed for each transform block (or transform unit). The current block may include at least one transform block. That is, the transform block may be the current block itself, or may be a block that is partitioned from the current block. If the transform block is the current block itself, the size of the transform block may be the same as the size of the current block. According to an embodiment, the current block may be partitioned into a plurality of transform blocks on the basis of the size of the current block. For example, if the size of the current block is greater than the maximum transform size, the current block may be partitioned into a plurality of transform blocks. If the size of the current block is less than or equal to the maximum transform size, the transform block may be the current block itself. As an embodiment, the size of the transform block may be the same as the size of a coding block. That is, the transform block may be partitioned into the same tree structure as the coding block. However, if the size of the coding block is greater than the maximum transform size, the current block may be partitioned into a plurality of transform blocks having the maximum transform size.

In an embodiment, the maximum transform size may be a value indicating the length of one side. For example, the maximum transform size may be 64 in length (or point). In this case, if the size (width×height) of the current block is 128×32, the current block may be partitioned into two transform blocks having a size of 64×32. If the maximum transform size is 32, and if the size of the current block is 32×32, the transform block may not be partitioned from the current block, and may have the same size as the current block.

If both the width and the height of the current block are less than or equal to the maximum transform size, the current block is not partitioned into a plurality of transform blocks. Accordingly, the coordinates of a top-left corner of the current block and the coordinates of a top-left corner of the corresponding transform block are the same. On the other hand, if at least one of the width and the height of the current block is greater than the maximum transform size, the current block may be partitioned into a plurality of transform blocks. Accordingly, the coordinates of a top-left corner of the current block may be different from the coordinates of top-left corners of the corresponding transform blocks.

FIG. 15(*a*) shows transform unit syntax. The transform unit syntax indicates a process related to transformation and inverse transformation. The transform unit syntax receives factors such as (x0, y0) that are the coordinates of a top-left corner of the transform block, tbWidth and tbHeight indicating the sizes of the transform block in the horizontal and vertical directions, and treeType indicating the tree type.

According to an embodiment, transform-related information may include coded block flag (cbf) information tu_cbf_luma, tu_cbf_cb, and tu_cdf_cr indicating whether or not the transform block includes at least one non-zero transform coefficient. The cbf information may be obtained separately according to the components of the transform unit. For example, the transform-related information may include at least one of cbf information tu_cbf_luma[x0][y0] on a luma component and cbf information tu_cbf_cb[x0][y0] and tu_cbf_cr[x0][y0] on two chroma components.

According to an embodiment, if the cbf information of the transform block indicates that the transform block includes at least one non-zero transform coefficient, inverse quantization and inverse transformation for the corresponding transform block may be performed. In this case, the decoder may inversely quantize the quantized transform coefficient using information related to residual coding. In addition, the decoder may inversely transform the inversely quantized transform coefficient, thereby obtaining a residual signal corresponding to the transform block. On the other hand, if the cbf information of the corresponding transform block indicates that the transform block does not include at least one non-zero coefficient, the decoder may not perform the inverse quantization and the inverse transformation on the corresponding transform block. In this case, the decoder may obtain the residual signal without the inverse quantization and inverse transformation processes on the transform block. For example, when there is no cbf information of the transform block, the cbf information may be regarded that the transform block does not include at least one non-zero coefficient. The encoder may entropy-code the cbf information through the entropy coding unit described above. In addition, the decoder may obtain the cbf information from a bitstream through the entropy decoding unit described above.

Encoding may be performed such that the tree structure of the luma component is the same as or different from the tree structure of the chroma component. Accordingly, the cbf information may be obtained on the basis of the information (treeType) indicating the tree type of the transform block (S1501). According to an embodiment, if treeType of the transform block indicates SINGLE_TREE, the tree structure of a transform block for the luma component of the current block may be the same as the tree structure of a transform block for the chroma component of the current block. In this case, cbf information on the luma component and cbf information on each chroma component may be obtained.

According to another embodiment, if treeType of the transform block indicates DUAL_TREE_LUMA or DUAL_TREE_CHROMA, the luma component and the chroma component of the current block may be partitioned into transform blocks having different structures from each other, respectively. If treeType of the transform block indicates DUAL_TREE_LUMA, this indicates that the transform block, which is currently processed, is a luma component block. Accordingly, cbf information on the luma component may be obtained. In addition, if treeType information of the transform block indicates DUAL_TREE_CHROMA, this indicates that the transform block, which is currently processed, is a chroma component block. Accordingly, cbf information on the chroma component may be obtained.

In FIG. 15(*a*), tu_cbf_luma[x0][y0] is an element indicating whether or not the luma component transform block includes one or more non-zero coefficients, and if the element is 1, this indicates that there is a non-zero coefficient in the corresponding transform block in which the position of the top-left luma component sample of the block is (x0, y0) on the basis of the position of the top-left luma component sample of a picture. For example, if tu_cbf_luma[x0][y0] does not exist, the element may be inferred as 0. If tu_cbf_luma[x0][y0] is 0, this indicates that all coefficients in the corresponding luma transform block are 0, so the decoder may reconstruct a corresponding residual signal for the luma component without additional parsing, inverse quantization, and inverse transformation. If tu_cbf_luma[x0][y0] is 1, this indicates that one or more non-zero transform coefficients exist in the corresponding luma transform block, so the parsing and inverse quantization processes of the syntax element related to the transform coefficients may be required in the residual_coding syntax structure, and the residual signal may be reconstructed by applying inverse transformation to the inversely quantized coefficient. tu_cbf_luma[x0][y0] may be encoded/decoded using a regular coding engine of CABAC considering a context.

tu_cbf_cb[x0][y0] is an element indicating whether or not the chroma component Cb transform block includes one or more non-zero coefficients, and if the element is 1, this indicates that a non-zero coefficient exists in the corresponding transform block in which the top-left position is (x0, y0). For example, if tu_cbf_cb[x0][y0] does not exist, the element may be inferred as 0. If tu_cbf_cb[x0][y0] is 0, this indicates that all coefficients in the corresponding Cb transform block are 0, so the decoder may reconstruct a residual signal for a Cb signal without additional parsing, inverse quantization, and inverse transformation. If tu_cbf_cb[x0][y0] is 1, this indicates that one or more non-zero transform coefficients exist in the corresponding Cb transform block, so the parsing and inverse quantization processes of the syntax element related to the transform coefficients may be required in the residual_coding syntax structure, and the residual signal may be reconstructed by applying inverse transformation to the inversely quantized coefficient. tu_cbf_cb[x0][y0] may be encoded/decoded using a regular coding engine of CABAC considering a context.

tu_cbf_cr[x0][y0] is an element indicating whether or not the chroma component Cr transform block includes one or more non-zero coefficients, and if the element is 1, this indicates that a non-zero coefficient exists in the transform block in which the top-left position is (x0, y0). For example, if tu_cbf_cr[x0][y0] does not exist, the element may be inferred as 0. If tu_cbf_cr[x0][y0] is 0, this indicates that all coefficients in the corresponding Cr transform block are 0, so the decoder may reconstruct a residual signal for a Cr signal without additional parsing, inverse quantization, and inverse transformation processes. If tu_cbf_cr[x0][y0] is 1, this indicates that one or more non-zero transform coefficients exist in the corresponding Cr transform block, so the parsing and inverse quantization processes of the syntax element related to the transform coefficient may be required in the residual_coding syntax structure, and the residual signal may be reconstructed by applying inverse transformation to the inversely quantized coefficient. tu_cbf_cr[x0][y0] may be encoded/decoded using a regular coding engine of CABAC considering a context.

Next, the encoder and the decoder may identify conditions for parsing MTS information cu_mts_flag indicating whether or not an MTS method is used in the current transform block (S1502). Hereinafter, conditions for parsing cu_mts_flag will be described. First, it may be determined whether or not to parse cu_mts_flag on the basis of high-level MTS information sps_mts_intra_enabled_flag and sps_mts_inter_enabled_flag signaled through a high-level header of the current transform block. The high-level MTS information may be information indicating whether or not a transform kernel other than the basic transform kernel is able to be used. According to an embodiment, if sps_mts_intra_enabled_flag is 0, this may indicate that cu_mts_flag corresponding to the intra-predicted block included in a corresponding SPS does not exist. In this case, cu_mts_flag is not parsed. On the other hand, if sps_mts_intra_enabled_flag is 1, this may indicate that cu_mts_flag corresponding to the intra-predicted block included in the corresponding SPS exists. In this case, cu_mts_flag may be signaled and parsed.

Similarly, if sps_mts_inter_enabled_flag is 0, this may indicate that cu_mts_flag corresponding to the inter-predicted block included in the corresponding SPS does not exist. In this case, cu_mts_flag is not parsed. On the other hand, if sps_mts_inter_enabled_flag is 1, this may indicate that cu_mts_flag corresponding to the inter-predicted block included in the corresponding SPS exists. In this case, cu_mts_flag may be signaled and parsed. The high-level MTS information may be signaled through the high-level syntax such as a header of a sequence, a picture, or a slice/tile.

In addition, cuPredMode[x0][y0] is a variable indicating a prediction mode of a transform block in which the position of a top-left luma component sample is (x0, y0) with respect to the coordinates of a top-left corner of the luma component of a picture. If cuPredMode[x0][y0] is MODE_INTRA, this indicates that intra prediction is applied to a corresponding block. In addition, in the case of MODE_INTER, this indicates that inter prediction is applied to the corresponding block. That is, in S1502, (CuPredMode[x0][y0]==MODE_INTRA) && (sps_mts_intra_enabled_flag) examines whether or not MTS is able to be applied in the case where intra prediction is applied to the current transform block. In addition, in S1502, (CuPredMode[x0][y0]==MODE_INTER) && (sps_mts_inter_enabled_flag) examines whether or not MTS is able to be applied in the case where inter prediction is applied to the current transform block.

In addition, it may be determined whether or not to parse cu_mts_flag on the basis of tu_cbf_luma[x0][y0]. This is due to the fact that if tu_cbf_luma[x0][y0] indicates that all coefficients of the luma component of the corresponding transform block are 0, the inverse transformation is not required to be performed. According to an additional embodiment, only the transform kernel based on DCT-II may be used in transformation of the chroma component. In addition, it may be determined whether or not to parse cu_mts_flag on the basis of whether or not the height tbHeight and the width tbWidth of the transform block are less than or equal to a predetermined length. The above conditions may be summarized as follows.

Condition i) sps_mts_intra_enabled_flag == 1, and CuPredMode[x0][y0] == MODE_INTRA or sps_mts_inter_enabled_flag == 1, and CuPredMode[x0][y0] == MODE_INTER,
Condition ii) tu_cbf_luma[x0][y0] == 1,
Condition iii) treeType != DUAL_TREE_CHROMA,
Condition iv) tbWidth <= 32 and tbHeight <= 32.

If all of the above four conditions are satisfied, the decoder may parse cu_mts_flag. In addition, the encoder may entropy-code cu_mts_flag, and may then signal the same. If cu_mts_flag[x0][y0] is 1, this may indicate that an MTS method is to be applied to the current transform block. On the other hand, if cu_mts_flag[x0][y0] is 0, this may indicate that the MTS method is not to be applied to the current transform block. In this case, inverse transformation may be performed using a basic kernel such as a transform kernel based on DCT-II. If cu_mts_flag[x0][y0] does not exist, cu_mts_flag[x0][y0] may be inferred as '0'.

According to an embodiment of the present disclosure, the transform kernel used for transformation of a transform block may be signaled by stages through a high-level header of the current block and a header of the transform block. First, information indicating whether or not a transform kernel other than the basic transform kernel is able to be used in a sequence, a picture, or a slice/tile including the current block may be signaled through the high-level header. In addition, the corresponding information may be individually signaled for intra prediction and inter prediction. According to a specific embodiment, sps_mts_intra_enabled_flag and sps_mts_inter_enabled_flag may be signaled through the header of the sequence, the picture, or the slice/tile. sps_mts_intra_enabled_flag may be information indicating whether or not a transform kernel other than the basic transform kernel is able to be used in transformation of the intra-predicted block. In addition, sps_mts_inter_enabled_flag may be information indicating whether or not a transform kernel other than the basic transform kernel is able to be used in transformation of the inter-predicted block. The basic transform kernel may be a transform kernel based on DCT-II.

That is, if sps_mts_intra_enabled_flag indicates that a transform kernel other than the basic transform kernel is not allowed to be used, and if the current block is an intra-predicted block, information related to the transform kernel of the transform block obtained from the current block may not be further parsed. In this case, the corresponding transform block may be transformed on the basis of the basic transform kernel. In addition, if sps_mts_inter_enabled_flag indicates that a transform kernel other than the basic transform kernel is not allowed to be used, and if the current block is an inter-predicted block, information related to the transform kernel of the transform block obtained from the current block may not be further parsed. In this case, the corresponding transform block may be transformed on the basis of the basic transform kernel.

On the other hand, if the information signaled through the high-level header indicates that a transform kernel other than the basic transform kernel is able to be used, additional information related to the transform kernel of the corresponding transform block may be signaled through the header of the transform block. For example, in transformation of the transform block, information, indicating whether or not a transform kernel other than the basic transform kernel is to be used, may be signaled through the header of the corresponding transform block.

According to an embodiment of the present disclosure, the use of a transform kernel other than the basic transform kernel for the transform block may be limited depending on the size of the corresponding transform block. For example, if the size of the transform block is greater than a predetermined size, the use of a transform kernel other than the basic transform kernel may be limited in transformation of the corresponding transform block. According to an embodiment, if at least one of the height or the width of the transform block is greater than a predetermined length, a transform kernel other than the basic transform kernel may not be allowed to be used in transformation of the corresponding transform block. For example, the predetermined length may be 32. Referring to FIG. 15(*a*), if the width of the transform block is 32 or less, and if the height thereof is 32 or less, cu_mts_flag[x0][y0] signaled through the header of the transform block described above may be parsed.

As shown in FIG. 15(*a*), if the aforementioned cbf information indicates that the transform block includes at least one non-zero transform coefficient, a process of obtaining a quantized transform coefficient for the corresponding transform block may be performed (S1503 to S1505). In S1503, if tu_cbf_luma[x0][y0]==1, residual coding for the luma component of the transform block may be performed. That is, processing a residual coding syntax structure {residual_coding( )} receiving a specific input factor may be performed. Specifically, residual_coding( ) may receive, as input factors, the coordinates (x0, y0) of a top-left sample of the transform block, the value log 2(tbWidth) obtained by applying the logarithm of base 2 to the width of the transform block, and the value log 2(tbHeight) obtained by applying the logarithm of base 2 to the height of the transform block. In addition, residual_coding( ) may receive a color index (cdIdx) as an input factor. If the value of cdIdx is '0', this indicates a luma component "luma", if the value is '1', this indicates a first chroma component "Cb", and if the value is '2', this indicates a second chroma component "Cr".

In S1504, if tu_cbf_cb[x0][y0]==1, residual coding for the first chroma component may be performed. Specifically, residual_coding( ) may receive the coordinates (x0, y0) of the top-left sample of the transform block as an input factor. If color format YCbCr is 4:2:0, the size of the chroma component in the transform block may be half the size of the luma component block. Accordingly, residual_coding( ) may receive, as input factors, the value log 2(tbWidth/2)

obtained by applying the logarithm of base 2 to the width (tbWidth/2) of the chroma component block, and the value log 2(tbHeight/2) obtained by applying the logarithm of base 2 to the height (tbHeight/2) of the chroma component block. Meanwhile, if color format YCbCr is 4:4:4, the size of the chroma component block in the transform block may be the same as the size of the luma component block. In this case, like the residual coding of the luma component, residual_coding( ) may receive, as input factors, the value log 2(tbWidth) obtained by applying the logarithm of base 2 to the width of the transform block and the value log 2(tbHeight) obtained by applying the logarithm of base 2 to the height of the transform block.

In S1505, if tu_cbf_cr[x0][y0]==1, residual coding for the second chroma component may be performed. Specifically, residual_coding( ) may receive the coordinates (x0, y0) of the top-left sample of the transform block as an input factor. If color format YCbCr is 4:2:0, the size of the chroma component in the transform block may be half the size of the luma component block. Accordingly, residual_coding( ) may receive, as input factors, the value log 2(tbWidth/2) obtained by applying the logarithm of base 2 to the width (tbWidth/2) of the chroma component block and the value log 2(tbHeight/2) obtained by applying the logarithm of base 2 to the height (tbHeight/2) of the chroma component block. Meanwhile, if color format YCbCr is 4:4:4, the size of the chroma component block in the transform block may be the same as the size of the luma component block. In this case, like the residual coding for the luma component, residual_coding( ) may receive, as input factors, the value log 2(tbWidth) obtained by applying the logarithm of base 2 to the width of the transform block and the value log 2(tbHeight) obtained by applying the logarithm of base 2 to the height of the transform block.

The decoder may perform inverse quantization and inverse transformation on the corresponding transform block on the basis of the transform-related information described above. The decoder may obtain a residual signal corresponding to the transform block by performing inverse quantization and inverse transformation. Specifically, the decoder may obtain a residual signal from the quantized transform coefficient of the transform block through the residual coding syntax (residual_coding( )) in FIG. 15(*b*).

residual_coding( ) in FIG. 15(*b*) may receive, as factors, the coordinates of a top-left corner of the transform block obtained from the current block on the basis of the coordinate of a top-left corner of the picture including the current block, the value obtained by applying the logarithm of base 2 to the width of the transform block, the value obtained by applying the logarithm of base 2 to the height of the transform block, and a color index (cIdx). In addition, the residual coding syntax structure may include syntax elements related to the quantized transform coefficient existing in the transform block, and the decoder may obtain a quantized transform coefficient block by parsing the syntax elements related to the quantized transform coefficient included in the residual syntax structure. The inverse transformation unit of the decoder may reconstruct the residual signal corresponding to the transform block by performing inverse quantization and inverse transformation on the quantized transform coefficient block.

According to an embodiment, the decoder may determine whether or not to parse transform_skip_flag of the current transform block (S1506). The conditions for parsing transform_skip_flag are as follows.

Condition i) transform_skip_enabled_flag, which is a 1-bit flag included in a high-level syntax, is 1 (on): transform_skip_enabled_flag may be included in any one of a sequence parameter set (SPS), a picture parameter set (PPS), and a slice header. If transform_skip_enabled_flag is 1, this indicates that transform_skip_flag exists in the residual coding syntax, and if transform_skip_enabled_flag is 0, this indicates that no transform_skip_flag exists therein.

Condition ii) the current transform block is not a luma component transform block (cIdx!=0) or MTS is not applied (cu_mts_flag[x0][y0]==0): The transformation skip may be applied to both the luma component and the chroma component. In the case of applying MTS to the luma component transform block (cIdx==0 && cu_mts_flag[x0][y0]==1), it is apparent that the transformation is performed, so transform_skip_flag[x0][y0][cIdx] is not required to be encoded/decoded.

Condition iii) the width of the transform block is 4 or less (log 2TbWidth<=2) and the height thereof is 4 or less (log 2TbHeight<=2).

It may be determined whether or not to parse transform_skip_flag[x0][y0][cIdx] depending on the conditions described above. If transform_skip_flag[x0][y0][cIdx] is 1, the decoder may not perform transformation. If transform_skip_flag[x0][y0][cIdx] is 0, the decoder may determine whether or not to perform transformation of the current transform block in consideration of other syntax elements. The decoder may perform the process of parsing and restoring the quantized transform coefficient through residual_coding( ) portion omitted from FIG. 15(*b*).

Next, the decoder may determine whether or not to parse a set index (mts_idx) (S1507). Conditions for parsing mts_idx are as follows.

i) cu_mts_flag[x0][y0]==1 and luma component transform block (cIdx==0)

ii) If transform_skip_flag[x0][y0]==0: transform_skip_flag[x0][y0] is 1, this indicates that the transform skip is applied, so it is not necessary to determine the transform kernel to be used.

iii) The current transform block is at least a portion of the intra predicted block (CuPredMode[x0][y0]==MODE_INTRA), there are 3 or more non-zero coefficients in the corresponding block (numSigCoeff>2), or the current transform block is at least a portion of the inter-predicted block (CuPredMode[x0][y0]==MODE_INTER) (here, the variable "numSigCoeff" indicates the number of non-zero coefficients in the transform block).

In relation to condition iii), if the number of non-zero coefficients existing in the transform block is 2 or less (1 or 2), transformation using a predetermined transform kernel may be performed on the current transform block without signaling/parsing mts_idx[x0][y0]. In this case, the predetermined transform kernel may be a transform kernel based on DST-VII, and a transform kernel based on DST-IV, instead of the transform kernel based on DST-VII, may also be used.

According to an embodiment of the present disclosure, since the energy distribution of the residual signal has a correlation with the shape of the block, if the transform kernel is adaptively applied in consideration of the shape of the block, the residual signal may be encoded more efficiently.

FIG. 16 is a diagram illustrating a method of selecting a transform kernel on the basis of the shape of a block according to an embodiment of the present disclosure. According to an embodiment of the present disclosure, if an MTS flag (e.g., cu_mts_flag) indicating that MTS is applied to the current block is 0, the encoder/decoder may select a transform kernel (or a transform type) depending on the shape of the block (or the width/height of the block) for the intra block. If the MTS flag is 0, the MTS index (e.g., mts_idx) indicating a specific transform kernel applied to the current block may not be signaled, and may be inferred as −1. In the embodiments to be described later, if the MTS flag is 0, the encoder/decoder may select the transform kernel used for the intra predicted block depending on the size or the shape of the current block, and may apply DCT-II in the horizontal and vertical directions for the inter-predicted block, regardless of the shape of the block.

In the present disclosure, although the case in which MTS is applied on the basis of the MTS flag is described separately from the case in which MTS is not applied, the present disclosure is not limited thereto. For example, whether or not to apply MTS may denote whether or not a transform kernel, other than a predefined specific transform kernel (that may be referred to as a basic transform type, a default transform type, or the like), is used. If MTS is applied, a transform type other than the basic transform type (e.g., any one among a plurality of transform types or a combined transform type of two or more thereof) may be used for transformation, and if MTS is not applied, the basic transform type may be used for transformation. As an example, the basic transform type may be configured (or defined) as DCT-II.

In an embodiment of the present disclosure, if the intra predicted block is a square block, the encoder/decoder may apply DCT-II in the horizontal direction and the vertical direction. In addition, if the intra predicted block is a rectangular block (i.e., a non-square block), the encoder/decoder may apply DCT-II in the direction of a longer length, and may apply DST-VII in the direction of a shorter length. In this case, if the shorter length is greater than the maximum transform size of DST-VII, the encoder/decoder may use DCT-II. For example, if the maximum transform size of DST-VII is 16 points (or 32 in length), DCT-II may be applied in the horizontal direction of a block of 64×16, and DST-VII may be applied in the vertical direction thereof. In addition, for a block of 64×32, DCT-II may be applied both in the horizontal direction and in the vertical direction.

In addition, in an embodiment of the present disclosure, in the case where the intra predicted block is a square block, the encoder/decoder may apply DCT-II in the horizontal direction and the vertical direction, and in the case of a rectangular block, the encoder/decoder may apply DCT-II in the direction of a longer length, and may use DCT-II or DST-VII in the direction of a shorter length by signaling a 1-bit flag. However, the encoder/decoder may use DCT-II without signaling a 1-bit flag in the case where the length of a shorter side is greater than the maximum transform size of DST-VII. For example, if the maximum transform size of DST-VII is 16 points, DCT-II may be applied in the horizontal direction of 64×16, and DCT-II or DST-VII may be applied in the vertical direction thereof by parsing the 1-bit flag, and DCT-II may be applied both in the horizontal direction and in the vertical direction for a block of 64×32. Although DST-VII may be regarded as being efficient in consideration of the characteristics of intra prediction, the use of DCT-II other than DST-VII may bring about less rate-distortion cost, so, unlike the previous embodiment, in this embodiment, DCT-II may be further considered for the direction of the shorter length by 1-bit signaling. That is, if the 1-bit flag is 0, this may indicate that DCT-II is applied in the direction of the shorter length, and if the 1-bit flag is 1, this may indicate that DST-VII is applied in the direction of the shorter length. In an embodiment, the 1-bit flag may be encoded/decoded using a regular coding engine of CABAC that uses a context.

In addition, in an embodiment of the present disclosure, for the intra predicted block, the encoder/decoder, in the case of a square block, may apply DCT-II in the horizontal direction and the vertical direction, and in the case of a rectangular block, may apply DCT-II in the direction of a longer length, and may apply DST-IV or DST-VII in the direction of a shorter length. However, if the shorter length is greater than the maximum transform size of DST-VII, DCT-II may be applied thereto. As described above, since DST-VII has high implementation complexity, DST-IV having a pattern of a low-frequency basis function similar thereto may be used, but if DST-VII is replaced by DST-IV for all the sizes, the encoding efficiency may be reduced. Thus, DST-IV may be used for the small size of 4 points, and DST-VII may be used for other sizes.

In addition, in an embodiment of the present disclosure, for the intra predicted block, the encoder/decoder, in the case of a square block, may apply DCT-II in the horizontal direction and the vertical direction, and in the case of a rectangular block, may apply DCT-II in the direction of a longer length, and may determine a transform kernel depending on the intra prediction mode in the direction for a shorter length. For example, if the intra prediction mode is a DC or planar mode, which is a non-directional mode, the encoder/decoder may apply DCT-II in the direction of the shorter length.

If the intra prediction mode is a horizontal direction mode (i.e., the intra prediction mode that is greater than or equal to a horizontal diagonal mode and is smaller than or equal to a central diagonal mode) for a horizontal rectangle in which the horizontal length of the block is greater than the vertical length thereof, the encoder/decoder may apply DCT-II in the direction of the shorter length (vertical direction). In addition, if the intra prediction mode is a vertical direction mode (i.e., the intra prediction mode that is greater than the central diagonal mode and is smaller than or equal to the vertical diagonal mode), the encoder/decoder may apply DST-VII in the direction of the shorter length. If the intra prediction mode is a horizontal direction mode for a vertical rectangle in which the vertical length of the block is greater than the horizontal length, the encoder/decoder may apply DST-VII in the direction of a shorter length (horizontal direction), and if the intra prediction mode is a vertical direction mode, the encoder/decoder may apply DCT-II thereto.

According to an embodiment of the present disclosure, whether or not to apply shape adaptive transform (SAT) indicating a method of adaptively determining the transform kernel on the basis of the shape of the block in the embodiments described above may be signaled from the encoder to the decoder through high-level syntax. As an embodiment, whether or not SAT is to be applied may be signaled through a sequence parameter set (SPS), a picture parameter set (PPS), a slice header, or a tile header. In addition, the syntax element indicating whether or not SAT is to be applied may be a 1-bit flag. Hereinafter, methods of indicating whether or not SAT is to be applied in the high-level syntax will be described. In the present disclosure, for the convenience of explanation, a method of adaptively determining the transform kernel on the basis of the size or the shape of the block will be referred to as "SAT", but the present disclosure is not limited to the term. For example, the SAT may be referred to as "implicit MTS".

Hereinafter, a syntax signaling method related to whether or not SAT is to be applied will be described by way of example with reference to Tables 1 to 8. Although the embodiment will be described based on the case in which a flag indicating whether or not SAT is to be applied is included in the SPS, but the present disclosure is not limited thereto.

TABLE 1

| |
|---|
| sps_mts_enabled_flag |
| sps_sat_enabled_flag |

Referring to Table 1, in an embodiment of the present disclosure, the syntax element indicating whether or not SAT is to be applied may be signaled independently of the syntax element indicating whether or not MTS is applied. That is, as an embodiment, sps_mts_enabled_flag, indicating whether or not MTS is able to be applied to the current sequence, may be signaled, and sps_sat_enabled_flag, indicating whether or not SAT is able to be applied to the current sequence, may be signaled regardless of the value of sps_mts_enabled_flag. That is, it may be determined whether or not SAT is able to be applied to the current sequence depending on the value of sps_sat_enabled_flag, regardless of sps_mts_enabled_flag.

TABLE 2

| |
|---|
| sps_mts_enabled_flag |
| if( !sps_mts_enabled_flag ) |
| sps_sat_enabled_flag |

Referring to Table 2, in an embodiment of the present disclosure, the syntax element, indicating whether or not SAT is to be applied, may be determined depending on the syntax element indicating whether or not the MTS is applied. As an embodiment, sps_mts_enabled_flag, indicating whether or not MTS is able to be applied to the current sequence, may be signaled first, and whether or not to signal sps_sat_enabled_flag, indicating whether or not SAT is able to be applied to the current sequence, may be determined depending on the value of sps_mts_enabled_flag. For example, if sps_mts_enabled_flag is 1, sps_sat_enabled_flag may not be signaled. In this case, sps_sat_enabled_flag may be configured (or inferred) as 0 without signaling the same, which may indicate that SAT is not to be used for all blocks in the current sequence. If sps_mts_enabled_flag is 0, sps_sat_enabled_flag may be signaled, and the decoder may determine whether or not SAT is able to be used in the current sequence depending on the value of the signaled sat_enabled_flag.

TABLE 3

| |
|---|
| sps_mts_enabled_flag |
| if( !sps_mts_enabled_flag ) |
| sps_sat_enabled_flag |

Referring to Table 3, in an embodiment of the present disclosure, the syntax element, indicating whether or not SAT is to be applied, may be determined depending on the syntax element indicating whether or not the MTS is applied. As an embodiment, sps_mts_enabled_flag, indicating whether or not MTS is able to be applied to the current sequence, may be signaled first, and whether or not to signal sps_sat_enabled_flag, indicating whether or not SAT is able to be applied to the current sequence, may be determined depending on the value of sps_mts_enabled_flag. For example, if sps_mts_enabled_flag is 1, sps_sat_enabled_flag may not be signaled. In this case, sps_sat_enabled_flag may be configured (or inferred) as 1 without signaling the same, which may indicate that SAT is able to be used for all blocks in the current sequence. If sps_mts_enabled_flag is 0, sps_sat_enabled_flag may be signaled, and the decoder may determine whether or not the SAT is able to be used in the current sequence depending on the value of the signaled sat_enabled_flag.

TABLE 4

| |
|---|
| sps_mts_enabled_flag |
| if( !sps_mts_enabled_flag ) |
| sps_only_dct2_enabled_flag |

Referring to Table 4, in an embodiment of the present disclosure, it may be determined whether or not SAT is to be applied according to a flag (or a syntax element) indicating that only a DCT-II transform kernel is to be used in the current sequence. As an embodiment, sps_mts_enabled_flag, indicating whether or not MTS is able to be applied to the current sequence, may be signaled first, and sps_only_dct2_enabled_flag, which is a flag indicating whether or not only a DCT-II transform kernel is to be used in the current sequence, may be signaled according to sps_mts_enabled_flag. For example, if sps_mts_enabled_flag is 0, sps_only_dct2_enabled_flag may be signaled. If sps_only_dct2_enabled_flag is 1, this may indicate that all blocks in the current sequence are unable to use SAT, and if sps_only_dct2_enabled_flag is 0, this may indicate that SAT is able to be used in the current sequence. If sps_mts_enabled_flag is 1, sps_only_dct2_enabled_flag may be configured (or inferred) as 0 without signaling the same, and if sps_only_dct2_enabled_flag is configured (or inferred) as 0, this may indicate that SAT is able to be used in the current sequence.

TABLE 5

| |
|---|
| sps_only_dct2_enabled_flag |
| if( !sps_only_dct2_enabled_flag) |
| sps_mts_enabled_flag |

Referring to Table 5, in an embodiment of the present disclosure, it may be determined whether or not SAT is to be applied according to a flag (or a syntax element) indicating that only a DCT-II transform kernel is able to be used in the current sequence. As an embodiment, sps_only_dct2_enabled_flag, which is a flag indicating whether or not only a DCT-II transform kernel is to be used in the current sequence, may be signaled first. Then, it may be determined whether or not to signal sps_mts_enabled_flag, which is a flag indicating whether or not MTS is able to be used in the current sequence, according to sps_only_dct2_enabled_flag. For example, if sps_only_dct2_enabled_flag is 1, sps_mts_enabled_flag may be configured (or inferred) as 0 without signaling the same, and sps_sat_enabled_flag, which is a flag indicating whether or not SAT is able to be applied to the current sequence, may be configured as 0 without signaling the same. If sps_only_dct2_enabled_flag is 0, sps_mts_enabled_flag may be signaled, and accordingly, sps_sat_enabled_flag may be configured as 1 without signaling the same so that the decoder may apply SAT to the current sequence.

TABLE 6

```
sps_only_dct2_enabled_flag
if( !sps_only_dct2_enabled_flag )
{
  sps_mts_enabled_flag
  sps_sat_enabled_flag
}
```

Referring to Table 6, in an embodiment of the present disclosure, it may be determined whether or not SAT is to be applied according to a flag (or a syntax element) indicating that only a DCT-II transform kernel is able to be used in the current sequence. As an embodiment, sps_only_dct2_enabled_flag, which is a flag indicating whether or not only a DCT-II transform kernel is to be used in the current sequence, may be signaled first. Then, it may be determined whether or not to signal sps_mts_enabled_flag, which is a flag indicating whether or not MTS is able to be applied to the current sequence, according to sps_only_dct2_enabled_flag. For example, if sps_only_dct2_enabled_flag is 1, sps_mts_enabled_flag may be configured (or inferred) as 0 without signaling the same, and sps_sat_enabled_flag, which is a flag indicating whether or not SAT is able to be applied to the current sequence, may be configured (or inferred) as 0 without signaling the same. If sps_only_dct2_enabled_flag is 0, sps_mts_enabled_flag and sps_sat_enabled_flag may be signaled, and it may be determined whether or not SAT is able to be used in the current sequence depending on the value of the signaled sps_sat_enabled_flag.

TABLE 7

```
sps_only_dct2_enabled_flag
if( !sps_only_dct2_enabled_flag )
{
  sps_mts_enabled_flag
  if( !sps_mts_enabled_flag )
    sps_sat_enabled_flag
}
```

Referring to Table 7, in an embodiment of the present disclosure, it may be determined whether or not SAT is to be applied according to a flag (or a syntax element) indicating that only a DCT-II transform kernel is to be used in the current sequence and a flag (or a syntax element) indicating whether or not MTS is able to be applied to the current sequence. As an embodiment, sps_only_dct2_enabled_flag, which is a flag indicating whether or not only a DCT-II transform kernel is to be used in the current sequence, may be signaled first. Then, it may be determined whether or not to signal sps_mts_enabled_flag, which is a flag indicating whether or not MTS is able to be applied to the current sequence, according to the value of sps_only_dct2_enabled_flag. For example, if sps_only_dct2_enabled_flag is 1, sps_mts_enabled_flag may be configured (or inferred) as 0 without signaling the same, and sps_sat_enabled_flag, which is a flag indicating whether or not SAT is able to be applied to the current sequence, may be configured (or inferred) as 0 without signaling the same.

In addition, if sps_only_dct2_enabled_flag is 0, sps_mts_enabled_flag may be signaled. In addition, if sps_mts_enabled_flag is 0, it may be determined whether or not SAT is able to be used in the current sequence depending on the value of the signaled sps_sat_enabled_flag. On the other hand, if sps_mts_enabled_flag is 1, sps_sat_enabled_flag may be configured as 0 without signaling the same, which may indicate that SAT is unable to be applied to the current sequence.

According to an embodiment of the present disclosure, if sps_mts_enabled_flag, which is a flag indicating whether or not MTS is able to be applied to the current sequence, is 0, the syntax element, indicating whether or not explicit MTS is able to be used, may be inferred as 0. If the syntax element, indicating whether or not the explicit MTS is able to be used, is 0, an MTS index may not be signaled, and may be inferred as 0. If sps_mts_enabled_flag is 1, the syntax element, indicating whether or not the explicit MTS is able to be used, may be signaled. If the syntax element, indicating whether or not the explicit MTS is able to be used, is 1, the MTS index may be signaled. If the syntax element, indicating whether or not the explicit MTS is able to be used, is 0, implicit MTS may be used.

TABLE 8

```
sps_only_dct2_enabled_flag
if( !sps_only_dct2_enabled_flag )
{
  sps_mts_enabled_flag
  if( !sps_mts_enabled_flag )
    sps_sat_enabled_flag
}
```

Referring to Table 8, in an embodiment of the present disclosure, it may be determined whether or not SAT is to be applied according to a flag (or a syntax element) indicating that only a DCT-II transform kernel is to be used in the current sequence and a flag (or a syntax element) indicating whether or not MTS is able to be applied to the current sequence. As an embodiment, sps_only_dct2_enabled_flag, which is a flag indicating whether or not only a DCT-II transform kernel is to be used in the current sequence, may be signaled first. Then, it may be determined whether or not to signal sps_mts_enabled_flag, which is a flag indicating whether or not MTS is able to be applied to the current sequence, depending on the value of sps_only_dct2_enabled_flag. For example, if sps_only_dct2_enabled_flag is 1, sps_mts_enabled_flag, which is a flag indicating whether or not MTS is able to be applied to the current sequence, may be configured (or inferred) as 0 without signaling the same, and sps_sat_enabled_flag, which is a flag indicating whether or not SAT is able to be applied to the current sequence, may be configured (or inferred) as 0 without signaling the same.

In addition, if sps_only_dct2_enabled_flag is 0, sps_mts_enabled_flag may be signaled. If sps_mts_enabled_flag is 0, it may be determined whether or not SAT is able to be used in the current sequence depending on the value of the signaled sps_sat_enabled_flag. On the other hand, if sps_mts_enabled_flag is 1, sps_sat_enabled_flag may be configured as 1 without signaling the same, which may indicate that SAT is able to be applied to the current sequence.

According to an embodiment of the present disclosure, if sps_mts_enabled_flag, which is a flag indicating whether or not MTS is able to be applied to the current sequence, is 0, a syntax element, indicating whether or not explicit MTS is able to be used, may be inferred as 0. If the syntax element, indicating whether or not the explicit MTS is able to be used, is 0, an MTS index may not be signaled, and may be inferred as 0. If sps_mts_enabled_flag is 1, the syntax element, indicating whether or not the explicit MTS is able to be used, may be signaled. If the syntax element, indicating whether or not the explicit MTS is able to be used, is 1, the MTS index may be signaled. If the syntax element, indicating whether or not the explicit MTS is able to be used, is 0, implicit MTS may be used.

FIG. 17 is a diagram illustrating a method of signaling and determining a transform kernel according to an embodiment of the present disclosure. Referring to FIG. 17, mts_idx [xTbY][yTbY][cIdx] indicates a syntax element (or a variable) indicating the transform kernel applied to a transform block in which the coordinates of a top-left luma component of the transform block are (xTbY, yTbY) with respect to the coordinates of a top-left luma component of a picture. cIdx is a variable indicating a color component, and may be configured as 0 in the case of luma component Y, as 1 in the case of chroma component Cb, and as 2 in the case of chroma component Cr.

According to an embodiment of the present disclosure, the transform kernel (or transform type) used in MTS may be configured as {DST-VII, DCT-VIII}. A total of four combinations of transform kernels (e.g., {horizontal: DST-VII, vertical: DST-VII}, {horizontal: DCT-VIII, vertical: DST-VII}, {horizontal: DST-VII, vertical: DCT-VIII}, and {horizontal: DCT-VIII, vertical: DCT-VIII}) may be configured to be applied in the horizontal and vertical directions of the transform block. On the other hand, if MTS is not used, one combination {horizontal: DCT-II, vertical: DCT-II} may be used. In FIG. 17, trTypeHor and trTypeVer are variables indicating the transform kernels (or the transform types) applied in the horizontal direction and the vertical direction, respectively. For example, 0 may indicate DCT-II, 1 may indicate DST-VII, and 2 may indicate DCT-VIII. If tu_mts_flag does not exist, mts_idx may be configured (or inferred) as −1 without signaling the same. In this case, the DCT-II kernel may be applied both in the horizontal direction and in the vertical direction.

In an embodiment, mts_idx may be signaled using a fixed length of 2 bits. Referring to FIG. 17, if mts_idx is 0, it may be signaled by bitstream 00, and in this case, DST-VII may be applied both in the horizontal direction and in the vertical direction. If mts_idx is 1, it may be signaled by bitstream 01, and in this case, DCT-VIII may be applied in the horizontal direction and DST-VII may be applied in the vertical direction. If mts_idx is 2, it may be signaled by bitstream 10, and in this case, DST-VII may be applied in the horizontal direction and DCT-VIII may be applied in the vertical direction. If mts_idx is 3, it may be signaled by bitstream 11, and in this case, DCT-VIII may be applied both in the horizontal direction and in the vertical direction.

In the aforementioned method for determining a transform kernel depending on mts_idx, although an embodiment in which the transform kernel set is configured as {DST-VII, DCT-VIII} has been described, the present disclosure is not limited thereto, and the transform kernel applied in the horizontal direction and the vertical direction may be determined depending on mts_idx as described in the following i) to v) even in the transform kernel set including a plurality of arbitrary transform kernels.

i) If mts_idx is −1: horizontal—DCT-II, vertical—DCT-II.

ii) If mts_idx is 0: horizontal—first candidate in transform set, vertical—first candidate in transform set.

iii) If mts_idx is 1: horizontal—second candidate in transform set, vertical—first candidate in transform set.

iv) If mts_idx is 2: horizontal—first candidate in transform set, vertical—second candidate in transform set.

v) If mts_idx is 3: horizontal—second candidate in transform set, vertical—second candidate in transform set.

In the syntax structure related to transformation in FIG. 15 described above, although a method of signaling MTS and transform skip (TS) using different syntax elements from each other has been described, if MTS and TS are signaled using a single syntax element, it is possible to improve syntax parsing efficiency and to express the syntax structure more concisely. Accordingly, a method of signaling MTS and TS using a single syntax element will be described with reference to the following drawing.

FIG. 18 shows a syntax structure for obtaining information related to multiple transform selection and transform skip according to an embodiment of the present disclosure, and FIG. 19 is a diagram illustrating information related to multiple transform selection and transform skip according to an embodiment of the present disclosure. According to an embodiment of the present disclosure, MTS and TS may be signaled using a single syntax element. In describing the embodiment in FIG. 18, a redundant description, which has been made in FIG. 15, will be omitted. That is, the syntax element that is not described in FIG. 18 may refer to the description made in FIG. 15.

Referring to FIG. 18, in S1801, the decoder may examine (or determine) whether or not to parse syntax element tu_mts_idx[x0][y0] indicating the transform kernel applied in the horizontal and vertical directions of the current residual signal. The syntax element may include information on whether or not TS is to be applied, information on whether or not MTS is to be applied, and information related to the transform kernels applied in the horizontal and vertical directions. As an example, tu_mts_idx[x0][y0] may be parsed if the following conditions i), ii), iii), and iv) are all true, and may be encoded/decoded using a regular coding engine of CABAC using a context.

Condition i) a variable MaxMtsIdx is greater than 0 (MaxMtsIdx>0).

Here, MaxMtsIdx denotes a variable indicating the maximum value of tu_mts_idx, and may be determined according to the method described above with reference to FIG. 15(*a*). In FIG. 19(*a*), MaxMtsIdx may be determined according to whether or not MTS is able to be used and whether or not TS is able to be used. The second column in FIG. 19(*a*) indicates the case in which the current block is encoded by inter prediction and whether or not MTS is able to be used in the inter-predicted block. If the current block is encoded by inter prediction (i.e., CuPredMode[x0][y0]==MODE_INTER), and if MTS is allowed for the inter prediction in the SPS (i.e., sps_mts_inter_enabled_flag==1), the value of the second column may be 1. Otherwise, the value of the second column may be 0.

The third column in FIG. 19(*a*) indicates the case in which the current block is encoded by intra prediction and whether or not MTS is able to be used in the intra predicted block. If the current block is encoded by intra prediction (i.e., CuPredMode==MODE_INTRA), and if MTS is allowed for the intra prediction in the SPS (i.e., sps_mts_intra_enabled_flag==1), the value of the third column may be 1. Otherwise, the value of the third column may be 0. The fourth column in FIG. 19(*a*) may indicate whether or not TS is able to be applied to the current transform block. If it is indicated that TS is able to be used in the SPS (transform_skip_enabled_flag), and if both the width and the height of the current transform block are smaller than or equal to the maximum transform skip size (i.e., log 2TbWidth<=MaxTsSize && log 2TbHeight<=MaxTsSize), the value of the fourth column may be 1. Otherwise, the value of the fourth column may be 0. In this case, if sps_transform_skip_enabled_flag is 1, MaxTsSize indicating the maximum transform skip size may be determined by signaling the value, which is obtained by subtracting 2 from the value obtained by applying the logarithm of base 2 to the maximum transform skip size, and MaxTsSize may have a value of 2 to 5. The variable MaxMtsIdx may be determined according to the values of the second, the third, and the fourth columns in FIG. 19(*a*) described above.

Condition ii) the current luma component transform block includes a non-zero coefficient (tu_cbf_luma[x0][y0]==1).

Referring to condition ii), if the current transform block does not include a non-zero coefficient, MTS and TS are not required to be applied. In this case, the decoder may reconstruct the residual signal without performing inverse quantization and inverse transformation.

Condition iii) the encoding tree currently being processed is not the tree including only a chroma component (treeType!=DUAL_TREE_CHROMA).

Referring to condition iii), although an example in which TS is able to be applied both to the luma component and to the chroma component has been described in the embodiment in FIG. 15 above, TS may be applied only to the luma component. That is, if MTS and TS are able to be applied only to the luma component, tu_mts_idx is not required to be signaled in the encoding tree including only the chroma component, so if the encoding tree, which is currently processed, includes the luma component, that is, if treeType is SINGLE_TREE or DUAL_TREE_LUMA, the decoder may parse tu_mts_idx.

Condition iv) both the width and the height of the transform block are less than or equal to 32 (tbWidth<=32 && tbHeight<=32).

In an embodiment, in the case where tu_mts_idx[x0][y0] does not exist, if MaxMtsSize is 4, it may be configured as 0, and if MaxMtsSize is 1 or 5, it may be configured as 1. In FIG. 18, since TS and MTS are signaled using one integrated syntax element, a 1-bit flag, indicating whether or not TS is used in the current block, may not be parsed in the residual_coding syntax structure in FIG. 18(*b*).

Referring to FIG. 19(*b*), in an embodiment of the present disclosure, the encoder may signal MTS and TS to the decoder using one integrated syntax element. The decoder may determine a transform kernel on the basis of the corresponding syntax element. In FIG. 19B, TrHorType and TrVerType denote variables indicating the transform kernels applied in the horizontal direction and the vertical direction, respectively. IsTrafoSkip is a variable indicating whether or not transform skip is applied to the current transform block. As an embodiment, values of TrHorType, TrVerType, and IsTrafoSkip described above may be determined depending on the value of tu_mts_idx[x0][y0].

In an embodiment, if TrHorType (or TrVerType) is −1, and if IsTrafoSkip is 1, this indicates that transform skip is applied in the corresponding direction. If TrHorType (or TrVerType) is 0, and if IsTrafoSkip is 0, a DCT-II kernel may be applied in the corresponding direction. If TrHorType (or TrVerType) is 1, and if IsTrafoSkip is 0, a DST-VII kernel may be applied in the corresponding direction. If TrHorType (or TrVerType) is 2, and if IsTrafoSkip is 0, DCT-VIII kernel may be applied in the corresponding direction. The maximum value of tu_mts_idx may be expressed as a variable MaxMtsIdx, and the binarization method of tu_mts_idx may vary depending on the value of MaxMtsIdx.

In an embodiment, if MaxMtsIdx is 1 (i.e., in the case in which only TS is allowed), whether or not TS is applied may be indicated through a 1-bit signaling. If tu_mts_idx is 0 (i.e., bit value 0), TS may be applied to the current luma component transform block, and if tu_mts_idx is 1 (i.e., bit value 1), DCT-II may be applied both in the horizontal direction and in the vertical direction of the current luma component transform block. If MaxMtsIdx is 4 (i.e., in the case in which TS is not allowed and MTS is allowed), the first bit in the bitstream may indicate whether or not MTS is applied to a corresponding luma transform block, and the second, third, and fourth bits of the bitstream may indicate the transform kernels that are applied to the case in which MTS is used. If tu_mts_idx is 0 (e.g., bitstream 0), a DCT-II kernel may be applied both in the horizontal direction and in the vertical direction of the current transform block. If tu_mts_idx is 1 (e.g., bitstream 10), a DST-VII kernel may be applied to both in the horizontal direction and in the vertical direction of the current transform block. If tu_mts_idx is 2 (e.g., bitstream 110), DCT-VIII may be applied in the horizontal direction of the current transform block, and DST-VII may be applied in the vertical direction thereof. If tu_mts_idx is 3 (e.g., bitstream 1110), DST-VII may be applied in the horizontal direction of the current transform block, and DCT-VIII may be applied in the vertical direction thereof. If tu_mts_idx is 4 (e.g., bitstream 1111), DCT-VIII may be applied both in the horizontal direction and in the vertical direction of the current transform block.

In an embodiment, if MaxMtsIdx is 5 (if both TS and MTS are allowed), the first bit of the bitstream may indicate whether or not TS is applied to the corresponding luma transform block. In this case, the second bit of the bitstream may indicate whether or not MTS is applied to the corresponding luma transform block, and the third, fourth, and fifth bits of the bitstream may indicate the transform kernels applied to the case in which MTS is used. If tu_mts_idx is 0 (e.g., bitstream 0), TS may be applied to the current transform block. If tu_tms_idx is 1 (e.g., bitstream 10), DCT-II may be applied both in the horizontal direction and in the vertical direction of the current transform block. If tu_mts_idx is 2 (e.g., bitstream 110), DST-VII may be applied both in the horizontal direction and in the vertical direction of the current transform block. If tu_mts_idx is 3 (e.g., bitstream 1110), DCT-VIII may be applied in the horizontal direction of the current transform block, and DST-VII may be applied in the vertical direction thereof. If tu_mts_idx is 4 (e.g., bitstream 11110), DST-VII may be applied in the horizontal direction of the current transform block, and DCT-VIII may be applied in the vertical direction thereof. If tu_mts_idx is 5 (e.g., bitstream 11111), DCT-VIII may be applied both in the horizontal direction and in the vertical direction of the current transform block.

Although the above embodiment has described an example, in which the transform kernel, applied in the case of using MTS, is signaled by a truncated unary binarization method using 1 bit or 3 bits, the signaling may be performed using fixed 2 bits. In addition, although the case in which the transform kernel candidates constituting the transform kernel set are DST-VII and DCT-VIII has been described by way of example in the above embodiment, the present disclosure is not limited thereto, and even in the transform kernel set including two arbitrary transform kernels, the transform kernels applied in the horizontal and vertical directions may be determined depending on the value of the bitstream indicating the transform kernels as shown in the following cases i) to v).

i) Bitstream ‘0’: horizontal—DCT-II, vertical—DCT-II ii) Bitstream ‘10’: horizontal—first candidate in transform set, vertical—first candidate in transform set iii) Bitstream ‘110’: horizontal—second candidate in transform set, vertical—first candidate in transform set iv) Bitstream '1110': horizontal—first candidate in transform set, vertical—second candidate in transform set v) Bitstream '1111': horizontal—second candidate in transform set, vertical—second candidate in transform set The residual signals of an inter-predicted block may tend to be concentrated at a specific position of the block. For example, there may be a pattern in which the residual signal has higher energy at the boundary of the residual signal block and in which the residual signal has lower energy at the center of the block and the opposite boundary. If transform is performed on the residual signal of the inter-predicted block using such a pattern, encoding efficiency for inter prediction is able to be improved. This will be described with reference to the following drawing.

FIG. 20 is a diagram illustrating a sub-block transform (SBT) method according to an embodiment of the present disclosure. If SBT is applied, the encoder/decoder may perform transform encoding by partitioning the current coding unit (or a coding block) into a plurality of transform units (or transform blocks). As an embodiment, the encoder/decoder may perform transform encoding by partitioning the current coding unit into two transform units having sizes of 1:1 or 1:3. In this case, transform may be performed on only one transform unit on the assumption that the residual signals are concentrated on one transform unit among the two partitioned transform units, and the remaining one transform unit may be assumed to not have a residual signal. In FIGS. 20(*a*), (*b*), (*c*), and (*d*), the area denoted as A (that is, the shaded area) indicates an area in which transformation of a transform unit is performed. After quantization, whether or not a non-zero coefficient exists in the corresponding area of the transform block may be determined through signaling of syntax elements (tu_cbf_luma, tu_cbf_cb, and tu_cbf_cr) indicating non-zero transform coefficient information described with reference to FIGS. 15 and 18. The area other than the area A is a transform unit area that is assumed to not have a residual signal, so transformation and inverse quantization processes may be omitted therefor, and all of tu_cbf_luma, tu_cbf_cb, and tu_cbf_cr may be configured (or inferred) as 0 without signaling the same.

Referring to FIG. 20(*a*), if the coding unit has a size of W×H, the encoder/decoder may partition the coding unit in the vertical direction, thereby obtaining two transform units having a size of (W/2)×H. Alternatively, if a 1-bit flag, which indicates partitioning of {¼, ¾}, is 1, the coding unit may be partitioned into two transform units having sizes of (W/4)×H and (3W/4)×H. In the above two cases, transformation may be performed on a left transform unit, and DCT-VIII may be applied in the horizontal direction and DST-VII may be applied in the vertical direction. As an example, if the width or the height of the corresponding transform unit is greater than the maximum size of the DST-VII/DCT-VIII kernel allowed in SBT, DCT-II may be applied in the corresponding direction. As an example, the maximum size of the DST-VII/DCT-VIII kernel allowed in SBT may be 32 points (or in length).

Referring to FIG. 20(*b*), if the size of the coding unit is W×H, the encoder/decoder may partition the coding unit into two transform units having a size of (W/2)×H in the vertical direction thereof. Alternatively, if a 1-bit flag, indicating partitioning of {¼, ¾}, is 1, the coding unit may be partitioned into two transform units having sizes of (3W/4)×H and (W/4)×H. In the above two cases, transformation may be performed on a right transform unit, and DST-VII may be applied both in the horizontal direction and in the vertical direction. As an example, if the width or the height of the corresponding transform unit is greater than the maximum size of the DST-VII/DCT-VIII kernel allowed in SBT, DCT-II may be applied in the corresponding direction. As an example, the maximum size of the DST-VII/DCT-VIII kernel allowed in SBT may be 32 points.

Referring to FIG. 20(*c*), if the size of the coding unit is W×H, the encoder/decoder may partition the coding unit into two transform units having a size of W×(H/2) in the horizontal direction thereof. Alternatively, if a 1-bit flag, indicating partitioning of {¼, ¾}, is 1, the coding unit may be partitioned into two transform units having sizes of W×(H/4) and W×(3H/4). In the above two cases, transformation may be performed on an upper transform unit, and DST-VII may be applied in the horizontal direction and DCT-VIII may be applied in the vertical direction. As an example, if the width or the height of the corresponding transform unit is greater than the maximum size of the DST-VII/DCT-VIII kernel allowed in SBT, DCT-II may be applied in the corresponding direction. As an example, the maximum size of the DST-VII/DCT-VIII kernel allowed in SBT may be 32 points.

Referring to FIG. 20(*d*), if the size of the coding unit is W×H, the encoder/decoder may partition the coding unit into two transform units having a size of W×(H/2) in the horizontal direction. Alternatively, if a 1-bit flag, indicating partitioning of {¼, ¾}, is 1, the coding unit may be partitioned into two transform units having sizes of W×(3H/4) and W×(H/4). In the above two cases, transformation may be performed on a lower transform unit, and DST-VII may be applied both in the horizontal direction and in the vertical direction. As an example, if the width or the height of the corresponding transform unit is greater than the maximum size of the DST-VII/DCT-VIII kernel allowed in SBT, DCT-II may be applied in the corresponding direction. As an example, the maximum size of the DST-VII/DCT-VIII kernel allowed in SBT may be 32 points.

In an embodiment, SBT may be applied to the inter-predicted block in which cu_cbf, which is a syntax element indicating whether or not the syntax structure related to transformation (e.g., a transform tree syntax structure) exists, is 1, and whether or not SBT is to be applied may be signaled in the coding unit level. If SBT is applied in the coding unit level, a 1-bit flag, indicating partitioning of {¼, ¾} or partitioning of ½, may be signaled. In addition, a 1-bit flag indicating horizontal direction partition or vertical direction partition may be signaled. In addition, a 1-bit flag, indicating the transform unit to be transformed among the two partitioned transform units, may be further indicated.

If SBT is applied, the transform kernel is determined depending on the position of the transform unit, so an MTS flag and/or an MTS index may not be signaled in the transform unit syntax structure in FIG. 15. The transform kernel applied to the transform unit, in which transformation is performed in SBT, may be selected as any one of DST-VII/DCT-VIII/DCT-II depending on the position of the corresponding transform unit and/or the width and the height of the corresponding transform unit, and whether or not to apply TS may be selected in the same manner. If TS is able to be used in the transform unit syntax structure in FIG. 18 above {i.e., if the fourth condition is true in FIG. 19(*a*)}, MaxMtsIdx may be determined to be 1, and it may be indicated whether or not TS is applied through a 1-bit signaling. If TS is unable to be used in the transform unit syntax structure in FIG. 18 {i.e., if the fourth condition is false in FIG. 19(*a*)}, MaxMtsIdx may be determined to be 0, and the MTS index syntax element may not be signaled.

As the size of the transform kernel increases, energy compaction performance is significantly improved, thus as the size of the transform block increases, transformation by applying any one of DST-VII, DCT-VIII, and DCT-II is more likely to improve encoding efficiency, compared to the case in which TS is applied. Accordingly, in an embodiment, if the size of the transform block is greater than or equal to a predefined specific size, the MTS index syntax element may not be signaled regardless of whether or not TS is able to be used.

In an embodiment, whether or not SBT is able to be used may be included in any one of a sequence parameter set (SPS), a picture parameter set (PPS), a slice header, a tile group header, and a tile header, and may then be signaled using a 1-bit flag. In the present disclosure, the flag may be referred to as "sps_sbt_enabled_flag". Hereinafter, embodiments for a method of signaling the syntax related to SBT in an SPS level will be described by way of example with reference to Tables 9 to 11. Although a description will be made based on a signaling method in the SPS level in the embodiment of the present disclosure, the present disclosure is not limited thereto, and the signaling structure described below may be applied in the same manner to the case where signaling is performed in any one level of high-level syntaxes.

TABLE 9

| |
|---|
| sps_sbt_enabled_flag |

Referring to Table 9, in an embodiment of the present disclosure, the encoder/decoder may determine whether or not SBT is able to be used in the current sequence by signaling sps_sbt_enabled_flag, which is a 1-bit flag indicating whether or not SBT is able to be used in the current sequence.

TABLE 10

```
sps_dct2 only_enabled_flag
if( !sps_dct2_only_enabled_flag )
  sps_sbt_enabled_flag
```

Referring to Table 10, in an embodiment of the present disclosure, the encoder/decoder may determine whether or not SBT is able to be used depending on whether or not a kernel other than DCT-II is able to be used in the current sequence. In Table 10, sps_dct2_only_enabled_flag is a flag (or a syntax element) indicating that only a DCT-II transform kernel is able to be used in the current sequence. It may be determined whether or not to signal sps_sbt_enabled_flag depending on sps_dct2_only_enabled_flag. For example, if sps_dct2_only_enabled_flag is 0, the decoder may parse sps_sbt_enabled_flag, which is a 1-bit flag indicating whether or not SBT is able to be used in the current sequence. The decoder may determine whether or not SBT is able to be used in the current sequence depending on the value of sps_sbt_enabled_flag. If sps_dct2_only_enabled_flag is 1, sps_sbt_enabled_flag may not be signaled, and may be configured (or inferred) as 0, and SBT may not be used in the current sequence.

TABLE 11

```
sps_sbt_enabled_flag
if( sps_sbt_enabled_flag )
  sps_sbt_dct2_enabled_flag
```

Referring to Table 11, in an embodiment of the present disclosure, the encoder/decoder may determine whether or not a kernel other than DCT-II is able to be used in the current sequence depending on whether or not SBT is able to be used in the current sequence. As an embodiment, sps_sbt_enabled_flag, which is a 1-bit flag indicating whether or not SBT is able to be used in the current sequence, may be signaled first. If sps_sbt_enabled_flag is 1, sps_sbt_dct2_enabled_flag, which is a 1-bit flag indicating that only DCT-II is allowed as a transform kernel used when SBT is applied, may be signaled. That is, if sps_sbt_dct2_enabled_flag is 1, when SBT is applied, the coding unit may be partitioned into two transform units, and DCT-II may be applied both in the horizontal direction and in the vertical direction of the transform unit. If sps_sbt_enabled_flag is 0, sps_sbt_dct2_enabled_flag may be configured as 0.

The encoder/decoder may reconstruct the block in units of transform units, and in the case of intra prediction, the encoder/decoder may utilize reconstructed samples around the current block as reference samples, thereby generating prediction blocks for the current block. In the case of intra prediction, prediction errors tend to increase as the distance from the reference sample increases. Thus, if the transform unit is partitioned into small blocks with respect to the current coding unit, and if restoration is sequentially performed in units of the partitioned small blocks, the prediction errors, that is, the residual signals are able to be reduced, and encoding efficiency is able to be improved. An intra sub-partitions (ISP) encoding mode is a method of performing prediction and restoration by partitioning a block into a plurality of partition units in the case where intra prediction is selected for the current coding unit.

Figure 21:
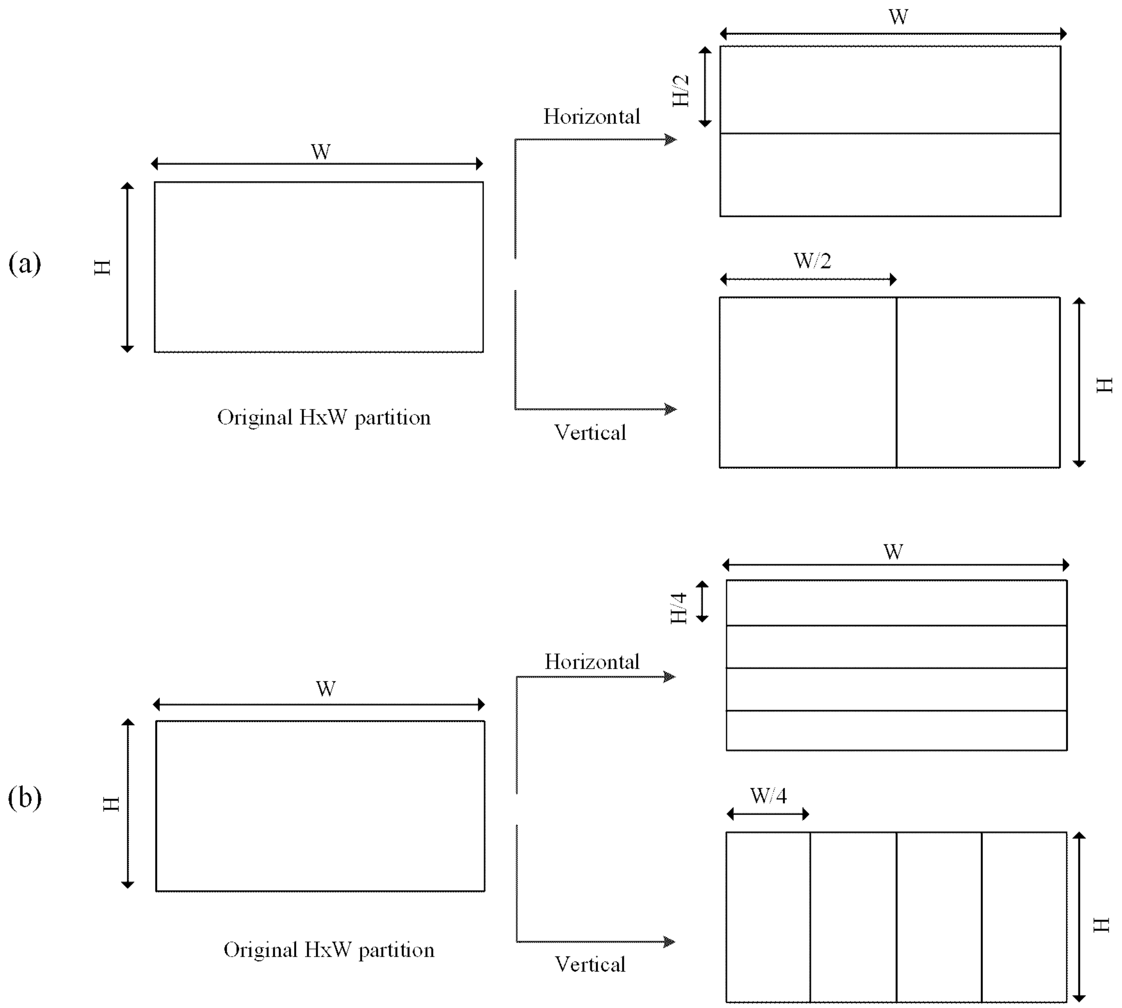
FIG. 21 is a diagram illustrating a method of partitioning a block in an intra sub-partitions encoding mode according to an embodiment of the present disclosure.

FIG. 21 is a diagram illustrating a method of partitioning a block in an intra sub-partitions encoding mode according to an embodiment of the present disclosure. According to an embodiment of the present disclosure, the current coding block may be partitioned in the horizontal or vertical direction. As an embodiment, the number of partitioned transform units may vary depending on the size of the coding unit. For example, if the coding unit has a size of 4×4, the ISP encoding mode may not be applied thereto. The coding unit having a size of 4×8 or 8×4 may be partitioned into two transform units. The coding units having different sizes from the same may be partitioned into four transform units. The size of the coding unit to which the ISP encoding mode is able to be applied may be determined such that the width or the height of the coding unit is less than or equal to the maximum size of the luma component transform block (condition A) and such that the product of the width and the height of the coding unit is greater than the square of the minimum size of the luma component transform block (condition B). In this case, the maximum size of the luma component transform block may be 64, and the minimum size of the luma component transform block may be 4. The sizes of the coding unit satisfying condition A may be classified into conditions i), ii), and iii) as follows.

Condition i) the width of the coding unit is less than or equal to the maximum size of the luma component transform block, and the height of the coding unit is greater than the maximum size of the luma component transform block.

Condition ii) the width of the coding unit is greater than the maximum size of the luma component transform block, and the height of the coding unit is less than or equal to the maximum size of the luma component transform block.

Condition iii) both the width and the height of the coding unit are less than or equal to the maximum size of the luma component transform block.

In the case of condition i) among the above conditions i), ii), and iii), the coding unit may be partitioned into a plurality of transform units in which the width of the transform unit is the same as that of the coding unit and in which the height of the transform unit is the same as the maximum size of the luma component transform block without separately signaling the same. In the case of condition ii), the coding unit may be partitioned into a plurality of transform units in which the width of the transform unit is the same as the maximum size of the luma component transform block and in which the height of the transform unit is the same as the height of the coding unit without separately signaling the same. That is, in the case of conditions i) and ii), since partitioning of the transform block is performed using the size of the coding unit and the maximum size of the luma component transform block without signaling, the ISP encoding mode, which requires signaling, may not be used. Accordingly, condition A may be determined to be the case in which both the width and the height of the coding unit are less than or equal to the maximum size of the luma component transform block.

FIG. 21(*a*) shows a method of partitioning a transform unit, which may be applied to a coding unit of 4×8 or 8×4. As an embodiment, if horizontal partitioning is indicated for a coding unit having a size of W×H, the coding unit may be partitioned into two transform units having a size of W×(H/2), and if vertical partitioning is indicated, the coding unit may be partitioned into two transform units having a size of (W/2)×H. A 1-bit flag may indicate whether or not the partitioning is horizontal partitioning or vertical partitioning.

FIG. 21(*b*) shows a method of partitioning a transform unit, which may be applied to a coding unit having a size other than 4×8 and 8×4. As an embodiment, if horizontal partitioning is indicated for a coding unit having a size of W×H, the coding unit may be partitioned into four transform units having a size of W×(H/4), and if vertical partitioning is indicated, the coding unit may be partitioned into four transform units having a size of (W/4)×H. A 1-bit flag may indicate whether or not the partitioning is horizontal partitioning or vertical partitioning.

FIG. 22 is a diagram illustrating a method of selecting a transform kernel to be applied to a partitioned transform unit in the case where an intra sub-partitions (ISP) mode is applied according to an embodiment of the present disclosure. According to an embodiment of the present disclosure, if ISP is applied, transform kernels applied to respective transform units may be determined depending on the size of the transform block and the intra prediction mode. In FIG. 22, predModeIntra is a variable representing the intra prediction mode used in the current coding unit, and trTypeHor and trTypeVer are variables representing the transform kernels applied in the horizontal and the vertical directions, respectively. Although a description will be made on the assumption that 67 intra prediction modes are used in FIG. 22, the present disclosure is not limited thereto, and the embodiment may also be applied in the same manner to the case where a wide-angle mode, which has been described with reference to FIG. 6, in addition to the 67 intra prediction modes.

According to an embodiment of the present disclosure, the intra prediction mode may include two non-directional prediction modes (INTRA_PLANAR and INTRA_DC) and 65 directional prediction modes (INTRA_ANGULAR2, INTRA_ANGULAR3, . . . , and INTRA_ANGULAR66), and the variables trTypeHor and trTypeVer may be determined according to the respective prediction modes. Here, trTypeHor and trTypeVer represent the transform kernels (or transform types) applied in the horizontal direction and the vertical direction, respectively. If the value of trTypeHor or trTypeVer is 0, this may indicate that a DCT-II transform kernel is applied in a corresponding direction, and if the value is 1, this may indicate that DST-VII is applied to a corresponding direction.

In an embodiment, if the width of the transform block is less than the minimum size of the transform block for the luma component or greater than the maximum size of DST-VII used in ISP, DCT-II may be applied in the horizontal direction. In addition, if the height of the transform block is less than the minimum size of the transform block for the luma component or greater than the maximum size of DST-VII used in ISP, DCT-II may be applied in the vertical direction. As an example, the minimum size of the transform block for the luma component may be defined as 4, and the maximum size of DST-VII may be defined as 16. The minimum size of the transform block may be referred to as a "first threshold", and the maximum size of DST-VII may be referred to as a "second threshold".

In addition, in an embodiment, the encoder/decoder may apply DST-VII both in the horizontal direction and in the vertical direction in the non-directional prediction mode. In addition, the encoder/decoder may apply DST-VII in the horizontal direction and DCT-II in the vertical direction in the horizontal and directional modes (INTRA_ANGULAR2, INTRA_ANGULAR3, . . . , INTRA_ANGULAR32, and INTRA_ANGULAR33). The encoder/decoder may apply DCT-II in the horizontal direction and DST-VII in the vertical direction in the vertical and directional modes (INTRA_ANGULAR34, INTRA_ANGULAR35, . . . , INTRA_ANGULAR65, and INTRA_ANGULAR66).

In an embodiment, if the current coding unit is encoded by intra prediction, a 1-bit flag indicating whether or not to apply ISP in the coding unit level may be signaled. If ISP is applied to the current coding unit, a 1-bit flag indicating horizontal partitioning or vertical partitioning may be signaled. If ISP is applied to the current block, the transform kernel applied to each of the partitioned transform units may be determined depending on the intra prediction mode and the size of the transform unit without signaling, so the MTS flag and/or the MTS index may not be signaled in the transform unit syntax structure in FIG. 15. In addition, since TS is not used in the ISP encoding mode, a transform skip flag may not be signaled. In addition, the MTS index may not be signaled in the transform unit syntax structure in FIG. 18.

As described in FIG. 22, if ISP is applied to the current block, the transform kernel applied to each of the transform blocks may be determined on the basis of the intra prediction mode without signaling. Meanwhile, this may increase the complexity of implementing a hardware decoder. Encoding of the intra prediction mode and restoration of the transform coefficient are able to be simultaneously performed in the existing hardware decoder pipeline structure, but the restoration of the transform coefficient is able to be performed only when the encoding of the intra prediction mode is completed in the case of applying the ISP mode, thereby causing a delay corresponding thereto. Accordingly, hereinafter, methods of determining the transform kernel applied to each of the transform blocks, which is not based on the intra prediction mode, in the ISP encoding mode will be described.

In an embodiment of the present disclosure, the encoder/decoder may compare the width or the height of the transform block with a predefined specific threshold, thereby determining the transform kernel (or the transform type) of the block to which the ISP mode is applied. Since the DST-VII kernel effectively expresses the characteristics of a residual signal when the intra prediction is used, DST-VII may be applied in the horizontal direction when the width of the transform block is less than or equal to a specific threshold, and DCT-II may be applied in the horizontal direction when the width of the transform block is greater than the threshold. Here, the specific threshold may be defined as the same value as the second threshold described above (i.e., the maximum size of DST-VII used in ISP). If the height of the transform block is less than or equal to the threshold value, DST-VII may be applied in the vertical direction, and if the height thereof is greater than the threshold value, DCT-II may be applied in the vertical direction. In this case, the threshold may be defined as an arbitrary value of 32 or less. As described above, as an embodiment, if the width of the transform block is less than the minimum size of the transform block for the luma component (i.e., the first threshold) or greater than the maximum size of DST-VII used in ISP, DCT-II may be applied in the horizontal direction. In addition, if the height of the transform block is less than the minimum size of the transform block for the luma component or greater than the maximum size of DST-VII used in ISP, DCT-II may be applied in the vertical direction. As an example, the minimum size of the transform block for the luma component may be defined as 4, and the maximum size of DST-VII may be defined as 16.

In addition, in an embodiment of the present disclosure, DST-VII may be applied both in the horizontal direction and in the vertical direction of a square block in which both the width and the height of the transform block are less than or equal to the threshold, and DCT-II may be applied in the horizontal and vertical directions of a square block in which the width and the height thereof are greater than the threshold. If a shorter side of a rectangular block is smaller than or equal to the threshold, DST-VII may be applied in the corresponding direction, and if the shorter side of the rectangular block is greater than the threshold, DCT-II may be applied therein. DCT-II may be applied to the longer side of the rectangular block in the corresponding direction.

In addition, in an embodiment of the present disclosure, the transform kernel applied to each of the transform units may be determined by utilizing the MTS-related syntax element signaling described in FIGS. 15 and 18. For example, if the transform unit syntax structure in FIG. 18 is used, the MTS index may be signaled even in the case in which ISP is used in the current coding unit. If the MTS index is signaled for each transform unit, signaling overhead may be increased. Thus, in the processing order, the MTS index may be signaled only in a first transform unit in which a non-zero transform coefficient exists for the luma component transform block (i.e., tu_cbf_luma==1), and the signaled MTS index may be shared by all of the transform units. In this case, for example, whether or not to apply TS may also be signaled.

In an embodiment, whether or not the ISP encoding mode is able to be used may be included in any one of a sequence parameter set (SPS), a picture parameter set (PPS), a slice header, a tile group header, and a tile header, and may be signaled by a 1-bit flag, and the flag may be referred to as "sps_isp_enabled_flag" in the present disclosure. Hereinafter, embodiments of a method of signaling syntax related to the ISP encoding mode in the SPS level will be described with reference to Tables 12 to 14. Although a description will be made based on a signaling method in the SPS level in the embodiment of the present disclosure, the present disclosure is not limited thereto, and the signaling structure described below may be applied in the same manner to the case where signaling is performed in any one level of high-level syntaxes.

TABLE 12

| |
|---|
| sps_isp_enabled_flag |

Referring to Table 12, in an embodiment of the present disclosure, the encoder/decoder may determine whether or not to use the ISP encoding mode in the current sequence by signaling sps_isp_enabled_flag, which is a 1-bit flag indicating whether or not the ISP encoding mode is able to be used in the current sequence.

TABLE 13

```
sps_dct2_only_enabled_flag
if( !sps_dct2_only_enabled_flag )
  sps_isp_enabled_flag
```

Referring to Table 13, in an embodiment of the present disclosure, the encoder/decoder may determine whether or not to use the ISP encoding mode depending on whether or not a kernel other than DCT-II is able to be used in the current sequence. In Table 12, sps_dct2_only_enabled_flag is a flag (or a syntax element) indicating that only a DCT-II transform kernel is able to be used in the current sequence. It may be determined whether or not to signal sps_isp_enabled_flag, which is a flag (or a syntax element) indicating whether or not the ISP encoding mode is able to be used in the current sequence, depending on sps_dct2_only_enabled_flag. For example, if sps_dct2_only_enabled_flag is 0, the decoder may parse sps_isp_enabled_flag, which is a 1-bit flag indicating whether or not the ISP encoding mode is able to be used in the current sequence. The decoder may determine whether or not the ISP encoding mode is able to be used in the current sequence depending on the value of sps_isp_enabled_flag. If sps_dct2_only_enabled_flag is 1, sps_isp_enabled_flag may not be signaled, and may be configured (or inferred) as 0, and the ISP encoding mode may not be used in the current sequence.

TABLE 14

```
sps_isp_enabled_flag
if( sps_isp_enabled_flag )
  sps_isp_dct2_enabled_flag
```

Referring to Table 14, in an embodiment of the present disclosure, the encoder/decoder may determine whether or not a kernel other than DCT-II is able to be used in the current sequence depending on whether or not the ISP encoding mode is able to be used in the current sequence. As an embodiment, sps_isp_enabled_flag, which is a 1-bit flag indicating whether or not SBT is able to be used in the current sequence, may be signaled first. If sps_isp_enabled_flag is 1, sps_isp_dct2_enabled_flag, which is a 1-bit flag indicating that only DCT-II is allowed for the transform kernel used when the ISP encoding mode is applied, may be signaled. That is, in the case where sps_isp_dct2_enabled_flag is 1, when the ISP encoding mode is applied, the coding unit may be partitioned into a plurality of transform units, and DCT-II may be applied both in the horizontal direction and in the vertical direction of the transform unit. If sps_isp_enabled_flag is 0, sps_isp_dct2_enabled_flag may be configured as 0.

FIGS. 23 and 24 are diagrams illustrating a process of obtaining information on whether or not a non-zero transform coefficient exists in a transform unit syntax structure in the case where SBT is applied according to an embodiment of the present disclosure.

In FIG. 23, the transform unit syntax structure includes syntax elements related to the transform unit and a processing procedure thereof, and may receive, as factors, (x0, y0), which are the coordinates of a top-left corner of the current transform unit, tbWidth, which is the width of a transform block, tbHeight, which is the height of the transform block, treeType indicating the type of the encoding tree that is currently processed, and subTuIndx indicating the index of the transform unit processed in the transform tree. Since there is a correlation between the luma component and the chroma component, the luma component and the chroma component may be encoded in the same encoding tree structure, but the luma component and the chroma component may be encoded in different encoding tree structures in order to improve coding efficiency. The variable treeType may represent the type of the encoding tree that is currently processed, and if treeType is SINGLE_TREE, this may indicate that the currently processed encoding tree is a single tree in which the luma component and the chroma component have the same structure, and the corresponding tree may include all of luma component Y and chroma components Cb and Cr.

In addition, if treeType is DUAL_TREE_LUMA, this may indicate that a currently processed encoding tree is a luma component encoding tree in the case where the luma component and the chroma component are encoded in different encoding tree structures, and the corresponding encoding tree may include only luma component Y. If treeType is DUAL_TREE_CHROMA, this may indicate that a currently processed encoding tree is a chroma component encoding tree in the case where the luma component and the chroma component are encoded in different encoding tree structures, and the corresponding encoding tree may include only chroma components Cb and Cr.

In the first conditional statement of step S2301 in FIG. 23, the decoder may identify whether or not the currently processed tree includes the luma component in order to parse tu_cbf_luma. That is, if treeType is SINGLE_TREE or DUAL_TREE_LUMA, the corresponding encoding tree may include the luma component, and if treeType is DUAL_TREE_CHROMA, the corresponding encoding tree may not include the luma component. Accordingly, if treeType is DUAL_TREE_CHROMA, the decoder may not perform the content of the conditional statement in step S2301. If the current encoding tree includes the luma component, the decoder identifies conditions for parsing tu_cbf_luma in the second conditional statement of step S2301. Here, IntraSubPartitionsSplitType represents a variable related to an intra sub-partitions (ISP) technology for partitioning the intra-predicted coding unit into NumIntraSubPartitions pieces of transform units.

The encoder/decoder may signal and parse whether or not to apply ISP to the intra-predicted current coding unit in the coding unit syntax, which is a syntax structure related to the coding unit, and a syntax element for the partitioning method. Accordingly, it is possible to configure a variable IntraSubPartitionsSplitType indicating the partitioning type of the transform unit and a variable NumIntraSubPartitions indicating the number of partitioned transform units in ISP. If ISP is not applied to the corresponding coding unit, the variable IntraSubPartitionsSplitType may be configured as ISP_NO_SPLIT, and if ISP is applied to the corresponding coding unit, the variable IntraSubPartitionsSplitType may be configured as a value other than ISP_NO_SPLIT.

The cases where the second conditional statement is true in step S2301 may be classified into following cases i), ii), iii), and iv).

i) ISP is not applied to the current coding unit (IntraSubPartitionsSplitType==ISP_NO_SPLIT), and SBT is not applied to the current coding unit (cu_sbt_flag==0).

That is, ISP and SBT are not applied to the current coding unit, and the transform unit is not partitioned by signaling and parsing of the explicit syntax element. In this case, tu_cbf_luma may be parsed.

ii) ISP is not applied to the current coding unit (IntraSubPartitionsSplitType==ISP_NO_SPLIT), SBT is applied to the current coding unit (cu_sbt_flag==1), and a currently processed TU is a transform unit at the position in which the residual signal exists in SBT {(subTuIndex==0&&!cu_sbt_pos_flag)|| (subTuIndex==1&&cu_sbt_pos_flag)}.

That is, if SBT is applied to the current coding unit, tu_cbf_luma may be signaled and parsed only for the transform unit at the position in which the residual signal exists. In addition, for the transform unit at the position in which no residual signal exists, the encoder/decoder may configure tu_cbf_luma as 0 without signaling and parsing the same. If cu_sbt_pos_flag is 1, for a first transform unit (subTuIndex==0) of two transform units partitioned by SBT, all of tu_cbf_luma, tu_cbf_cb, and tu_cbf_cr may be configured as 0 without signaling and parsing the same. If cu_sbt_pos_flag is 0, for a second transform unit (subTuIndex==1) of the two transform units partitioned by SBT, all of tu_cbf_luma, tu_cbf_cb, and tu_cbf_cr may be configured as 0 without signaling and parsing the same. Accordingly, if SBT is applied to the current block, the transform unit at the position in which the residual signal exists may be expressed as ((subTuIndex==0&&!cu_sbt_pos_flag)|| (subTuIndex==1&&cu_sbt_pos_flag)), and in this case, tu_cbf_luma may be signaled and parsed.

In an embodiment, if ISP is not applied to the current coding unit (IntraSubPartitionsSplitType==ISP_NO_SPLIT), if SBT is applied to the current coding unit (cu_sbt_flag==1), and if the currently processed transform unit is a transform unit at the position in which no residual signal exists in SBT (i.e. (subTuIndex==0&&cu_sbt_pos_flag)|| (subTuIndex==1&&!cu_sbt_pos_flag)), tu_cbf_luma may be configured (or inferred) as 0 without signaling and parsing the same.

iii) ISP is applied to the current coding unit (IntraSubPartitionsSplitType!=ISP_NO_SPLIT), and the currently processed transform unit is not the last of the transform units partitioned by ISP (subTuIndex<NumIntraSubPartitions-1).

iv) ISP is applied to the current coding unit (IntraSubPartitionsSplitType!=ISP_NO_SPLIT), and the condition of configuring tu_cbf_luma without signaling and parsing is false (InferTuCbfLuma==0).

That is, when the transform units are partitioned by ISP, tu_cbf_luma must be 1 for at least one or more transform units among the NumIntraSubPartitions transform units. Accordingly, if the current transform unit is the last transform unit partitioned by ISP (subTuIndex==NumIntraSubPartitions-1), and if the tu_cbf_luma values of the previous (NumIntraSubPartitions−1) transform units are all 0, it is obvious that the value of tu_cbf_luma for the current transform unit is 1, so the encoder/decoder may configure tu_cbf_luma as 1 without signaling and parsing the same.

In the first conditional statement of step S2302, the decoder identifies whether or not the currently processed tree includes the chroma component in order to parse tu_cbf_cb and tu_cbf_cr. That is, if treeType is SINGLE_TREE or if treeType is DUAL_TREE_CHROMA, the corresponding encoding tree includes the chroma component, and if treeType is DUAL_TREE_LUMA, the corresponding encoding tree does not include the chroma component. Accordingly, if treeType is DUAL_TREE_LUMA, the first conditional statement in step S2302 is false, so the content of the conditional statement is not performed. If the current encoding tree includes the chroma component in the first conditional statement in step S2301, conditions for parsing tu_cbf_cb and tu_cbf_cr are identified in the second conditional statement of step S2302.

The cases where the second conditional statement is true in step S2302 may be classified into the following cases i), ii), and iii).

i) ISP is not applied to the current coding unit (IntraSubPartitionsSplitType==ISP_NO_SPLIT), and SBT is not applied to the current coding unit (cu_sbt_flag==0).

That is, ISP and SBT are not applied to the current coding unit, and the transform unit is not partitioned by signaling and parsing of the explicit syntax element. In this case, the decoder may parse tu_cbf_cb and tu_cbf_cr.

ii) ISP is not applied to the current coding unit (IntraSubPartitionsSplitType==ISP_NO_SPLIT), SBT is applied to the current coding unit (cu_sbt_flag==1), and the currently processed transform unit is a transform unit at the position in which the residual signal exists in SBT {(subTuIndex==0&&!cu_sbt_pos_flag)|| (subTuIndex==1&&cu_sbt_pos_flag)}.

That is, if SBT is applied to the current coding unit, tu_cbf_cb and tu_cbf_cr may be signaled and parsed only for the transform unit at the position in which the residual signal exists. In addition, for the transform unit at the position in which no residual signal exists, the encoder/decoder may configure tu_cbf_cb and tu_cbf_cr as 0 without signaling and parsing the same. If cu_sbt_pos_flag is 1, for a first transform unit (subTuIndex==0) of two transform units partitioned by SBT, all of tu_cbf_luma, tu_cbf_cb, and tu_cbf_cr may be configured as 0 without signaling and parsing the same. If cu_sbt_pos_flag is 0, for a second transform unit (subTuIndex==1) of the two transform units partitioned by SBT, all of tu_cbf_luma, tu_cbf_cb, and tu_cbf_cr may be configured as 0 without signaling and parsing the same. Accordingly, if SBT is applied to the current block, the transform unit at the position in which the residual signal exists may be expressed as ((subTuIndex==0&&!cu_sbt_pos_flag)|| (subTuIndex==1&&cu_sbt_pos_flag)), and in this case, tu_cbf_cb and tu_cbf_cr may be signaled and parsed.

In an embodiment, if ISP is not applied to the current coding unit (IntraSubPartitionsSplitType==ISP_NO_SPLIT), if SBT is applied to the current coding unit (cu_sbt_flag==1), and if the currently processed TU is a transform unit at the position in which no residual signal exists in SBT {(subTuIndex==0&&cu_sbt_pos_flag)|| (subTuIndex==1&&!cu_sbt_pos_flag)}, tu_cbf_cb and tu_cbf_cr may be configured as 0 without signaling and parsing the same.

iii) ISP is applied to the current coding unit (IntraSubPartitionsSplitType!=ISP_NO_SPLIT), and the currently processed transform unit is the last of the transform units partitioned by ISP (subTuIndex==NumIntraSubPartitions-1).

That is, if ISP is applied to the current block, the luma component transform block may be partitioned into a plurality of transform blocks less than the size of the encoding block. In addition, the chroma component transform block may not be partitioned, and may be included in the last transform unit partitioned by ISP. Accordingly, if subTuIndex<NumIntraSubPartitions-1, the corresponding transform unit does not include the residual signal for the chroma component, so tu_cbf_cb and tu_cbf_cr may be configured as 0 without signaling and parsing the same.

The values of tu_cbf_luma, tu_cbf_cb, and tu_cbf_cr may be configured according to the method described above, and if cbf of each color component is not 0, parsing in the transform coefficient level may be performed in the residual_coding syntax structure.

FIG. 24 illustrates another embodiment of processing tu_cbf_luma, tu_cbf_cb, and tu_cbf_cr in the transform unit syntax structure in the case where SBT is applied to a current coding unit. Hereinafter, differences from the method described with reference to FIG. 23 will be primarily described, and the description made with reference to FIG. 23 may be applied in the same manner to the content omitted from the description in FIG. 24.

In an embodiment of the present disclosure, in the case where SBT is applied to the current block, if tu_cbf_luma is 0 for the transform unit at the position in which the residual signal exists, there may be no encoding gain obtained by partitioning the transform unit into a plurality of pieces. Accordingly, in the case where SBT is applied, the encoder/decoder may allow SBT only if tu_cbf_luma of the transform unit, in which the residual signal exists, is 1. In this case, if SBT is applied to the current block, tu_cbf_luma at the position in which the residual signal exists may be configured as 1 without signaling and parsing the same, and tu_cbf_luma at the position in which no residual signal exists may be configured (or inferred) as 0 without signaling and parsing the same.

If the current encoding tree includes a luma component in the first conditional statement of step S2401, the decoder identifies conditions for parsing tu_cbf_luma in the second conditional statement of step S2401. The cases where the second conditional statement is true may be classified into the following cases i), ii), and iii).

i) ISP is not applied to the current coding unit (IntraSubPartitionsSplitType==ISP_NO_SPLIT), and SBT is not applied to the current coding unit (cu_sbt_flag==0).

That is, ISP and SBT are not applied to the current coding unit, and the transform unit is not partitioned by signaling and parsing of the explicit syntax element. In this case, tu_cbf_luma may be parsed.

ii) ISP is applied to the current coding unit (IntraSubPartitionsSplitType!=ISP_NO_SPLIT), and the currently processed transform unit is not the last of the transform units partitioned by ISP (subTuIndex<NumIntraSubPartitions-1).

iii) ISP is applied to the current coding unit (IntraSubPartitionsSplitType!=ISP_NO_SPLIT), and the condition for configuring tu_cbf_luma without signaling and parsing is false (InferTuCbfLuma==0)

When the transform unit is partitioned by ISP, tu_cbf_luma must be 1 for at least one or more transform units among the NumIntraSubPartitions transform units. Accordingly, if the current transform unit is the last transform unit partitioned by ISP (subTuIndex==NumIntraSubPartitions-1), and if the tu_cbf_luma values of previous (NumIntraSubPartitions-1) transform units are all 0, it is obvious that the value of tu_cbf_luma for the current transform unit is 1, so the encoder/decoder may configure tu_cbf_luma as 1 without signaling and parsing the same.

If ISP is not applied to the current coding unit (IntraSubPartitionsSplitType==ISP_NO_SPLIT) in the second conditional statement of step S2401, and if SBT is applied to the current coding unit (cu_sbt_flag==1), the encoder/decoder may configure tu_cbf_luma according to the followings i) to iv) without parsing and signaling the same.

i) subTuIndex==0&&cu_sbt_pos_flag

In this case, tu_cbf_luma may be inferred as 0. That is, since the first transform unit partition by the currently processed SBT is at the position in which no residual signal exists, tu_cbf_luma may thus be configured as 0 without signaling and parsing the same.

ii) subTuIndex==0&&!cu_sbt_pos_flag

In this case, tu_cbf_luma may be inferred as 1. That is, since the first transform unit partitioned by the currently processed SBT is at the position in which the residual signal exists, tu_cbf_luma may be configured as 1 without signaling and parsing the same.

iii) subTuIndex==1&&cu_sbt_pos_flag

In this case, tu_cbf_luma may be inferred as 1. That is, since the second transform unit partitioned by the currently processed SBT is at the position in which the residual signal exists, tu_cbf_luma may be configured as 1 without signaling and parsing the same.

iv) subTuIndex==1&&!cu_sbt_pos_flag

In this case, tu_cbf_luma may be inferred as 0. That is, since the second transform unit partitioned by the currently processed SBT is at the position in which no residual signal exists, tu_cbf_luma may be configured as 0 without signaling and parsing the same.

FIG. 25 is a diagram illustrating a coding unit syntax structure for processing syntax elements related to a coding unit according to an embodiment of the present disclosure. The coding unit syntax structure may receive inputs of (x0, y0), which are the coordinates of a top-left corner of the current coding unit with respect to the coordinates of a top-left corner of the current picture, cbWidth, which is the width of the current coding unit, cbHeight, which is the height of the current coding unit, and treeType which is a variable indicating the type of the currently processed encoding tree.

In an embodiment, based on the characteristic in which the luma component and the chroma component have a high correlation therebetween, if the luma component and the chroma component are encoded in the same encoding tree structure, it is possible to efficiently encode an image. If treeType is SINGLE_TREE, this may indicate that the luma component and the chroma component have been encoded in the same encoding tree structure, and the currently processed coding unit may include a coding block (CB) for the luma component and a coding block for the chroma component. On the other hand, if the luma component and the chroma component are encoded in different encoding tree structures in the slice/tile in which only intra prediction is allowed, encoding efficiency may be improved.

If the tree type is DUAL_TREE_LUMA indicating the tree type of the luma component in the dual tree, this may indicate that the currently processed encoding tree is the encoding tree for the luma component in the case where the luma component and the chroma component are encoded in different encoding tree structures from each other, and the currently processed coding unit in the encoding tree may include only the luma component. That is, the current coding unit may include only the coding block for the luma component.

If the tree type is DUAL_TREE_CHROMA indicating the tree type of the chroma component in the dual tree, this may indicate that the currently processed encoding tree is the encoding tree for the chroma component in the case where the luma component and the chroma component are encoded in different encoding tree structures from each other, and the currently processed coding unit in the encoding tree may include only the chroma component. That is, the current coding unit may include only the coding block for the chroma component.

Referring to FIG. 25, in the coding unit syntax structure, the encoder/decoder may signal and parse a syntax element indicating whether or not the prediction method of the current coding unit is intra prediction, inter prediction, or intra block copy (IBC) prediction. The prediction method may be determined on the basis of the syntax element signaled and parsed in the coding unit level. The value of a variable CuPredMode[x0][y0] may be determined according to the prediction method, and if CuPredMode[x0][y0] is MODE_INTRA, the prediction method of the current coding unit may be intra prediction. If CuPredMode[x0][y0] is MODE_INTER, the prediction method of the current coding unit may be inter prediction. If CuPredMode[x0][y0] is MODE_IBC, the prediction method of the current coding unit may be intra block copy prediction.

The encoder/decoder may signal and parse the syntax element related to the prediction method according to the value of CuPredMode[x0][y0] in the coding unit syntax structure, thereby obtaining information necessary for prediction.

In step S2501, if the prediction method of the current coding unit (or a coding block) is intra prediction (CuPredMode[x0][y0]==MODE_INTRA), pcm-flag, which is a 1-bit flag indicating whether or not a pulse code modulation (PCM) mode, which is one of the intra prediction methods, is applied, may be signaled and parsed. If it is indicated that PCM is able to be used in SPS, which is a high level, (i.e., sps_pcm_enabled_flag==1), and if the size of the current coding unit satisfies a specific condition, the encoder/decoder may apply the PCM mode to the current coding unit.

In an embodiment, the size condition to which the PCM mode is able to be applied may be defined as the case in which the width of the block is greater than or equal to MinIpcmCbSizeY and less than or equal to MaxIpcmCbSizeY and in which the height of the block is greater than or equal to MinIpcmCbSizeY and less than or equal to MaxIpcmCbSizeY, as shown in FIG. 25. pcm_flag may be signaled and parsed only if the PCM mode is able to be applied, and the encoder/decoder may determine whether or not the PCM mode is applied to the current coding unit on the basis of pcm_flag. If pcm_flag is 1, the PCM mode is able to be applied to the current coding unit, and the encoder/decoder may encode the pixel samples using a predetermined number of bits without prediction and transformation.

On the other hand, if pcm_flag is 0, this may indicate that intra prediction using a non-directional or directional intra prediction mode or the like is applied to the current coding unit. If intra prediction is applied, the encoder/decoder may utilize reconstructed samples around the current block as reference samples. In addition, in an embodiment of the present disclosure, a plurality of reconstructed reference sample lines around the current block may be used. For example, the reference sample line used in the intra prediction of the current block may be indicated in the form of an index. The encoder/decoder may signal and parse a syntax element intra_luma_ref_idx indicating the reference sample line, thereby determining the reference sample line index used in the prediction of the current block.

In an embodiment, the utilization of a plurality of reference sample lines described above may be limited to the uppermost coding units in the CTU (i.e., coding units having the same y coordinate value of a top-left corner as the y coordinate value of a top-left corner of the CTU). This may be identified through modulo operation of y0, which is the y coordinate of the current coding unit, and CtbSizeY, which is a variable representing the size of the luma coding block. That is, if y0% CtbSizeY is 0, this may represent that the current coding unit is one of the uppermost coding units in the CTU. In this case, the intra_luma_ref_idx syntax element may not be signaled, and the decoder may configure (or infer) the value of the corresponding syntax element as 0 without parsing the same.

In addition, according to an embodiment of the present disclosure, in order to improve the performance of intra prediction and reduce the residual signals, the current block may be partitioned into a plurality of sub-blocks, thereby performing prediction and transformation. Since intra prediction is performed utilizing reconstructed samples around the current block as reference samples, as the distance from the reference sample increases, the accuracy of prediction may tend to be lowered, and the energy of the residual signal may tend to increase. Accordingly, if the current block is partitioned into a plurality of sub-blocks, and if prediction and transformation are performed in the sub-block level, encoding efficiency is able to be improved. The intra prediction based on such sub-block partitioning may be referred to as an "intra sub-partitions (ISP) mode".

In step S2502, the decoder may parse a flag (or a syntax element) indicating whether or not ISP is applied to the current coding unit. In FIG. 25, the flag indicating whether or not ISP is applied to the current coding unit may be referred to as an "ISP mode flag (intra_subpartitions_mode_flag) (or an ISP flag)". If the ISP mode flag is 1, this may indicate that ISP is applied to the current block. The condition in which ISP is able to be applied may be defined (or configured) as the case in which the reference sample line index is 0 (i.e., intra_luma_ref_idx[x0][y0]==0), the width of the current coding block is less than or equal to the maximum size of the luma transform block (MaxTbSizeY) (i.e. cbWidth<=MaxTbSizeY), and the height of the current coding block is less than or equal to the maximum size of the luma transform block (i.e., cbHeight<=MaxTbSizeY). In addition, the minimum number of samples of the current coding block may be considered. If the number of samples of the current coding block (cbWidth*cbHeight) is greater than the square of MinTbSizeY representing the minimum size of the luma transform block, the encoder/decoder may apply ISP. If all of the conditions described above are satisfied, the encoder/decoder may apply ISP to the current luma coding block, and may signal and parse the ISP mode flag, thereby indicating whether or not ISP is applied to the current block. If ISP is unable to be applied, the ISP mode flag may not be signaled and parsed, and the decoder may configure (or infer) the value thereof as 0.

In step S2502, if the ISP is applied to the current block, the syntax element indicating the partitioning method for the sub-blocks may be signaled and parsed. If the ISP mode flag is 1, this may indicate that ISP is applied to the current luma coding block, and the encoder/decoder may determine the partitioning method for the sub-blocks by signaling and parsing the ISP partitioning flag (intra_subpartitions_split_flag). In an embodiment, the operation of identifying the condition for the block size in step S2502 (i.e., cbWidth<=MaxTbSizeY && cbHeight<=MaxTbSizeY) may be omitted. This is due to the fact that it is possible to recognize whether or not ISP is applied to the current block by identifying only the ISP mode flag. Accordingly, according to another embodiment of the present disclosure, the conditional statement identified in order to parse the ISP partitioning flag in step S2502 may be expressed as if(intra_subpartitions_mode_flag[x0][y0]==1).

In an embodiment, the encoder/decoder may configure (determine or induce) the variable ISP partitioning type (IntraSubPartitionsSplitType) indicating partitioning for sub-blocks on the basis of the ISP mode flag and the ISP partitioning flag. If the ISP mode flag is 0, the ISP partitioning flag may not be signaled and parsed, and may be configured as 0 by the decoder. In this case, the ISP partitioning type may be configured as ISP_NO_SPLIT, which is a value indicating that the ISP is not to be applied. On the other hand, if the ISP mode flag is 1, the ISP partitioning flag may be signaled and parsed. If the ISP partitioning flag is 0, the ISP partitioning type may be configured as ISP_HOR_SPLIT, which is a value indicating horizontal partitioning, and if the ISP partitioning flag is 1, the ISP partitioning type may be configured as ISP_VER_SPLIT, which is a value indicating vertical partitioning.

The decoder may parse the syntax element related to the intra prediction mode after parsing the syntax element related to ISP, thereby determining a prediction mode to be applied to the current block.

In step S2503, if CuPredMode[x0][y0] is not MODE_INTRA, and if treeType is not DUAL_TREE_CHROMA, CuPredMode[x0][y0], which is the prediction mode of the current coding unit, may be MODE_INTER or MODE_IBC, and the decoder may parse the syntax element related thereto.

In step S2504, the decoder may parse and process the syntax element related to the residual signal. If PCM is applied to the current block, prediction and transformation are not performed. Thus, if pcm_flag[x0][y0] is 1, the parsing and processing of the syntax element related to the residual signal may not be performed in step S2504. That is, the parsing and processing of the syntax element related to the residual signal may be performed only when PCM is not applied to the current block.

In step S2504, if the current block is not predicted as the intra mode (CuPredMode[x0][y0]!=MODE_INTRA), and if the mode is not a skip mode or a merge mode (merge_flag [x0][y0]==0), the decoder may parse cu_cbf, which is a flag (or a syntax element) indicating whether or not the transform tree syntax, which is a syntax structure related to the residual signal, exists with respect to the current coding unit.

Meanwhile, in the case of inter prediction, the residual signal may be concentrated and distributed in any one-sided area of the block, and, using this characteristic, if the block is partitioned into two areas and if transformation and quantization are performed on only one area, the residual signals may be efficiently compressed in the inter-predicted block. This technique may be referred to as “sub-block transform (SBT)”. Conditions for applying SBT may be defined as follows.

Condition i) inter prediction is applied to the current coding unit (CuPredMode[x0][y0]==MODE_INTER).

Condition ii) it is indicated that SBT is able to be used in the high level including the current coding unit (sps_sbt_enabled_flag==1).

In condition ii), sps_sbt_enabled_flag, which is a 1-bit flag indicating whether or not SBT is able to be applied to the high level, may be signaled, and the decoder may determine whether or not SBT is able to be applied to the current sequence by parsing sps_sbt_enabled_flag.

Condition iii) combined inter-intra prediction (CIIP) is not applied (ciip_flag[x0][y0]==0).

CIIP is a special prediction method in the merge mode and represents the mode in which a prediction block obtained through a merge candidate and a prediction block obtained through intra prediction are merged, thereby producing a prediction block for the current block. In this case, since the residual signal has a characteristic in which it is not concentrated in any one-sided area of the block, encoding efficiency may not be improved even if SBT is applied to the block to which CIIP is applied. Accordingly, SBT may not be applied to the block to which CIIP is applied.

Condition iv) the width of the current block is less than or equal to the maximum size by which SBT is able to be applied (MaxSbtSize), and the height of the current block is less than or equal to the maximum size by which SBT is able to be applied (cbWidth<=MaxSbtSize && cbHeight<=MaxSbtSize)

If SBT is indicated in the high level (sps_sbt_enabled_flag==1) in condition iv), information on the maximum size of the block to which SBT is able to be applied may be signaled and parsed, and the MaxSbtSize may be determined on the basis of the information on the maximum size of the block to which SBT is able to be applied.

In addition, in an embodiment of the present disclosure, the encoder/decoder may further identify the following conditions in order to determine whether or not SBT is able to be applied to the current coding unit.

Condition a) allowSbtVerH=cbWidth>=8

In condition a), allowSbtVerH is a variable indicating whether or not vertical ½-partitioning is possible. If the width of the current block is 8 or more, allowSbtVerH may be configured to be true. If vertical ½-partitioning is applied, the current coding unit may be partitioned into two transform units having a size of (cbWidth/2)×cbHeight.

Condition b) allowSbtVerQ=cbWidth>=16

In condition b), allowSbtVerQ is a variable indicating whether or not vertical ¼-partitioning is possible. If the width of the current block is 16 or more, allowSbtVerQ may be configured to be true. If vertical ¼-partitioning is applied, the current coding unit may be partitioned into two transform units having sizes of (cbWidth/4)×cbHeight and (3*cbWidth/4)×cbHeight.

Condition c) allowSbtHorH=cbHeight>=8

In condition c), allowSbtHorH is a variable indicating whether or not horizontal ½-partitioning is possible. If the height of the current block is 8 or more, allowSbtHorH may be configured to be true. If horizontal ½-partitioning is applied, the current coding unit may be partitioned into two transform units having a size of cbWidth×(cbHeight/2).

Condition d) allowSbtHorQ=cbHieght>=16

In condition d), allowSbtHorQ is a variable indicating whether or not horizontal ¼-partitioning is possible. If the height of the current block is 16 or more, allowSbtHorQ may be configured to be true. If horizontal ¼-partitioning is applied, the current coding unit may be partitioned into two transform units having sizes of cbWidth×(cbHeight/4) and cbWidth×(3*cbHeight/4).

If all of the above-described conditions i), ii), iii) and iv) are true, and if at least one of the four variables configured in conditions a), b), c) and d) is true, the encoder/decoder may apply SBT to the current coding unit. Whether or not SBT is applied may be determined through signaling and parsing of cu_sbt_flag, which is a 1-bit flag. If cu_sbt_flag is 1, this may indicate that SBT is applied to the current coding unit, and the encoder/decoder may determine the partitioning method using the additional syntax element related to SBT.

In addition, in an embodiment of the present disclosure, if SBT is applied to the current block (i.e., cu_sbt_flag==1), and if both ½-partitioning and ¼-partitioning are possible {(allowSbtVerH||allowSbtHorH) && (allowSbtVerQ||allowSbtHorQ)}, cu_sbt_quad_flag, which is a 1-bit flag indicating whether or not ¼-partitioning is possible, may be signaled and parsed. The decoder may determine ½-partitioning or ¼-partitioning by parsing cu_sbt_quad_flag. In addition, if both horizontal partitioning and vertical partitioning are possible {e.g., (cu_sbt_quad_flag&&allowSbtVerQ&&allowSbtHorQ)|| (!cu_sbt_quad_flag&&allowSbtVerH&&allowSbtHorH)}, the decoder may parse cu_sbt_horizontal_flag, which is a 1-bit flag indicating whether or not horizontal partitioning is possible. In addition, the decoder may parse cu_sbt_pos_flag, which is a 1-bit flag, in order to determine the transform unit in which the residual signal may exist from among two transform units partitioned by SBT.

The decoder may perform partitioning of the transform unit and parsing and processing of the syntax element related to the residual signal in the transform tree syntax structure on the basis of ISP partition information, SBT partition information, cu_cbf, and the like.

FIG. 26 is a diagram illustrating a transform tree syntax structure according to an embodiment of the present disclosure. The decoder may process transform tree partitioning through the transform tree syntax structure, and parsing and processing of the syntax element related to the residual signal may be performed in the transform unit (or the transform block) corresponding to a leaf node of the transform tree. The transform tree may receive inputs of (x0, y0), which are the coordinates of the top-left corner of a partitioned node, tbWidth, which is the width of the partitioned node, tbHeight, which is the height of the partitioned node, and treeType, which is a variable indicating the type of the currently processed encoding tree. If the transform tree syntax is first called, (x0, y0) may be the same as the coordinates of the top-left corner of the coding unit, and tbWidth, tbHeight, and treeType may be the same as the width, height, and treeType of the coding unit, respectively. The cases where the root node of the transform tree having the same size as the coding unit is partitioned may be classified into the following three cases.

i) The sizes of the root node and the partitioned node are greater than the maximum size of the luma transform block (MaxTbSizeY)

(tbWidth>MaxTbSizeY||tbHeight>MaxTbSizeY).

Here, MaxTbSizeY is a variable representing the maximum size of the luma transform block, and may be determined depending on the maximum size of a predefined transform kernel. As the maximum size of the transform kernel increases, the energy compaction generally increases, thereby improve encoding efficiency. However, since the pipeline buffer of the hardware encoder and decoder is able to be determined depending on the maximum size of the transform kernel, the maximum size of the transform kernel may be determined in consideration of both the complexity and the coding efficiency. MaxTbSizeY may be configured as the same fixed constant value by the encoder and the decoder, or may also be configured according to the syntax element signaled in the high level.

If the widths (tbWidth) or the heights (tbHeight) of the root node and the partitioned intermediate node of the transform tree are greater than MaxTbSizeY, the encoder/decoder may not explicitly signal and parse the partitioning method, and may partition the transform tree until both the width and the height of the partitioned node become less than or equal to MaxTbSizeY. Here, MaxTbSizeY represents the maximum transform size. For example, if MaxTbSizeY is 64 for the root node of 128×128 (the same size as the coding unit), the transform tree may be partitioned into four nodes having a size of 64×64, and the leaf node having a size of 64×64 may become a transform unit without further partitioning the same. As another example, if MaxTbSizeY is 64 for the root node of 128×64, the transform tree may be partitioned into two nodes having a size of 64×64, and the leaf node having a size of 64×64 may become a transform unit without further partitioning the same. If the widths or the heights of the root node and the partitioned intermediate node of the transform tree are greater than MaxTbSizeY, the decoder may recursively call the transform tree, thereby partitioning the transform tree, and if both the widths and the heights of the root node and the partitioned intermediate node of the transform tree are less than or equal to MaxTbSizeY, the corresponding node may become a transform unit without further partitioning the same, and the syntax element related to the residual signal in the transform unit syntax structure may be parsed and processed.

ii) SBT is applied to the current coding unit (cu_sbt_flag==1).

Unlike the above-described case i), if SBT is applied, a method of partitioning the transform tree may be determined through signaling of the explicit syntax element in the coding unit level.

iii) ISP is applied to the current coding unit (IntraSubPartitionsSplitType ISP_NO_SPLIT).

Unlike the above-described case i), if ISP is applied, a method of partitioning the transform tree may be determined through signaling of the explicit syntax element in the coding unit level. If the ISP partitioning type is ISP_HOR_SPLIT, this may indicate horizontal partitioning by ISP, and if the ISP partitioning type is ISP_VER_SPLIT, this may indicate vertical partitioning by ISP.

In the above-described cases i), ii), and iii) may be classified into the case i) in which partitioning of the transform tree is performed without signaling of the explicit syntax element and the cases ii) and iii) in which the partitioning method is indicated by signaling of the explicit syntax element. The transform tree syntax structure shown in FIG. 26 may perform all of the transform tree partitioning described in the above cases i), ii), and iii), and the transform tree syntax structure in FIG. 26 may be expressed as shown in Table 15 below.

TABLE 15

```
transform_tree( )
{
  if(IntraSubPartitionsSplitType==ISP_NO_SPLIT)
  {
    perform implicit partitioning based on block size
  }
  else if(cu_sbt_flag)
  {
    perform explicit partitioning based on SBT mode
information
  }
  else if(IntraSubPartitionsSplitType==ISP_HOR_SPLIT)
  {
    perform partitioning based on ISP partitioning type
  }
  else if(IntraSubPartitionsSplitType==ISP_VER_SPLIT)
  {
    perform partitioning based on ISP partitioning type
  }
}
```

In step S2601, if the ISP partitioning type is ISP_NO_SPLIT, implicit partitioning may be performed on the basis of information on the node size and the maximum size of the transform block for the luma component.

In step S2602, if the ISP partitioning type is not ISP_NO_SPLIT, and if cu_sbt_flag is 1, the encoder/decoder may partition the transform tree on the basis of the syntax element related to the SBT signaled and parsed in the coding unit. In step S2603, if the ISP partitioning type is not ISP_NO_SPLIT, and if cu_sbt_flag is 0, the encoder/decoder may perform horizontal partitioning or vertical partitioning on the basis of the ISP partitioning type.

In the coding unit syntax structure described in FIG. 25 above, if SBT is applied to the current block (i.e., cu_sbt_flag==1), the ISP mode flag and the ISP partitioning flag, which are syntax elements related to the ISP, may not be signaled and parsed, and the ISP partitioning type may be configured as ISP_NO_SPLIT. Accordingly, even if SBT is applied to the current block in the transform tree syntax structure in FIG. 26, there is a problem in which partitioning of the transform tree is performed on the basis of the size of the node and the maximum size of the luma transform block, instead of being performed by SBT, because the ISP partitioning type is ISP_NO_SPLIT. This may be problematic for both the encoder and the decoder. That is, in the transform tree syntax structure in FIG. 26, even if cu_sbt_flag is 1, there is a problem in which partitioning of the transform tree is always performed on the basis of information on the node size and the maximum size of the luma transform block in the first branch, instead of performing step S2602 in which the transform tree is partitioned by SBT, because the value of the variable ISP partitioning type is ISP_NO_SPLIT.

FIG. 27 is a diagram illustrating a transform tree syntax structure according to another embodiment of the present disclosure. In order to solve the problem occurring in the transform tree syntax structure in FIG. 26, the transform tree syntax structure in FIG. 27 may be expressed as shown in Table 16 below.

TABLE 16

```
transform tree( )
  {
  if(IntraSubPartitionsSplitType==ISP_NO_SPLIT
&& !cu_sbt_flag)
  {
    perform implicit partitioning based on block size
  }
```

TABLE 16-continued

```
    else if(cu_sbt_flag)
    {
      perform explicit partitioning based on SBT mode
information
    }
    else if(IntraSubPartitionsSplitType==ISP_HOR_SPLIT)
    {
      perform partitioning based on ISP partitioning type
    }
    else if(IntraSubPartitionsSplitType==ISP_VER_SPLIT)
    {
      perform partitioning based on ISP partitioning type
    }
  }
```

In the transform tree syntax structure shown in FIG. 27, first, in step S2701, if the ISP partitioning type is ISP_NO_SPLIT, and if SBT is not applied to the current block (cu_sbt_flag==0), implicit partitioning may be performed on the basis of information on the node size and the maximum size of the luma transform block. Next, in step S2702, if the ISP partitioning type is ISP_NO_SPLIT, and if cu_sbt_flag is 1, the transform tree may be partitioned on the basis of the syntax element related to SBT signaled and parsed in the coding unit. Next, in steps S2703 and S2704, if the ISP partitioning type is not ISP_NO_SPLIT, and if cu_sbt_flag is 0, horizontal partitioning or vertical partitioning by ISP may be performed on the basis of the ISP partitioning type.

Unlike the transform tree syntax structure in FIG. 26, if SBT is applied to the current block, the transform tree may not be partitioned in the first branch, and the transform tree may be partitioned according to SBT information in the second branch by examining both ISP information and SBT information when examining conditions for partitioning the transform tree according to the size of the node and the maximum size of the luma transform block. Accordingly, the encoder and the decoder according to the transform tree syntax structure in FIG. 27 may perform all of partitioning based on the size of the node and the maximum size of the luma transform block, partitioning by the SBT information, and partitioning by the ISP information.

FIG. 28 is a diagram illustrating a transform tree syntax structure according to another embodiment of the present disclosure. In order to solve the problem occurring in the transform tree syntax structure in FIG. 26, the transform tree syntax structure in FIG. 28 may be expressed as Table 17 below.

TABLE 17

```
  transform tree( )
  {
    if(cu_sbt_flag)
    {
      perform explicit partitioning based on SBT mode
information
    }
    else if(IntraSubPartitionsSplitType==ISP_NO_SPLIT)
    {
      perform implicit partitioning based on block size
    }
    else if(IntraSubPartitionsSplitType==ISP_HOR_SPLIT)
    {
      perform partitioning based on ISP partitioning type
    }
```

TABLE 17-continued

```
    else if(IntraSubPartitionsSplitType==ISP_VER_SPLIT)
    {
      perform partitioning based on ISP partitioning type
    }
  }
```

In the transform tree syntax structure shown in FIG. 28, first, in step S2801, if SBT is applied to the current block (cu_sbt_flag==1), the transform tree may be partitioned based on the syntax element related to the SBT signaled and parsed in the coding unit. Next, in step S2802, if cu_sbt_flag is 0, and if the ISP partitioning type is ISP_NO_SPLIT, implicit partitioning may be performed on the basis of information on the node size and the maximum size of the luma transform block. Next, in steps S2803 and S2804, if cu_sbt_flag is 0, and if the ISP partitioning type is not ISP_NO_SPLIT, horizontal partitioning or vertical partitioning by ISP may be performed based on the ISP partitioning type.

Unlike the transform tree syntax structure in FIG. 26, if SBT is applied to the current block, the transform tree may be partitioned on the basis of SBT information by preferentially examining conditions for partitioning of SBT. In addition, if SBT is not applied to the current block (cu_sbt_flag==0), implicit partitioning based on information on the size of the node and the maximum size of the luma transform block and partitioning by ISP may be performed according to the ISP partitioning type variable.

Figure 29:
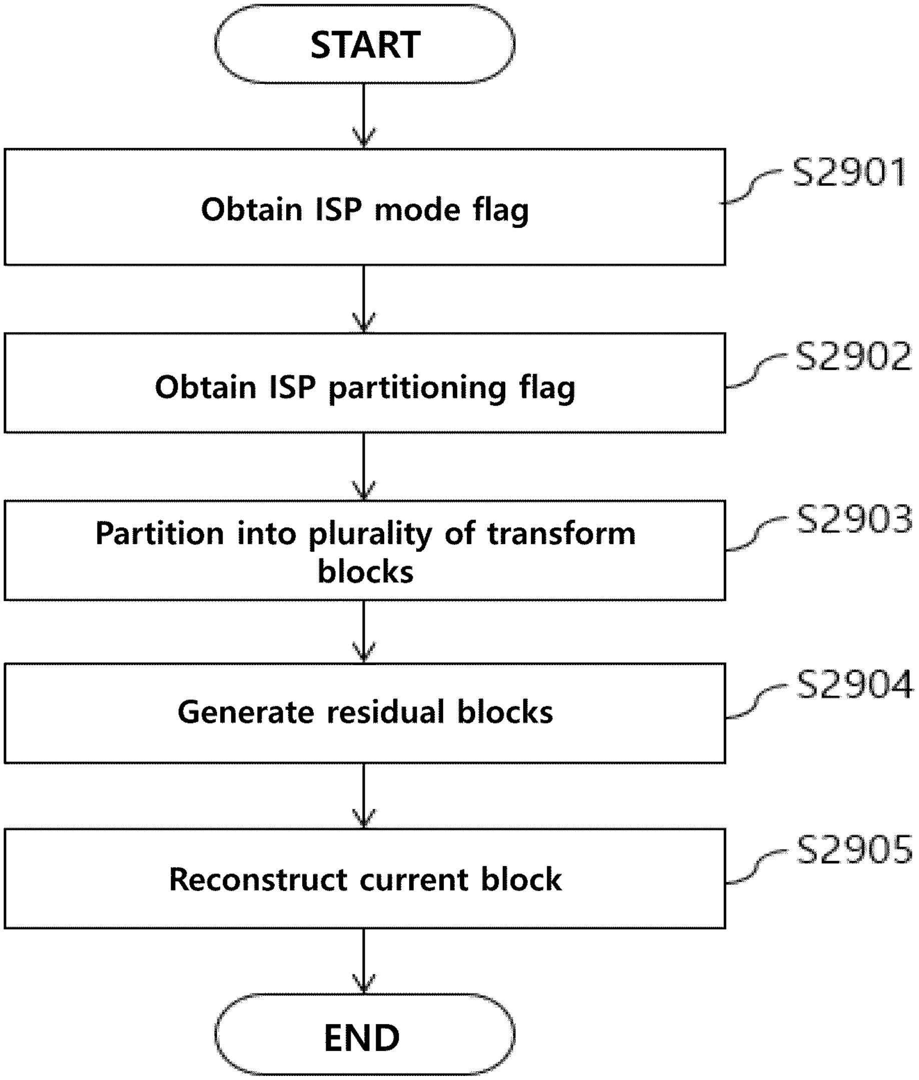
FIG. 29 is a flowchart showing a video signal processing method according to an embodiment of the present disclosure.

FIG. 29 is a flowchart showing a video signal processing method according to an embodiment of the present disclosure. Referring to FIG. 29, although a description will be made based on the decoder for convenience of description, the present disclosure is not limited thereto, and a video signal processing method according to the present embodiment may be applied to the encoder in substantially the same manner.

The decoder obtains an ISP mode flag indicating whether or not an intra sub-partitions (ISP) mode is applied to the current block from the video signal (S2901).

If the ISP mode is applied to the current block, the decoder obtains an ISP partitioning flag indicating a partitioning direction of the current block from the video signal (S2902).

The decoder partitions the current block into a plurality of transform blocks on the basis of the partitioning direction (S2903).

The decoder generates residual blocks of the transform blocks by performing inverse transformation on the respective transform blocks (S2904).

The decoder reconstructs the current block on the basis of the residual blocks (S2905).

As described above, the step of generating the residual blocks may include the steps of determining a horizontal transform type applied in the horizontal direction of the current transform block from among a plurality of predefined transform types on the basis of the width of the current transform block regardless of an intra prediction mode of the current block, determining a vertical transform type applied in the vertical direction of the current transform block from among the plurality of predefined transform types on the basis of the height of the current transform block regardless of the intra prediction mode of the current block, and performing inverse transformation on the current transform block using the horizontal transform type and the vertical transform type.

In addition, as described above, the step of determining the horizontal transform type may be performed determining the horizontal transform type to be a first transform type if the width of the current transform block is less than a first threshold or greater than a second threshold and by determining the horizontal transform type to be a second transform type if the width of the current transform block is greater than or equal to the first threshold and less than or equal to the second threshold.

In addition, as described above, the step of determining the vertical transform type may be performed by determining the vertical transform type to be a first transform type if the height of the current transform block is less than a first threshold or greater than a second threshold, and by determining the vertical transform type to be a second transform type if the height of the current transform block is greater than or equal to the first threshold and less than or equal to the second threshold.

In addition, as described above, the first transform type may be defined as a transform kernel based on a discrete cosine transform type-2 (DCT-2), and the second transform type may be defined as a transform kernel based on a discrete sine transform type-7 (DST-7).

In addition, as described above, the first threshold may be defined on the basis of a minimum size of the transform block of a luma component.

In addition, as described above, the second threshold may be defined on the basis of a maximum size of the second transform type used in the ISP mode.

In addition, as described above, the first threshold may be defined as 4, and the second threshold may be defined as 16.

In addition, as described above, the horizontal transform type may be determined on the basis of the width of the current transform block regardless of the height of the current transform block, and the vertical transform type may be determined on the basis of the height of the current transform block regardless of the width of the current transform block.

The above-described embodiments of the present invention can be implemented through various means. For example, embodiments of the present invention may be implemented by hardware, firmware, software, or a combination thereof.

For implementation by hardware, the method according to embodiments of the present invention may be implemented by one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, and the like.

In the case of implementation by firmware or software, the method according to embodiments of the present invention may be implemented in the form of a module, procedure, or function that performs the functions or operations described above. The software code can be stored in memory and driven by a processor. The memory may be located inside or outside the processor, and may exchange data with the processor by various means already known.

Some embodiments may also be implemented in the form of a recording medium including computer-executable instructions such as a program module that is executed by a computer. Computer-readable media may be any available media that may be accessed by a computer, and may include all volatile, nonvolatile, removable, and non-removable media. In addition, the computer-readable media may include both computer storage media and communication media. The computer storage media include all volatile, nonvolatile, removable, and non-removable media implemented in any method or technology for storing information such as computer-readable instructions, data structures, program modules, or other data. Typically, the communication media include computer-readable instructions, other data of modulated data signals such as data structures or program modules, or other transmission mechanisms, and include any information transfer media.

The above-mentioned description of the present invention is for illustrative purposes only, and it will be understood that those of ordinary skill in the art to which the present invention belongs may make changes to the present invention without altering the technical ideas or essential characteristics of the present invention and the invention may be easily modified in other specific forms. Therefore, the embodiments described above are illustrative and are not restricted in all aspects. For example, each component described as a single entity may be distributed and implemented, and likewise, components described as being distributed may also be implemented in an associated fashion.

The scope of the present invention is defined by the appended claims rather than the above detailed description, and all changes or modifications derived from the meaning and range of the appended claims and equivalents thereof are to be interpreted as being included within the scope of present invention.

INDUSTRIAL APPLICABILITY

As described above, preferred embodiments of the present disclosure have been disclosed for the purpose of illustration, and those skilled in the art may perform improvement, modification, substitution, or supplement into various other embodiments without departing from the technical spirit and scope of the present disclosure disclosed in the claims appended below.

The invention claimed is:

1. A non-transitory computer-readable medium storing a bitstream, the bitstream being decoded by a decoding method, wherein the decoding method, comprising:

obtaining an intra sub-partitions (ISP) mode flag indicating whether or not an ISP mode is applied to a current block from a video signal;

if the ISP mode is applied to the current block, obtaining an ISP partitioning flag indicating a partitioning direction of the current block from the video signal;

partitioning the current block into a plurality of transform blocks on the basis of the partitioning direction;

generating residual blocks of the transform blocks by performing inverse transformation on each of the transform blocks; and reconstructing the current block on the basis of the residual blocks, wherein the generating the residual blocks comprises:

determining a horizontal transform type applied in a horizontal direction of a current transform block from among a plurality of predefined transform types on the basis of a width of the current transform block regardless of an intra prediction mode of the current block;

determining a vertical transform type applied in a vertical direction of the current transform block from among the plurality of predefined transform types on the basis of a height of the current transform block regardless of the intra prediction mode of the current block; and performing inverse transformation on the current transform block using the horizontal transform type and the vertical transform type.

2. The non-transitory computer-readable medium storing the bitstream of claim 1, wherein the determining the horizontal transform type comprises:

if the width of the current transform block is less than a first threshold or greater than a second threshold, determining the horizontal transform type to be a first transform type; and if the width of the current transform block is greater than or equal to the first threshold and less than or equal to the second threshold, determining the horizontal transform type to be a second transform type, and wherein the determining the vertical transform type comprises:

if the height of the current transform block is less than the first threshold or greater than the second threshold, determining the vertical transform type to be the first transform type; and if the height of the current transform block is greater than or equal to the first threshold and less than or equal to the second threshold, determining the vertical transform type to be the second transform type.

3. The non-transitory computer-readable medium storing the bitstream of claim 2, wherein the first transform type is defined as a transform kernel based on a discrete cosine transform type-2 (DCT-2), and the second transform type is defined as a transform kernel based on a discrete sine transform type-7 (DST-7).

4. The non-transitory computer-readable medium storing the bitstream of claim 2, wherein the first threshold is defined on the basis of a minimum transform block size of a luma component.

5. The non-transitory computer-readable medium storing the bitstream of claim 2, wherein the second threshold is defined on the basis of a maximum size of the second transform type used in the ISP mode.

6. The non-transitory computer-readable medium storing the bitstream of claim 2, wherein the first threshold is defined as 4, and the second threshold is defined as 16.

7. The non-transitory computer-readable medium storing the bitstream of claim 1, wherein the horizontal transform type is determined on the basis of the width of the current transform block regardless of the height of the current transform block, and wherein the vertical transform type is determined on the basis of the height of the current transform block regardless of the width of the current transform block.

8. A video signal decoding device comprising a processor, wherein the processor is configured to:

obtain an intra sub-partitions (ISP) mode flag indicating whether or not an ISP mode is applied to a current block from a video signal;

if the ISP mode is applied to the current block, obtain an ISP partitioning flag indicating a partitioning direction of the current block from the video signal;

partition the current block into a plurality of transform blocks on the basis of the partitioning direction;

generate residual blocks of the transform blocks by performing inverse transformation on each of the transform blocks; and reconstruct the current block on the basis of the residual blocks, and wherein the processor is further configured to:

determine a horizontal transform type applied in a horizontal direction of a current transform block from among a plurality of predefined transform types on the basis of a width of the current transform block regardless of an intra prediction mode of the current block;

determine a vertical transform type applied in a vertical direction of the current transform block from among the plurality of predefined transform types on the basis of a height of the current transform block regardless of the intra prediction mode of the current block; and generate a residual block by performing inverse transformation on the current transform block using the horizontal transform type and the vertical transform type.

9. The video signal decoding device of claim 8, wherein the processor is configured to:

if the width of the current transform block is less than a first threshold or greater than a second threshold, determine the horizontal transform type to be a first transform type;

if the width of the current transform block is greater than or equal to the first threshold and less than or equal to the second threshold, determine the horizontal transform type to be a second transform type;

if the height of the current transform block is less than the first threshold or greater than a second threshold, determine the vertical transform type to be the first transform type; and if the height of the current transform block is greater than or equal to the first threshold and less than or equal to the second threshold, determine the vertical transform type to be the second transform type.

10. The video signal decoding device of claim 9, wherein the first transform type is defined as a transform kernel based on a discrete cosine transform type-2 (DCT-2), and the second transform type is defined as a transform kernel based on a discrete sine transform type-7 (DST-7).

11. The video signal decoding device of claim 9, wherein the first threshold is defined on the basis of a minimum transform block size of a luma component.

12. The video signal decoding device of claim 9, wherein the second threshold is defined on the basis of a maximum size of the second transform type used in the ISP mode.

13. The video signal decoding device of claim 9, wherein the first threshold is defined as 4, and the second threshold is defined as 16.

14. The video signal decoding device of claim 8, wherein the horizontal transform type is determined on the basis of the width of the current transform block regardless of the height of the current transform block, and wherein the vertical transform type is determined on the basis of the height of the current transform block regardless of the width of the current transform block.

15. A video signal encoding device comprising a processor, wherein the processor is configured to:

encode an intra sub-partitions (ISP) mode flag indicating whether or not an ISP mode is applied to a current block;

if the ISP mode is applied to the current block, encode an ISP partitioning flag indicating a partitioning direction of the current block;

partition the current block into a plurality of blocks on the basis of the partitioning direction;

generate a transform block of the partitioned blocks by performing transformation of a residual signal of the partitioned blocks; and generate a bitstream by encoding the transform block, wherein the processor is further configured to:

determine a horizontal transform type applied in a horizontal direction of a current transform block from among a plurality of predefined transform types on the basis of a width of the current transform block regardless of an intra prediction mode of the current block;

determine a vertical transform type applied in a vertical direction of the current transform block from among the plurality of predefined transform types on the basis of a height of the current transform block regardless of the intra prediction mode of the current block; and perform transformation on the current transform block using the horizontal transform type and the vertical transform type.

* * * * *